(12) United States Patent
Fripp et al.

(10) Patent No.: US 12,421,815 B2
(45) Date of Patent: Sep. 23, 2025

(54) WELLBORE TRACTOR INCLUDING A TRACTOR POWER RECEIVE MODULE

(71) Applicant: Halliburton Energy Services, Inc., Houston, TX (US)

(72) Inventors: Michael Linley Fripp, Singapore (SG); Wei Zhang, Houston, TX (US); Aswin Balasubramanian, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/581,978

(22) Filed: Feb. 20, 2024

(65) Prior Publication Data

US 2024/0279992 A1  Aug. 22, 2024

Related U.S. Application Data

(60) Provisional application No. 63/447,556, filed on Feb. 22, 2023.

(51) Int. Cl.
  *E21B 23/00* (2006.01)
  *B60L 53/12* (2019.01)
  *B60L 53/30* (2019.01)
  *B60L 53/50* (2019.01)
  *E21B 41/00* (2006.01)
  (Continued)

(52) U.S. Cl.
  CPC ............ *E21B 23/001* (2020.05); *B60L 53/50* (2019.02); *E21B 41/0085* (2013.01); *E21B 43/12* (2013.01); *B60L 53/12* (2019.02); *B60L 53/30* (2019.02); *B60L 2200/40* (2013.01); *B60L 2210/30* (2013.01); *B60L 2210/40* (2013.01); *E21B 2200/20* (2020.05); *H02J 50/05* (2016.02); *H02J 50/10* (2016.02)

(58) Field of Classification Search
  CPC .... E21B 23/001; E21B 41/0085; E21B 43/12; E21B 2200/20; B60L 53/50; B60L 53/12; B60L 53/30; B60L 2200/40; B60L 2210/30; B60L 2210/40; H02J 50/05; H02J 50/10
  See application file for complete search history.

(56) References Cited

U.S. PATENT DOCUMENTS 5,458,200 A  10/1995  Lagerlef et al.
5,839,508 A  11/1998  Tubel et al.
(Continued)

FOREIGN PATENT DOCUMENTS

JP  06261423 A  9/1994
KR  1020150052382  5/2015

*Primary Examiner* — James G Sayre
(74) *Attorney, Agent, or Firm* — Scott Richardson; Parker Justiss, P.C.

(57) ABSTRACT

Provided is a wellbore tractor, a well system and a method. The wellbore tractor, in one aspect, includes a tractor drive module, the tractor drive module configured to propel the wellbore tractor within a wellbore extending through one or more subterranean formations, and well as a tractor electronics module coupled to the tractor drive module, the tractor electronics module including one or more batteries. The wellbore tractor, according to this aspect, further includes a tractor power transfer module coupled to the tractor electronics module, the tractor power transfer module configured to receive power from a wellbore tractor charging station located within the wellbore and transfer it to the one or more batteries.

35 Claims, 52 Drawing Sheets

Figure 1A:
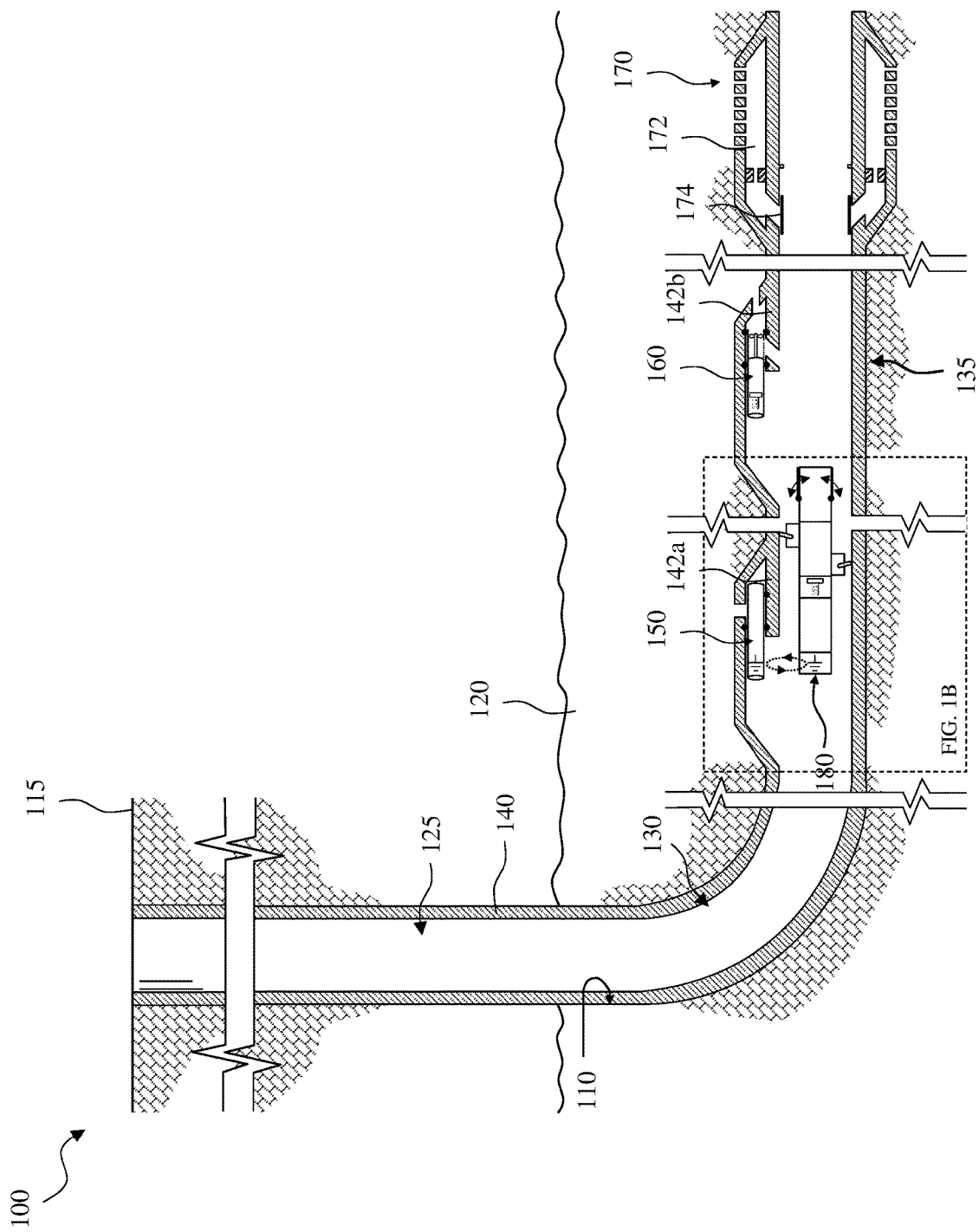

(51) Int. Cl.
*E21B 43/12* (2006.01)
*H02J 50/05* (2016.01)
*H02J 50/10* (2016.01)

(56) References Cited

U.S. PATENT DOCUMENTS

| | | | |
|---|---|---|---|
| 6,070,608 A | 6/2000 | Pringle | |
| 6,273,189 B1* | 8/2001 | Gissler | E21B 4/04 |
| | | | 166/241.1 |
| 6,343,651 B1 | 2/2002 | Bixenman | |
| 6,378,627 B1 | 4/2002 | Tubel et al. | |
| 6,446,718 B1 | 9/2002 | Barrett et al. | |
| 6,454,011 B1 | 9/2002 | Schempf et al. | |
| 6,799,633 B2 | 10/2004 | McGregor | |
| 7,303,010 B2 | 12/2007 | de Guzman et al. | |
| 8,528,395 B2 | 9/2013 | Griffiths et al. | |
| 10,459,107 B2 | 10/2019 | Pelletier et al. | |
| 10,563,478 B2 | 2/2020 | Arsalan et al. | |
| 10,570,696 B2 | 2/2020 | Arsalan et al. | |
| 10,612,370 B2 | 4/2020 | Bouldin et al. | |
| 10,641,060 B2 | 5/2020 | Arsalan et al. | |
| 10,655,429 B2 | 5/2020 | Arsalan et al. | |
| 10,724,329 B2 | 7/2020 | Arsalan et al. | |
| 10,781,660 B2 | 9/2020 | Arsalan et al. | |
| 10,907,442 B2 | 2/2021 | Arsalan et al. | |
| 11,047,189 B2 | 6/2021 | Fernandes et al. | |
| 11,131,185 B1 | 9/2021 | Jaaskelainen et al. | |
| 11,566,494 B2 | 1/2023 | Greci et al. | |
| 2003/0234110 A1 | 12/2003 | McGregor | |
| 2004/0055746 A1* | 3/2004 | Ross | E21B 34/14 |
| | | | 166/250.15 |
| 2005/0230974 A1 | 10/2005 | Masters et al. | |
| 2006/0016606 A1 | 1/2006 | Tubel et al. | |
| 2010/0217575 A1 | 8/2010 | Briers et al. | |
| 2012/0268074 A1* | 10/2012 | Cooley | E21B 41/0085 |
| | | | 320/167 |
| 2017/0241221 A1 | 8/2017 | Seshadri et al. | |
| 2020/0248517 A1 | 8/2020 | Bouldin et al. | |
| 2021/0222522 A1 | 7/2021 | Greci et al. | |
| 2022/0251911 A1* | 8/2022 | Samuel | E21B 23/001 |
| 2024/0191618 A1 | 6/2024 | Alali et al. | |

* cited by examiner

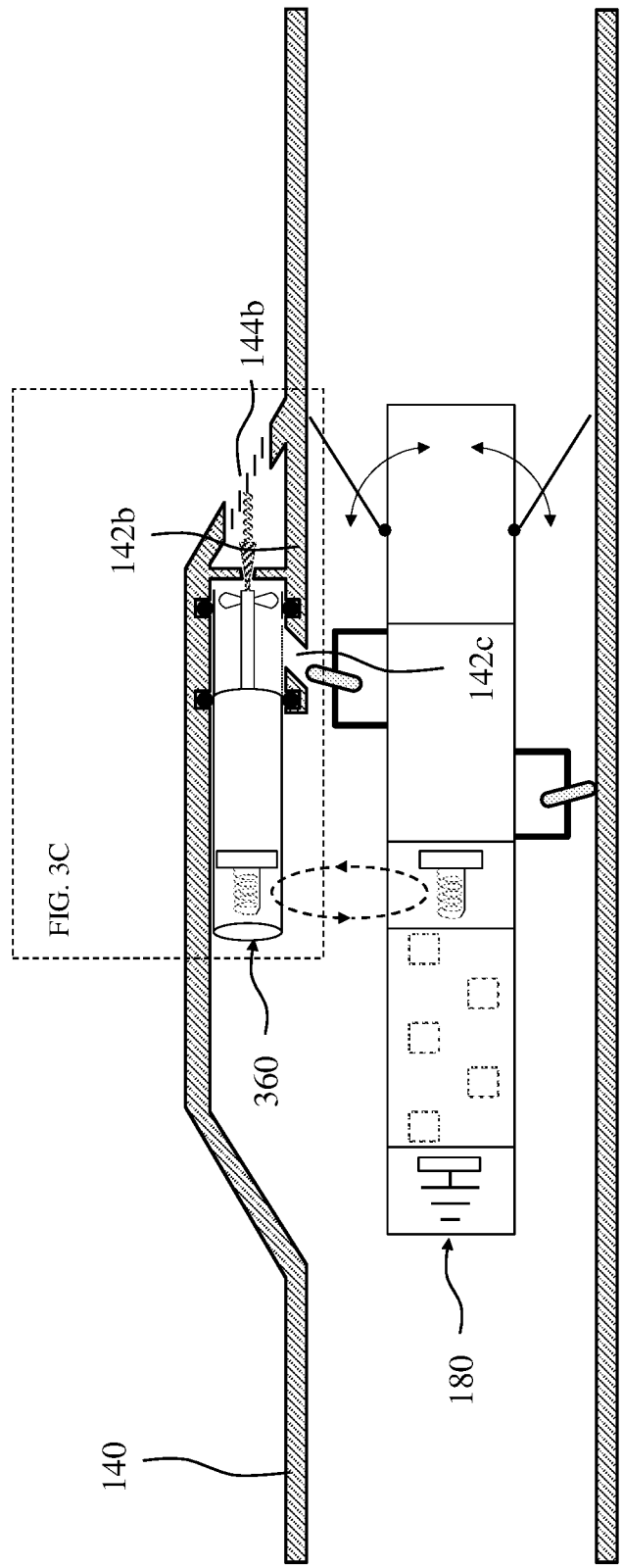

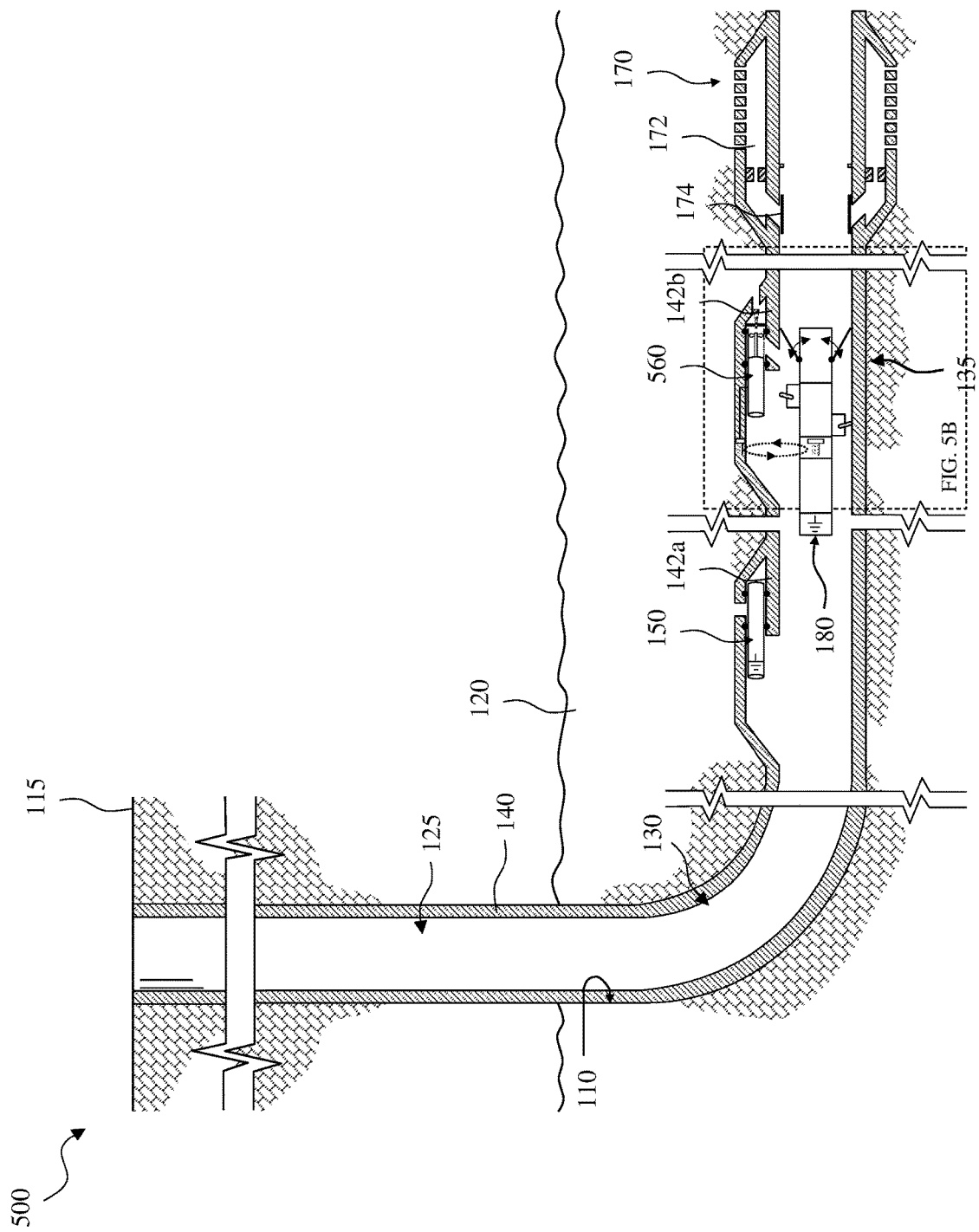

WELLBORE TRACTOR INCLUDING A TRACTOR POWER RECEIVE MODULE

CROSS-REFERENCE TO RELATED APPLICATION

This application claims the benefit of U.S. Provisional Application Ser. No. 63/447,556, filed on Feb. 22, 2023, entitled "CONTROL OF A PERMANENT COMPLETION USING AUTONOMOUS ROBOTS," commonly assigned with this application and incorporated herein by reference in its entirety.

BACKGROUND

Wellbore intervention is difficult and typically requires using coiled tubing, jointed tubing, or an e-line driven wellbore tractor. Coiled tubing is expensive, the injection lengths are limited by the size of the coil, and furthermore requires a coiled tubing rig to run. Jointed tubing is slow and also requires a rig to be moved into place.

As a result, many of the traditional wellbore interventions have used a wellbore tractor (e.g., to pull a wireline tool). This traditional approach is limited by the weight of the wireline and the cost of the wellbore tractor. Downhole wellbore tractors have been desired, but have been limited by battery weight and system cost. What is needed in the art is an improved autonomous downhole wellbore tractor that does not experience the drawbacks of existing systems.

BRIEF DESCRIPTION

Reference is now made to the following descriptions taken in conjunction with the accompanying drawings, in which:

FIGS. 1A through 12B illustrate various different embodiments of well system features manufactured, designed, and operated according to the disclosure; and FIGS. 13 through 22 illustrate various different embodiments of wellbore tractors manufactured, designed, and/or operated according to the disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water. Likewise, the term "module," unless otherwise stated, is intended to mean a collection of features, and does not require that such features are self-contained together in a given housing, but could span across one or more different housings.

The present disclosure is directed, in part, to a completion (e.g., intelligent completion) where certain of the components (e.g., key components) can be adjusted/modified/replaced by an autonomous wellbore tractor (e.g., wellbore robot). In at least one embodiment, the autonomous wellbore tractor can replace sensor modules, can determine optimal valve positions, and can adjust inflow valves, among other adjustments, modifications and/or replacements.

Accordingly, in at least one embodiment, the present disclosure provides control with an autonomous wellbore tractor (e.g., as shown in FIGS. 1A through 1J, wherein the autonomous wellbore tractor adjusts a control valve based on readings from a wellbore sensor, e.g., replaceable wellbore sensor, and wellbore model). In at least one embodiment, the autonomous wellbore tractor moves downhole without being tethered to the surface, collects (e.g., wired or wirelessly) data from a wellbore sensor (e.g., replaceable wellbore sensor), processes the sensor data with a model (e.g., pre-entered model) of the wellbore, calculates desired wellbore valve positions for production flow, adjusts inflow control valves, or any one or collection of these steps.

In at least one other embodiment, the autonomous wellbore tractor reads wellbore sensor data and relays the data to the surface (either wired, wirelessly, or via carrying the data towards the surface). The autonomous wellbore tractor may additionally adjust downhole valve positions with a mechanical manipulator. Furthermore, in at least one embodiment the wellbore sensor may have a downhole power generator that converts flow energy into electrical energy. In at least one other embodiment, the autonomous wellbore tractor can perform calculations to adjust downhole valves based on the received sensor values autonomously (e.g., without needing a human in the loop).

In at least one embodiment, the autonomous wellbore tractor is pre-programmed with a model of the wellbore. The model may include a combination of information about the wellbore sensors, about the wellbore valves, and/or about the inflow control valves. The model can also include information about flow resistance (such as the length and diameter of wellbore tubing), about the formation (such as permeability, background temperature, formation pressure, component fluid viscosities, component fluid densities). The model can also include information about wellbore structures (such as distances between collars, profiles and upsets, magnetic/chemical/radioactive location tags).

In at least one other embodiment, the autonomous wellbore tractor includes a controller that adjusts the valve position based on the sensor measurements and the model of the wellbore. Examples of certain control algorithms include: 1) Constant flow: adjust valves to maintain consistent flow rate along the length of the wellbore. This suggests modeling the flow restriction in the wellbore tubing to avoid a heal-toe effect or to mitigate the effect of natural fractures in the formation. 2) Constant drawdown pressure: adjust valves to have a consistent differential pressure across the production. This suggest modeling the additional pressure restriction in the wellbore tubing. 3) Increased oil production: open valves that have a high oil flow, even if they are also producing water. 4) Decreased water production: open valves that have a high oil fraction and restrict valves that have a high water cut. 5) Maximize Ultimate Recovery: combine sensor data, reservoir model, and historical behavior to determine the valve position.

In at least one embodiment, the autonomous wellbore tractor can determine its downhole location from fixed markers that have been placed in the wellbore. In one example, the marker is a permanent magnet that denotes the location of a desired device (e.g., sensor module, wellbore valve, inflow control valve, or other adjustable device). The autonomous wellbore tractor could have a magnetic sensor, such as a magnetic angle sensor or a magnetic amplitude sensor, and could adjust its position so that it would be closest to the permanent magnet. The permanent magnet can denote the proper axial position, as well as the proper circumferential position. Alternative markers include profiles within the wellbore tubing (e.g., selective profiles, landing nipples, and orienting grooves, among others) and passive electromagnetic tags such as RFID tags and NFC tags. The fixed marker may also be a powered device, such as from an acoustic transmitter or an electromagnetic transmitter. The autonomous wellbore tractor could have an acoustic receiver or an electromagnetic receiver to detect the amplitude change, the Doppler frequency shift, the phase shift, or the signal angle shift as the wellbore tractor approaches the reference location.

In at least one other embodiment, the present disclosure provides wireless communication between a wellbore sensor and the autonomous wellbore tractor, as shown in FIGS. 1A through 1J (e.g., wireless coupling between wellbore sensor and the autonomous wellbore tractor). In at least one embodiment, the autonomous wellbore tractor collects recent sensor readings, a history of sensor readings, and/or potentially an analysis of the sensor readings conducted by the wellbore sensor. In at least one embodiment, the data collection is performed without needing a physical electrical connection between the sensor module and the downhole autonomous wellbore tractor, and in yet another embodiment, one or both of the downhole autonomous wellbore tractor or the wellbore sensor includes a physically deployable tether to communicate the wellbore sensor readings.

In at least one other embodiment, the present disclosure provides a wellbore tractor charging station, as shown in FIGS. 1A through 1J. In at least one embodiment, wireless coupling can be used to recharge the autonomous wellbore tractor at a downhole location using the wellbore tractor charging station. The wellbore tractor charging station, in one or more embodiments, may be a replaceable wellbore tractor charging station. In at least one embodiment, the wellbore tractor charging station contains a downhole power generator that converts some of the energy from the production of one zone into electrical energy. The downhole power generator can be a turbine that converts the fluid energy as the fluid travels from the exterior to the interior of the wellbore tubing. The downhole power generator can be a vortex shedding generator that converts the fluid energy as the fluid travels along the interior of the wellbore tubing. In an alternative embodiment, the vortex shedding generator is located on/in the OD to ID fluid path, among other locations. This energy can be transformed and then transferred to the autonomous wellbore tractor so that the wellbore tractor can be recharged.

The interior of the wellbore tubing may be partially filled by the autonomous wellbore tractor. The diameter of the wellbore tubing around the wellbore tractor charging station can be larger than the wellbore tubing sections either upstream or downstream of the wellbore tractor charging station. The larger cross-sectional area can increase the internal flow area by approximately 25%, 50%, or 75%, wherein approximately in this instance means+/−15%. The larger cross-sectional area around the wellbore tractor charging station allows the autonomous wellbore tractor to link with the wellbore tractor charging station without creating a significant restriction to the production of fluids to or from the formation. In some instances, the restriction to fluid flow is such that there is less than a 100 psi pressure drop across the autonomous wellbore tractor at flow rates of 5000 barrels per day. In other examples, the restriction is less than 10 psi at flow rates of 10,000 barrels per day.

In one example, an increased diameter section is located near the bottom of the upper completion. In yet another embodiment, a wired connection, such as a tubing encapsulated connector ("TEC"), to the surface may deliver power to the section with the increased diameter. Regardless of whether the wellbore tractor charging station is wired, or generates its own power, the autonomous wellbore tractor can park in this powered section, can remain charged through the electrical connection to the wellbore tractor charging station (wired or wirelessly), can communicate through the electrical connection to the wellbore tractor charging station, and can have minimal restriction to the fluid flow to or from the completion.

In another example, different devices are available in multiple side pockets for the autonomous wellbore tractor to use, operate, adjust, replace, or to power a downhole tool. The autonomous wellbore tractor can park at this downhole location for an operational period of time where multiple changes are likely required for the downhole tools so that the autonomous wellbore tractor is closer to the downhole tools. The autonomous wellbore tractor can park at a position higher in the wellbore during times when there is a longer time between tool adjustments so that the autonomous wellbore tractor is dwelling at a lower operating temperature. Multiple wellbore tractor charging station locations are possible, including in the middle of the production zone, at the toe of the production zone, in laterals, at lateral junctions, in a lower completion, in an upper completion, in a barefoot completion, and in positions along the vertical section of the wellbore.

In one or more embodiments, power can be transferred between the autonomous wellbore tractor and the wellbore tractor charging station wirelessly (e.g., via an AC magnetic field). The AC magnetic field can be oriented axially or it can be oriented radially. The magnetic coils for charging the autonomous wellbore tractor may be located within a replaceable wellbore tractor charging station (such as in FIGS. 1A through 1J) or it can be on the tubing string (such as in FIGS. 5A and 5B). Power can also be transferred through capacitive coupling. Power can also be transferred through physical electrical contacts (e.g., a physically deployable tether that convey an AC or DC electric field), as shown in FIGS. 4A through 4F.

In one or more embodiments, the autonomous wellbore tractor can send a signal to the wellbore tractor charging station to alert it that charging should be initiated. It could also be continuously broadcasting a charging signal. In at least one embodiment, the autonomous wellbore tractor has pre-programmed map of the wellbore. It can seek the wellbore tractor charging station when the voltage of its batteries reaches a minimum threshold, after a fixed amount of charge has departed the battery, after a fixed amount of time, prior to commencing an energy-intensive task (like climbing out of the borehole), when the internal resistance of its internal battery has reached a maximum threshold, or a combination thereof.

In at least one other embodiment, the present disclosure provides well formation evaluation (e.g., deep well formation evaluation), including using one or more wellbore sensors (e.g., one or more replaceable wellbore sensor modules). In at least one embodiment, a wellbore sensor is partially located as a fixture on the wellbore and is partially located in a removeable electronics module. The portion that is permanently mounted on the wellbore may be there because the metal wellbore tubing would interfere with the measurements, or because the electrical insert is not large enough to make the measurements. In at least one embodiment, the electronics are in the removable module. The sensor may be mounted on the wellbore tubing. For EM evaluation, the antennae may be considered to be the formation sensor.

In at least one embodiment, the wellbore sensor generates a magnetic field for evaluating the position of conductive water, oil, gas, or carbon dioxide near the wellbore. The electronics, signal conditioning, and power may be located within an electronics module of the wellbore sensor. Electrical pickups can form an electrical connection between the wellbore sensor (e.g., the electronics module of the wellbore sensor) and the wellbore tubing where the magnetic antennae are located.

In at least one embodiment, a downhole grid may be created with connections between the modules. A connector (e.g., tubing encapsulated connector—TEC) to the next node could allow for a more precise measurement of the electromagnetic properties of the formation by using the replaceable module at one location as the transmitter and the module at a second location as the receiver. In at least one other embodiment, an electric antenna may be used as the transmitter and as the receiver.

Figure 1B:
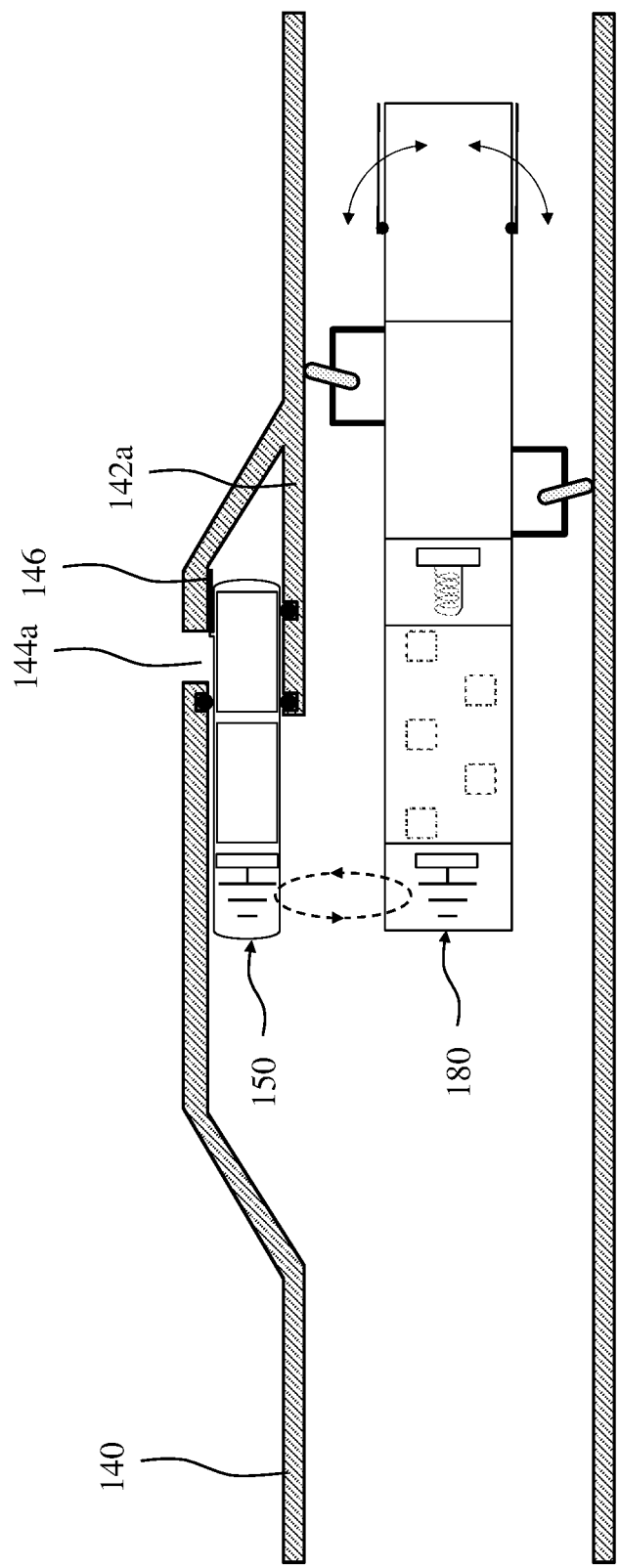
Figure 3A:
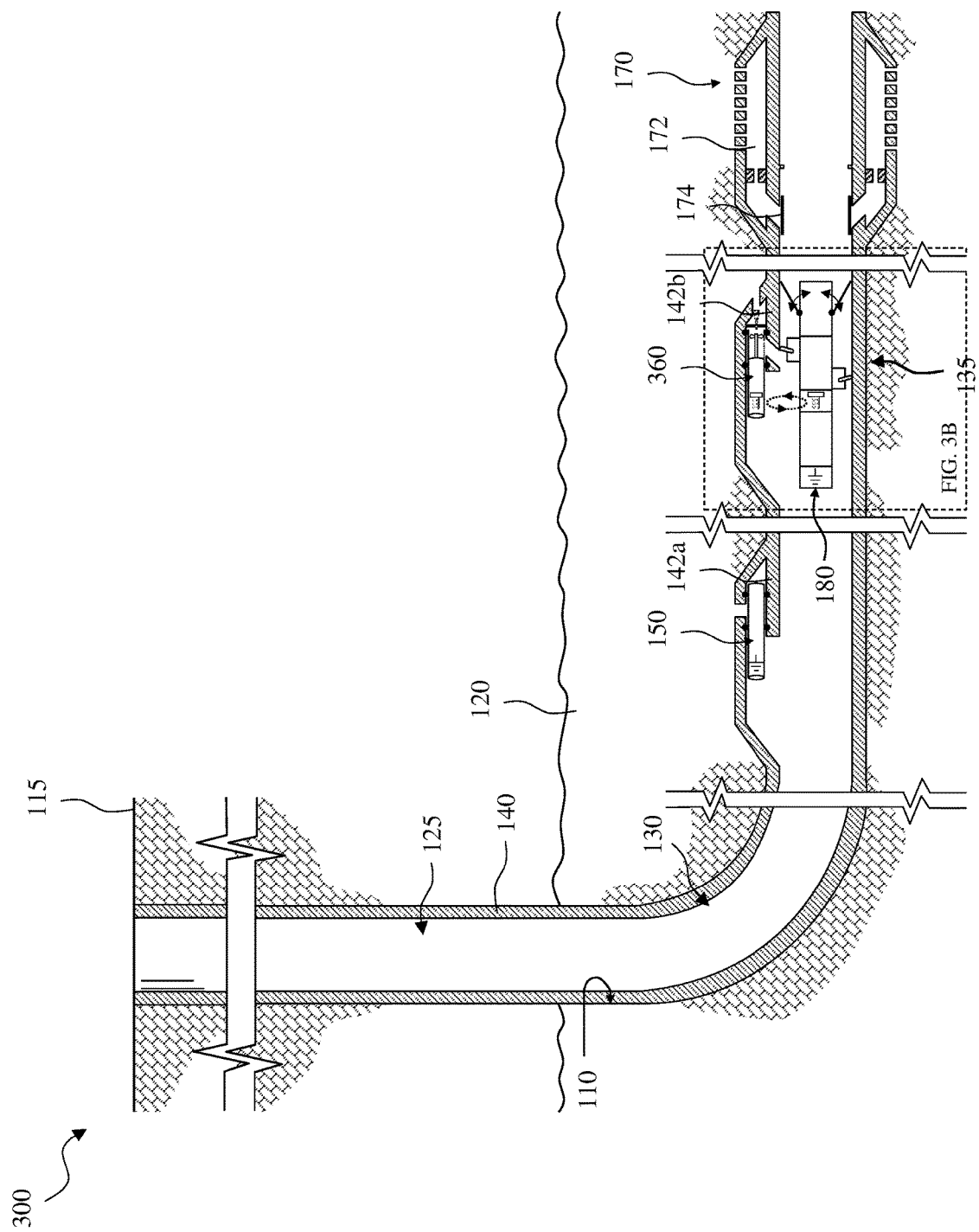
Figure 3C:
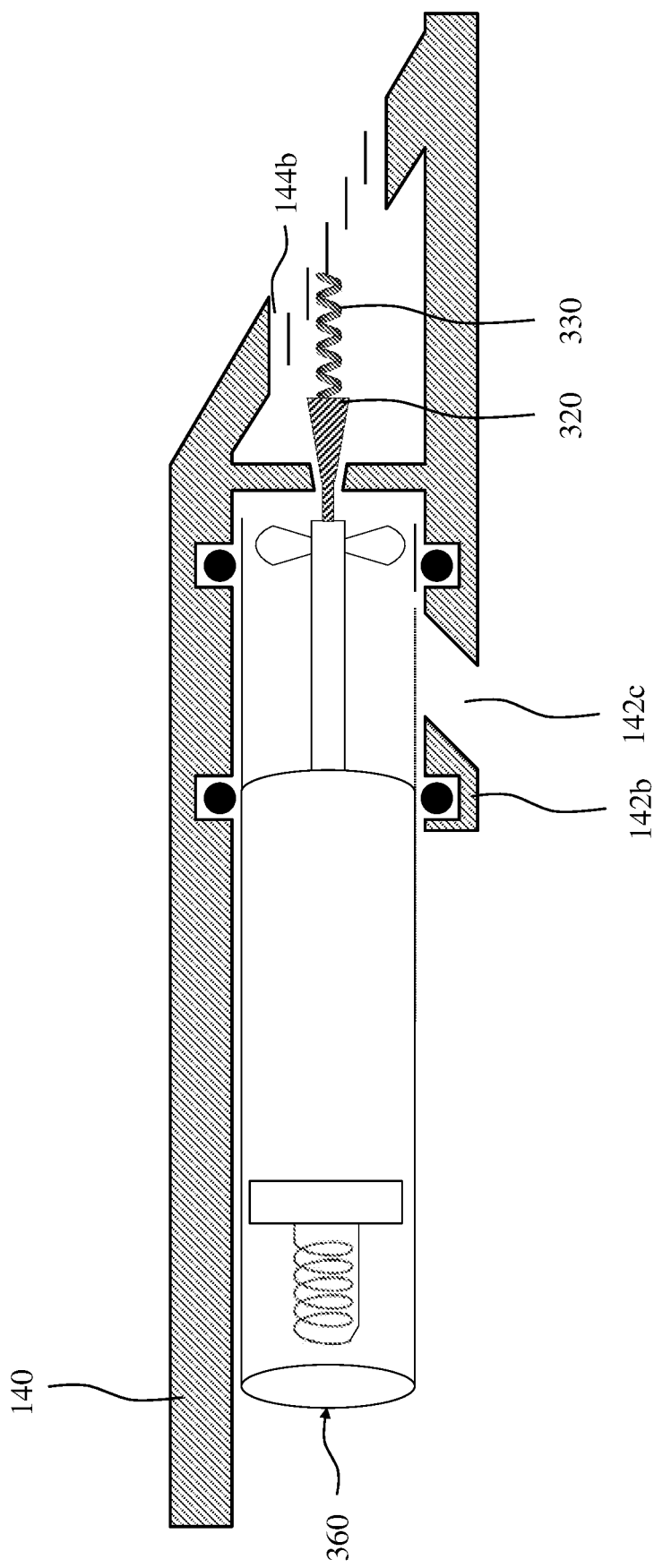

In at least one other embodiment, the present disclosure provides wellbore control while changing wellbore sensors, as shown in FIG. 1B (e.g., sliding sleeve to control flow prior to insertion of sensor module) and FIGS. 3A through 3C (e.g., spring loaded piston valve is pushed off seat during installation of the sensor module). In at least one embodiment, it is desirable to be able to add the wellbore sensors at a later point in the well life. Accordingly, there is a desire for a method for blocking the flow ports prior to the installation of the wellbore sensor. In one or more embodiments, there is a mechanical seal that is physically displaced as part of one of the steps during the insertion of the wellbore sensor. For example, the side pocket may have a sleeve portion that covers the flow port. Installing the wellbore sensor may push the sleeve portion out of the way. A hard shoulder could allow significant force to be applied to open the sleeve portion. A collet or detent could also be used, especially to allow shifting the sleeve portion to a closed position upon removal. In another example, the sleeve portion covers the entire side pocket.

In at least one embodiment, a piston valve closes the flow port, such as shown in FIGS. 3A through 3D. Installing the wellbore sensor or wellbore tractor charging station may push the piston off of its seat. The piston valve can also be spring loaded, have a frangible holder like a shear pin or glue, or can simply be a check valve to block production. In at least one embodiment, the side pocket may have a flow tube, like a subsurface safety valve (SSSV), that translates as part of the sensor module insertion process. The flow tube may shift a valve such as a ball valve or a flapper valve.

In at least one other embodiment, the autonomous wellbore tractor includes (e.g., houses) sensor or camera-based image processing equipment. In at least this one embodiment, the sensor or camera-based image processing equipment has the ability to measure scaling buildup, and thus the autonomous wellbore tractor has the ability to sense and then intervene to remove the scaling buildup in different regions of interest.

The present disclosure teaches how to make a new class of autonomous wellbore tractors that move without electricity. The wellbore tractor, in one embodiment, is mechanically powered by the flow of wellbore fluid. Thus, in one embodiment, neither wireline nor batteries are required to propel such a wellbore tractor. Notwithstanding, in certain embodiments batteries and/or wireline may be used in conjunction with the mechanical power to propel the wellbore tractor.

Such a wellbore tractor uses the wellbore fluid flow energy to propel the wellbore tractor forward. For example, in one embodiment the wellbore fluid flow energy spins the wellbore tractor such that it spirals into the flow. The result is a very low cost and very rugged wellbore tractor that enables a new class of applications for logging, communication, sealing, and wellbore evaluation.

The present disclosure further focuses on the aspect where the wellbore tractor acts as an autonomous robot. For instance, in such a use the wellbore tractor is placed in the well, the wellbore fluid is allowed to flow uphole, and as a result the wellbore tractor swims downhole to a specific location and performs a predefined job. The design of the wellbore tractor, in one embodiment allows the tool to travel downhole and uphole in vertical and horizontal sections of the wellbore.

A flow-powered wellbore tractor, according to the disclosure, uses the energy of the wellbore fluid (e.g., production fluid) to move forward. The flowing wellbore fluid, in one embodiment, hits the turbine on the front of the wellbore tractor, which causes the turbine to rotate in a first rotational direction, and thus the wellbore tractor to also rotate. In one embodiment, the wellbore tractor has one or more wellbore engaging devices attached thereto that are in contact with a surface of the wellbore. These wellbore engaging devices allow the wellbore tractor to rotate, as the wellbore engaging devices are (e.g., in one embodiment) tilted at a slight angle relative to an axial surface of the wellbore. This slight angle causes the wellbore tractor to advance a little bit into the wellbore with each rotation. Thus, the wellbore fluid flow causes the wellbore tractor to spiral upstream, somewhat like a drill.

A variety of different wellbore engaging devices may be used and remain within the purview of the disclosure. In one embodiment, the wellbore engaging devices are wheels. However, although the term "wheel" is used herein, the present disclosure contemplates that other rolling members, such as tracks, roller bearings, or otherwise, may also be employed in lieu of or in addition to any illustrated wheels. In accordance with one embodiment, the wheels may comprise dissolvable wheels. Accordingly, downhole conditions, such as temperature, pressure, fluid type, etc. may be used to dissolve the wheels, and thus in certain embodiments allow the wellbore tractor to be pushed uphole by the wellbore fluid.

In one embodiment of the disclosure, the wellbore tractor could be made up of two sections: a drive section and an automation section. In accordance with this embodiment, the drive section would take the wellbore tractor downhole, for example using one or more of the ideas discussed above. The automation section, in contrast, would be used to perform a downhole task. For example, the automation section could be a logging tool, for logging information from the wellbore as the wellbore tractor moves downhole. In another embodiment, the automation section includes memory and a receiver for receiving information from one downhole device, includes memory and a transmitter for transmitting information to a downhole device, or memory and a transceiver for receiving information from one downhole device and transmitting information to another downhole device. In another embodiment, the automation section is a perforator tool, and thus may be used to perforate openings in the wellbore, wellbore casing, production tubing, etc. In yet another alternative embodiment, the automation section is a swellable packer tool that is configured to swell and thus deploy downhole.

In yet another embodiment, the automation section is a sleeve shifting tool having a profile configured to engage with a corresponding profile in a downhole sleeve, and thus may be used as a sleeve shifting tool. A contrast between the different methodologies of performing the work can be seen when comparing a downhole power unit (DPU) to shift a sleeve instead of jarring action controlled at the surface. A wellbore tractor according to the disclosure is more analogous to the DPU, where the wellbore tractor has a flow-powered drive section and an automation section for performing work. One focus of the disclosure is to use wellbore fluid flow to power the high energy demand wellbore tractor, and thus in one embodiment eliminate the slickline, e-line, tubing conveyed, or coiled tubing equipment generally required for a DPU.

Many different variations of the wellbore tractor are feasible, all of which are within the purview of the disclosure. In one variation, a wellbore tractor walks to or past a shifting sleeve, dogs latch into the profile, a chute or vanes are configured to catch the flow, and the well flow/pressure shifts the sleeve. In yet another variation, the wellbore tractor carries a lockout sleeve downhole. The lockout sleeve sets and one or more features of the wellbore tractor dissolves. For example, a lockout sleeve might block an inflow control device (ICD), and then the turbine of the wellbore tractor dissolves leaving an open passageway. In this example, the wellbore tractor is both the means of transportation and the tool. In yet another variation, the wellbore tractor travels downhole, engages a fishneck, blocks the flow by use of a chute or shifting vane, and then retrieves the tool having the fishneck.

In yet another variation, multiple different types of drive sections are used. For example, in addition to the flow-based drive section discussed above, a powered drive section could also be used. For example, the flow-based drive section could be used with one or both of a hydraulically powered drive section or an electrically powered drive section and remain within the scope of the disclosure. According to one embodiment, the wellbore fluid flow drives the spinning motion as well as generates hydraulic and/or electric energy. This energy may be used for the drive section, for the automation section, or both.

In one example embodiment, the wellbore tractor (e.g., the base member coupled to the turbine) includes a slip clutch, where if the wellbore tractor body stops moving, the turbine continues to turn and flow is used to generate hydraulic and/or electric power that is used for propulsion. An example would be that the wellbore tractor moves downward rapidly and reaches a difficult spot causing the wellbore tractor to stop. The turbine continues to spin and a secondary propulsion system that is stronger but slower kicks in to get it over the difficult part. Once past the difficult part, the primary propulsion system may resume. The propulsion systems can be chosen from a drive with differential slip, a drive with no slip clutch, an inch-worm motor, an electrical motor, a hydraulic motor, and a flow-driven rotation. In one embodiment, a first turbine could provide power for the drive section, and a second turbine could provide power to the automation section (e.g., a sensor or another device). Thus, a wellbore tractor according to the disclosure could have multiple turbines and pumps/generators that do different things.

In one variation, the drag in the pumps/generators impart the turbine momentum to the entire wellbore tractor. If the torque required to spin the wellbore tractor is higher than the drag, the turbine and the tractor body turn at different speeds and the speed difference generates hydraulic/electric power. This also acts as a governor allowing the turbine to turn faster with higher flow rates and limiting the rotational speed of the body. In contrast, a fixed turbine drag increases proportionally faster with increased flow rates. In yet another variation, the body of the wellbore tractor does not spin, just the turbine. The turbine powers a hydraulic pump or drives an electrical generator that is used to drive hydraulic or electrical motors. In this variation, multiple energy harvesting turbines may be used, and furthermore there may be multiple systems that power the propulsion system. Furthermore, multiple systems can result in a specially tailored function. For example, the electric motors provide a fast but weak mode of propulsion, but if the wellbore tractor reaches a "tough" spot in the well, the hydraulic system, which is slow but strong, propels the tractor past the tough spot.

In yet another variation, a means of controlling the device can be to close in the well. When the well closes in, pressure builds which may trigger an atmospheric chamber to shear pins and provide work. An example would be a wellbore tractor that finds a profile. When the surface valve is closed, pressure builds and the atmospheric chamber is triggered, and then slips are deployed and the downhole sleeve is shifted. The mechanical operation of the atmospheric chamber can also be electrically triggered, such as with an electrical rupture disc or an electrically-operated valve.

An additional variation includes when the wellbore tractor is used to transport a perforator tool to a specific location. Manipulation of the surface valve sends a signal to the guns causing them to fire. The guns are either left in the well, dissolve, or are retrieved by the wellbore tractor. In yet another variation, low flow results in the wellbore tractor swimming against the flow and high flow cause the wellbore tractor to flow out of the well. In this application, one could control the flow rate (e.g., from the surface of the well) to reverse the direction of the axial movement of the wellbore tractor. For example, with a slow flow rate the friction between the wellbore tractor and the wellbore is sufficient to keep the tractor moving in the correct direction, but once a higher flow rate is encountered, the friction between the wellbore tractor and the wellbore is not sufficient to keep the wellbore tractor moving in the correct direction, and thus the wellbore tractor will now move in the opposite direction with the high flow of the fluid.

In yet another variation, the wellbore tractor carries a battery downhole and leaves it there to power existing equipment, or the wellbore tractor places equipment in the well, such as a frac plug. In yet another variation, a battery is used to provide supplemental propulsion to the wellbore tractor. The wellbore tractor relies upon well flow for primary propulsion, but facing a high-power demand action, the supplemental energy from the battery may be used to supplement the power needs. In another variation, the wellbore tractor is covered with a swellable packer or carries a swellable packer, and thus can operate as a bridge plug.

This disclosure further focuses on the employment of a simple device that has limited function. The idea is for a simple device that can travel in the counter flow direction and trigger a mechanism. This leads to the possibility of extending the technology of dart/ball into the horizontal section of the completion. Furthermore, a means of retrieving the wellbore tractor may be built into the mechanism for its return to the surface. Using a dropped dart/ball to initiate a downhole action is known in the industry. However, dropping balls is limited by gravity. In horizontal sections, the dart/ball must be pumped down into the horizontal sections. Pumping a dart/ball into the well uses a lot of water and has the potential to damage the formation.

This disclosure also includes a dart/ball that can "swim" upstream though vertical and horizontal sections of the well. The ball uses a mechanical flow-driven wellbore tractor to move upstream into the production flow. The energy of the production flow is used to mechanically power the ball. Basically, this is a device that swims against the flow.

This disclosure also focuses on the aspect where the wellbore tractor is used to transport an untethered object to trigger a downhole action. The untethered object can be a dart, a ball, a frac plug, a baffle, a bridge plug, a wiper plug, or any other downhole tool. The wellbore tractor is placed in the well, the wellbore fluid is allowed to flow, and the wellbore tractor spirals downhole (including horizontal sections). In one embodiment, the wellbore tractor transverses downhole and triggers a downhole tool. After the downhole tool is triggered, pumping into the well may provide the force to perform work. Once the downhole tool is triggered, the wellbore tractor may return to the surface, may dissolve downhole, or may simply stay in the wellbore.

A wellbore tractor according to the disclosure functions in much the same way as a dropped dart/ball except that it is not gravity driven. The wellbore tractor swims to a location near a seat/receptacle/trigger. Typically, the wellbore tractor swims past/to a trigger and activates the downhole tool. For example, a spring-loaded flapper is propped open and the wellbore tractor causes it to release and close. With the flapper closed, pressure from uphole/downhole provides force to perform work and manipulate the well. This pressure could further cause the flapper to reopen, and thus the wellbore tractor could continue its travel in the counter flow direction.

In one variation, wellbore fluid flow causes the wellbore tractor to travel downhole. At the furthest distance of its travel a mechanism on the wellbore tractor deploys/closes and instantly the wellbore tractor has a much greater flow restriction. The wellbore fluid flow causes the wellbore tractor to move upward, wherein the wellbore tractor lands in the down most receptacle. The well pressure then builds and shifts a sleeve. As the wellbore tractor is self-releasing, it may then move to the next receptacle where the process is repeated.

In another variation, similar to that discussed in the paragraph above, the wellbore tractor travels downward with low flow and upward with high flow. Accordingly, manipulation at the surface could control the direction of movement of the wellbore tractor. In this embodiment, the wellbore tractor might land in a receptacle, wherein the receptacle triggers a change in the wellbore tractor. The wellbore tractor then seals off in the receptacle, and uphole/downhole pressure is utilized to shift the receptacle. In another variation, the pressure is used to set a packer being delivered downhole with the wellbore tractor. In another variation, a counting mechanism could be built into the wellbore tractor, and thus the counting mechanism could for example cause the device to set in a specific receptacle (e.g., the third receptacle).

The ability to log in horizontal sections is limited to tractor driven tools, coiled tubing logging, pump down tools, or tubing conveyed methods. Those interventions require some sort of rig, are limited in distance for evaluating the horizontal, and are expensive. Self-powered devices have previously been limited to battery-powered electrical motors. This disclosure additionally discloses how to build a self-powered wellbore tractor and focuses on the aspect where the wellbore tractor is used to log a wellbore. In one example, a logging instrument may be mechanically affixed to the tractor (or attached to the device). The wellbore tractor may then be placed in the well, and the wellbore fluid is allowed to flow. The wellbore tractor may then spiral its way downhole and through the horizontal sections, logging the well as it goes. It can then get produced out of the hole, for example using a chute, or in another embodiment, the wellbore fluid alone. In another embodiment, the wellbore tractor traverses to the bottom of the well, and thus logs the formation as it travels back up to the surface.

Such a wellbore tractor may be used to provide a low-cost intervention to a wellbore. In one embodiment, the wellbore tractor is used to provide simple logging in a low-cost wellbore. The production flow causes the wellbore tractor to spiral into the wellbore. The wellbore tractor is carrying sensor electronics for logging the wellbore. The sensor electronics could include a power source (primary battery, secondary battery, or turbine generator) as well as either memory and/or a wireless transmitter. The wellbore tractor is logging as it spirals upstream. After the wellbore tractor has completed its mission, the memory is allowed to return to the surface. In one example, one or all of the wheels or the turbine dissolves and the sensor electronic package is produced back to the surface. In other examples, the entire tractor could dissolve and only the memory is released.

While a simple wellbore tractor would provide the function needed, it could be designed with a number of additional features/variations. For example, all or part of the wellbore tractor could dissolve, allowing the instrument package to return to the surface by wellbore flow. Alternatively, at the bottom of the well, the wellbore tractor could deploy a "chute" that results in wellbore fluid flow returning the wellbore tractor to the surface. In another variation, the wellbore tractor is partially composed of a syntactic foam which reduces the density of the wellbore tractor and more easily allows it to be produced to the surface.

In an alternative variation, vanes on the wellbore tractor are reversed and the wellbore tractor walks out of the well powered by well flow. This reversal could be initiated by:

increased flow, temperature, pressure, time, electronics, dissolution of a catch, etc. In another variation, the tilt of the wheels is revered and the wellbore tractor walks out of the well powered by well flow. This reversal could be initiated by: increased flow, temperature, pressure, time, electronics, dissolution of a catch, etc. In an alternative embodiment, the wellbore tractor includes a first section used to travel downhole and a second section used to travel uphole. In this embodiment, one of the sections might be disabled when the other is active.

In an alternative embodiment, a logging device coupled to the wellbore tractor transmits a signal as it logs and thus retrieval is optional. For example, the logging device could create an acoustic signal that is received by a distributed acoustic sensing (DAS) fiber optic cable or an acoustic signal that is received by an acoustic transceiver (e.g., DynaLink wireless telemetry). The logging device could create an electromagnetic (EM) signal that is received by an EM transducer.

The wellbore tractor can be designed to work in open hole, cased hole, or completion tubing. Moreover, the wellbore tractor could be designed so that gravity is allowed to propel the wellbore tractor downhole in vertical sections. For example, flow of wellbore fluid is stopped in the well when the wellbore tractor is inserted, the wellbore tractor "falls" to the horizontal section, then the flow of wellbore fluid is increased to propel the wellbore tool further downhole through the horizontal section.

While the array of logging applications performed with a wellbore tractor according to the disclosure is only limited by the logging instrumentation, there are certain applications that are very well suited for this type of wellbore tractor. For example, such a wellbore tractor may be used to survey along the length of the wellbore for temperature, flow composition, flow rate, flow noise, or pressure, or may be used to survey valve position, component health, wellbore health, scale formation, corrosion, leaks, etc. In another application, the wellbore tractor goes downhole and acts as seismic sensor for a thumper being driven at the surface, or in an alternative embodiment the wellbore tractor "pings" and the signal is interpreted at the surface.

In another application, the wellbore tractor takes one or more samples at various depths. Theses samples are recovered when the wellbore tractor is retrieved. A simple methodology would be for simple vacuum chambers to be fitted with a rupture disk and a onetime check valve. At the prescribed pressure, the disk ruptures and a sample is taken. The onetime check valve prevents fluid from entering and leaving the chamber after the initial sample is taken. Another methodology would be for the vacuum chamber inlets to be controlled by time. Yet another methodology would be for the vacuum chamber inlet to be controlled by temperature.

Additionally, intervention-less logging could be achieved in a subsea well. A remotely operated vehicle (ROV) could transfer the wellbore tractor to a lubricator. The lubricator would open the path to the well and gravity would place the wellbore tractor in the well. A "snatch" mechanism could be built into the lubricator to pull the wellbore tractor the last few feet into the lubricator.

The ability to communicate with downhole equipment and downhole sensors is difficult. Typically, communication is accomplished with an expensive wired cable or with power-intensive wireless communication. Reducing the distance for wireless communication will reduce the power consumption and can open new technologies for wireless data transfer. Reducing the wireless communication distance has been achieved by moving the transmitter and receiver closer to each other by lowering an acoustic transceiver on wireline, but this approach does not work in horizontal sections. Reducing the wireless transmission distance in horizontal sections requires the use of tractor driven, coiled tubing, pump down, or tubing conveyed methods which are all expensive and require a rig.

This disclosure also embodies the idea of achieving wireless communication by using a wellbore tractor that is mechanically powered by the production flow. This is a new class of wellbore tractor that propels itself without electricity. Basically, this is a wellbore tractor that swims against the flow in order to relay commands, data, and information.

This disclosure also focuses on the aspect where the wellbore tractor acts as a messenger to send or receive information in a well. In one example, the wellbore tractor is placed in the well, the wellbore fluid is allowed to flow, and thus the wellbore tractor spirals downhole (including horizontal sections). As the wellbore tractor passes other pieces of equipment information is broadcast and/or received. Once the message is transferred, the wellbore tractor may (or may not) return to the surface.

For example, a wellbore tractor according to the disclosure may be used to provide a low-cost wireless communication in a wellbore. In one embodiment, the wellbore tractor is used to carry data between a downhole location and the surface. The production flow causes the wellbore tractor to spiral into the wellbore. The wellbore tractor, in this embodiment, is carrying transceiver electronics for communicating with downhole tools in the wellbore. The transceiver electronics could include a power source (battery or turbine generator), a wireless transceiver, and support electronics. In one example, the wellbore tractor spirals upstream past the downhole tools, and as it passes the downhole tools it relays data with the tool. In one example, the transceiver electronics receives sensor data from a downhole flow sensor and transmits a new position command to an inflow control valve (ICV). After the wellbore tractor has completed its mission, the memory in the electronics is allowed to return to the surface so that the operator can receive the sensor data. In one example, the wheels and the turbine blades dissolve and the sensor electronic package is produced back to the surface. In other examples, the entire tractor could dissolve and only the memory is released.

In one application, the wellbore tractor carries the data entirely back to the surface. Alternatively, the wellbore tractor could carry the data back to a transmission hub where the hub sends the data back to the surface. The transmission hub could be a acoustic transmitter, such as the DynaLink communication system from Halliburton. The transmission hub could be a wired connection on an upper completion and the wellbore tractor is relaying data from the unwired lower completion to the wired upper completion. Finally, the transmission hub could be in the main bore and the wellbore tractor is carrying information out of a lateral.

Other applications also exist. In one example, the wellbore tractor carries information downhole and transfers it at the appropriate location. For example, the wellbore tractor tells the ICV to change setting, for example based upon instruction predetermined at the surface. In another embodiment, the wellbore tractor includes sensors that sense the well, and the wellbore tractor uses the information gained from traveling downhole, to tell the inflow control valve or the eICD wireless valve to readjust.

In an alternative embodiment, the wellbore tractor travels downhole and records RFID information as it logs. The wellbore tractor signals the RFID and receives information back. The downhole equipment can be completely passive with both the signal and receiving function contained within the wellbore tractor. The information for example can be like "ICD-4 is 25% open". This can also be accomplished with other magnetic, electrical, or electromagnetic transmission such as near field communication or radio signals. The short-hop wireless signal could also be acoustic or vibration based transmission. In another embodiment, the wellbore tractor uses RFID information as it logs, and processes that information so that it can tell other equipment what to do. For example, "Since ICD-4 is 25% open then close ICD-5 an additional 5%". In this embodiment, the wellbore tractor functions as a power source (e.g., broadcaster). For example, the wellbore tractor travels downhole transmitting a power source. While the downhole tools are passive, when the wellbore tractor is proximate thereto the downhole tools become active.

The application of wireline conveyed tools are limited by friction of the wirelines and need a tractor to enter a horizontal wellbore. While electrically-driven tractors have been developed for electrical wireline, equivalent tractors have not been developed for slickline or sandline. Theoretically, a battery-powered tractor could be developed but the operational life would be limited and the pulling power of a battery-powered tractor would be limited. Tractors for electrical wireline are expensive, heavy, and can only be placed at the end of the wireline. Thus, there is a need for a mechanically-driven wellbore tractor for wireline applications. There is also a need to be able to place these wellbore tractors not only at the end of the wireline but also at intermediate locations to help carry the weight of the wire.

One aspect of this idea is that some of the production flow energy can be used as propulsion for the wireline. One idea is for a wireline wellbore tractor to use wellbore flow to produce some if not all of its propulsion energy demand. The wellbore tractor can be used on the end of the wire, and furthermore a second wellbore tractor can be used as a clamp-on configuration to help support an intermediate location of the wireline and to help reduce the tension on the wire. Such wellbore tractors are likely to be very inexpensive, and in one embodiment the wellbore tractor is used to carry fiber optic cable into the internal diameter (ID) of the tubing. The fiber optic cable can use DTS and DAS to provide real-time understanding of the production, and deployment on the ID allows for installation after the well is operational and may be simpler and less expensive. For fiber optic deployment, the wellbore tractor could be considered a disposable item. In one application, the wellbore tractor dissolves downhole. In another application, the wellbore tractor serves as an anchor for the fiber optic cable.

One goal is for the wellbore tractor to drag the wire and slickline tools to the desired location in the well and through the horizontal section. After work is done, the slickline rig can retrieve the tool string and tractor. Means to accomplish this task and variations include, without limitation: A) The wellbore tractor runs past a sleeve and the wireline tool shift the sleeve when the device is retrieved. Specially designed spring loaded detent jars may be required to jar in the horizontal; B) A DPU device is attached to the slickline string to perform the desired work; C) The wellbore tractor shifts into reverse and helps retrieve the tool/wire; D) Multiple wellbore tractors pull the wire. For example, wellbore tractor devices could be added to the wire as it is unspooled into the well. The wellbore tractors may reverse, helping to retrieve the wire. For example, a wellbore tractor may be deployed every 1000 ft., among other locations. Optionally, a signal at the lubricator could signal the wellbore tractor to attach/detach from the wire.

Referring to FIGS. 1A through 1J, depicted are various different views of a well system 100 including an exemplary operating environment that the devices, apparatuses, systems, and methods disclosed herein may be employed. For example, the well system 100 could use one or more wellbore tractors, one or more wellbore tractor charging stations, one or more wellbore sensors, etc. according to any of the embodiments, aspects, applications, variations, designs, etc. disclosed in the preceding and/or following paragraphs. The illustrated well system 100 initially includes a wellbore 110. The illustrated wellbore 110 is a deviated wellbore that is formed to extend from a terranean surface 115 to a subterranean formation 120 (e.g., a hydrocarbon bearing geologic formation) and includes a vertical portion 125, a radius portion 130, and a horizontal portion 135. Although portions 125 and 135 are referred to as "vertical" and "horizontal," respectively, it should be appreciated that such wellbore portions may not be exactly vertical or horizontal, but instead may be substantially vertical or horizontal to account for drilling operations. Further, the wellbore 110 may be a cased well (e.g., thus, may include wellbore tubing 140), a working string or an open hole, and is of such length that it is shown broken.

Further, while the well system 100 depicted in FIGS. 1A through 1J is shown penetrating the terranean surface 115 on dry land, it should be understood that one or more of the apparatuses, systems and methods illustrated herein may alternatively be employed in other operational environments, such as within an offshore wellbore operational environment for example, a wellbore penetrating subterranean formation beneath a body of water.

Figure 1C:
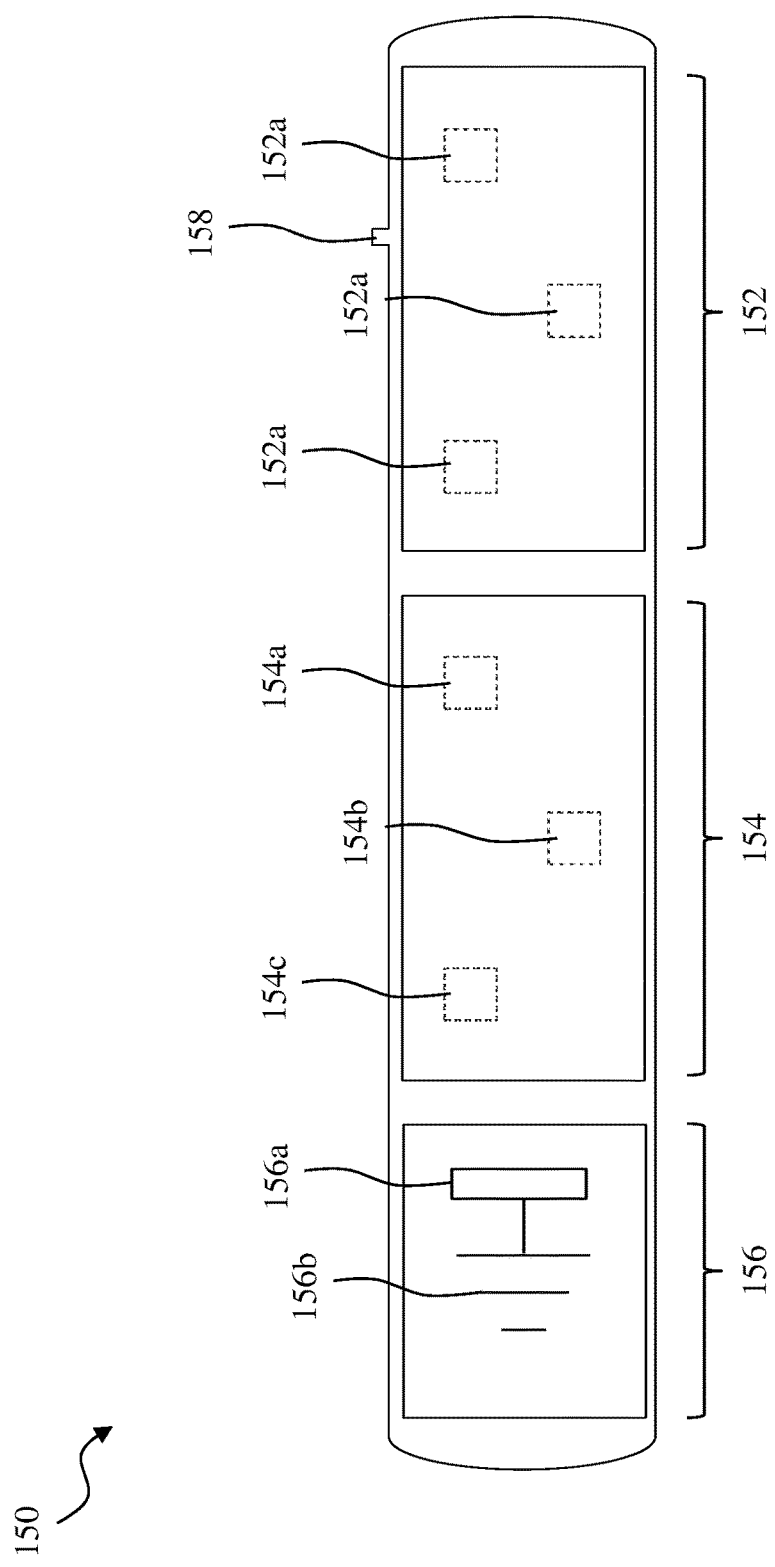
Figure 1D:
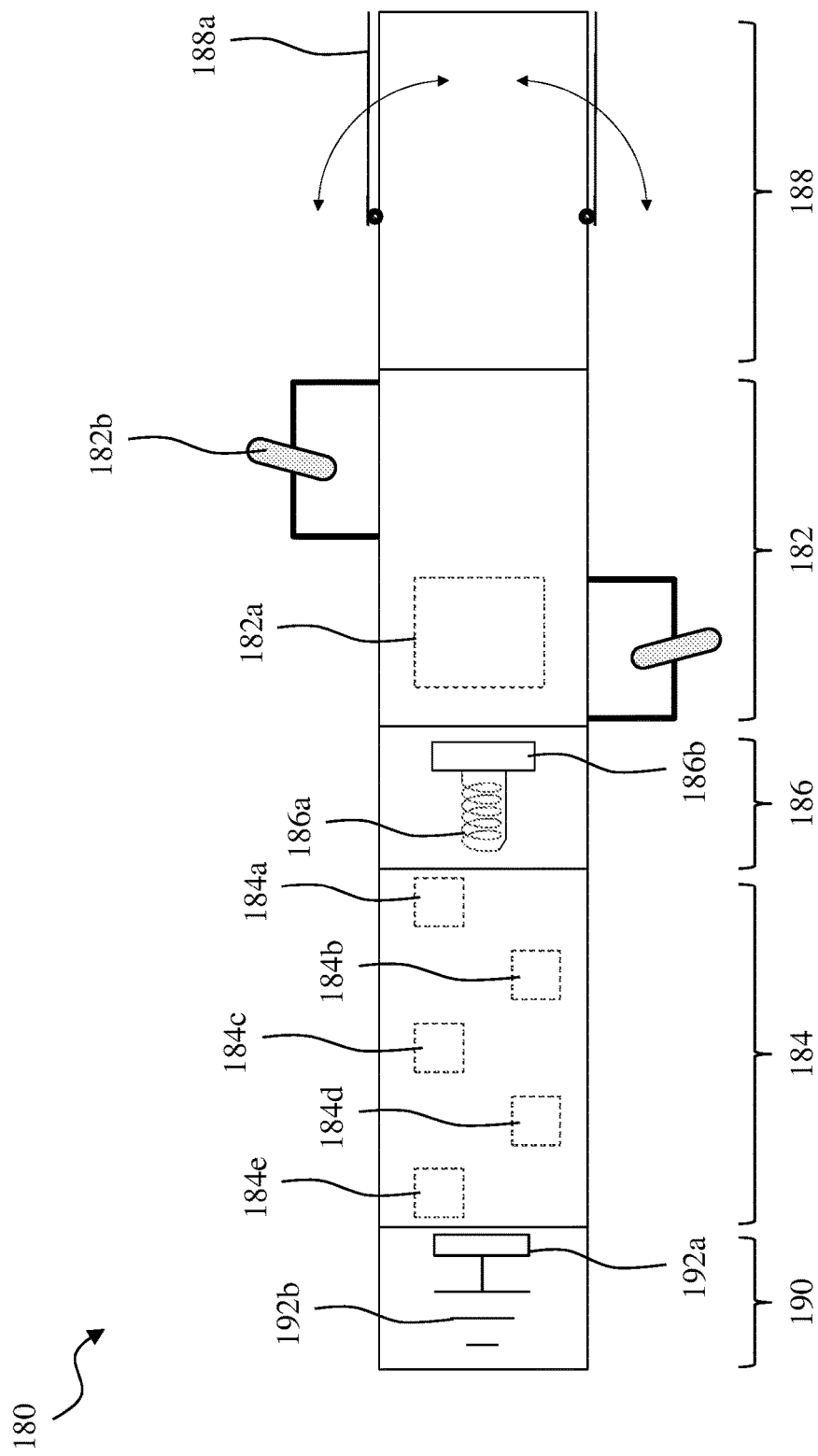
Figure 1E:
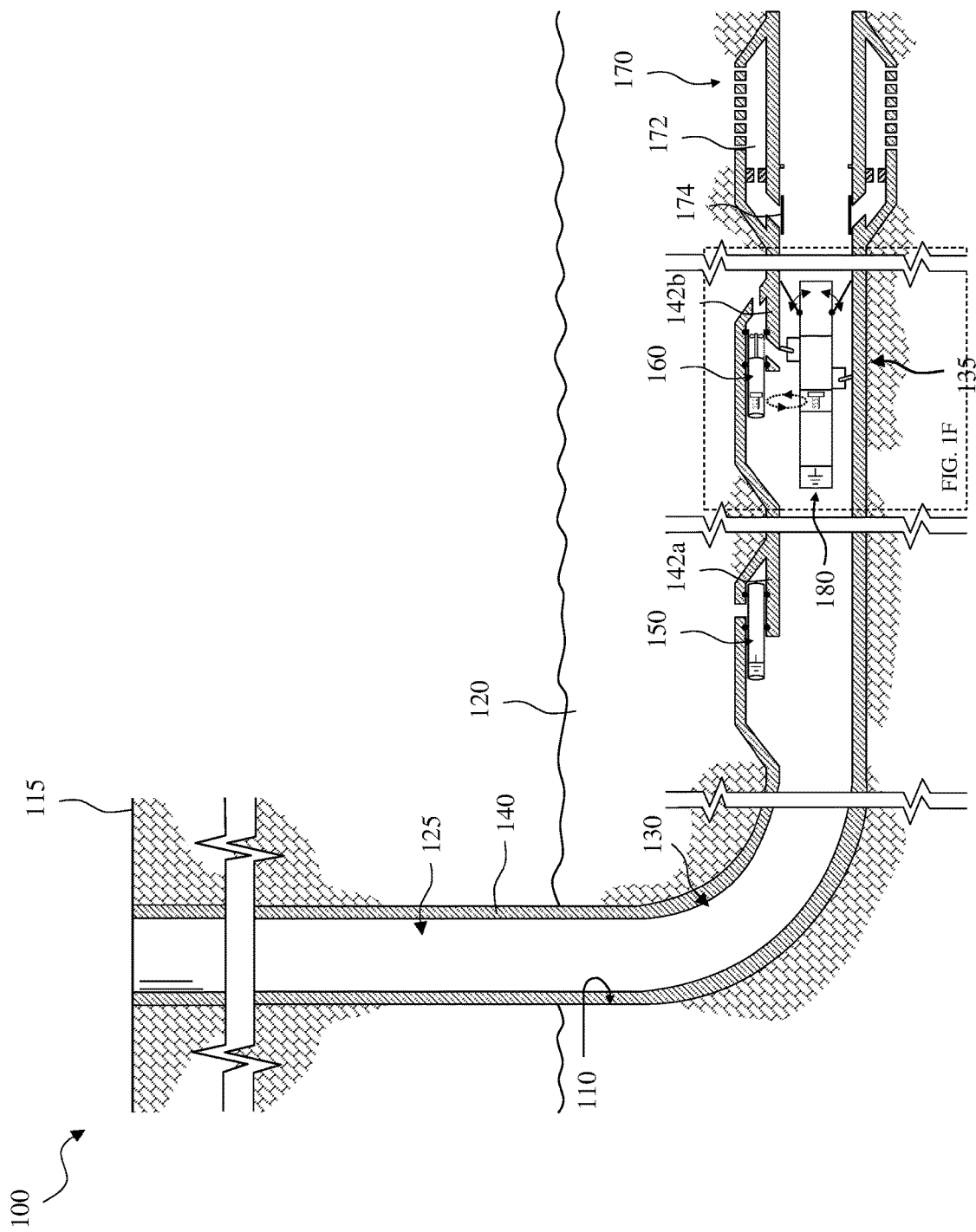

In the illustrated embodiment of FIGS. 1A through 1J, one or more wellbore sensors 150 designed, manufactured, and/or operated according to one or more aspects of the disclosure are positioned within the wellbore 110. The one or more wellbore sensors 150, as shown in FIGS. 1B and 1C, may include a sensor module 152 (e.g., including one or more sensors 152a, such as fluid flow, temperature, pressure, etc. sensors), a sensor electronics module 154 (e.g., including memory 154a, a processor 154b, and one or more batteries 154c, among other features), and a sensor communications module 156 (e.g., including sensor communications electronics 156a and a sensor communications antennae 156b). The batteries used throughout this disclosure, in one or more embodiments, are rechargeable batteries. Accordingly, in at least one embodiment, the one or more batteries employ a lithium metal chemistry, a lithium ion chemistry, a molten salt chemistry, a solid state battery chemistry, etc., among others.

In at least one embodiment, such as the embodiment of FIGS. 1A through 1J and more particularly FIG. 1B, the one or more wellbore sensors 150 are positioned (e.g., insert or removably insert) within a wellbore sensor sleeve portion 142a of a larger cross-sectional area of the wellbore tubular 140. In this embodiment, a wellbore sensor tubular opening 144a in the larger cross-sectional area of the wellbore tubular 140 provides the one or more wellbore sensors 150 access to the subterranean formation 120, including access to fluids within the subterranean formation 120. In at least one embodiment, a wellbore sensor valve 146 (e.g., a sliding sleeve in one embodiment) is configured to close the wellbore sensor tubular opening 144a when the one or more sensors 150 are not located therein, and then a wellbore sensor shoulder 158 of the one or more sensors 150 slides the wellbore sensor valve 146 out of the way as the one or more sensors 150 are being insert within the wellbore sensor sleeve portion 142a of the larger cross-sectional area of the wellbore tubular 140.

In one or more embodiments, as discussed in greater detail above, the one or more wellbore sensors 150 are one or more replaceable wellbore sensors, and furthermore may or may not be physically wired (e.g., for transmitting or receiving a signal, and/or transmitting or receiving power) to the surface 115 of the wellbore 110. In the embodiment wherein the one or more wellbore sensors 150 are not physically wired to the surface 115 of the wellbore 110, the one or more sensors 150 either self-generate their own power, or alternatively receive power from another downhole device traversing the wellbore 110 (e.g., a wellbore tractor designed according to the present disclosure). In the embodiment wherein the one or more wellbore sensors 150 are not physically wired to the surface 115 of the wellbore 110, the one or more sensors 150 may additionally transmit signals to or receive signals from (e.g., either wirelessly or wired) another downhole device traversing the wellbore 110, or alternatively use a wireless signal to transmit signals to or receive signals from the surface 115 of the wellbore 110.

In yet another embodiment, the one or more sensors 150 are configured to self-generate their own power. Accordingly, the one or more sensors 150 may use similar mechanisms and/or features to self-generate their own power, as might be used for the one or more wellbore tractor charging stations disclosed herein.

Thus, according to one embodiment, the one or more sensor modules include a sensor module, the sensor module configured to sense one or more properties in or around a wellbore extending through one or more subterranean formations, a sensor electronics module coupled to the sensor module, the sensor electronics module including one or more batteries, and a sensor power transfer module coupled to the sensor electronics module, the sensor power transfer module configured to receive power from a wellbore device traversing the wellbore and transfer it to the one or more batteries for powering the sensor module. In at least one embodiment, a sensor communications module is coupled to the sensor electronics module, the sensor communications model configured to transfer sensor readings from the sensor module outside of the wellbore sensor. In at least one embodiment, the sensor communications module is a wireless sensor communications module, and in at least one other embodiment the sensor communications module is further configured to receive an instruction signal from a wellbore device traversing the wellbore. In at least one embodiment, the sensor power transfer module receives the power from the wellbore device traversing the wellbore using a wireless signal. In yet another embodiment, the wellbore sensor is a replaceable wellbore sensor.

In the illustrated embodiment of FIGS. 1A through 1J, one or more wellbore tractor charging stations 160 designed, manufactured and/or operated according to one or more embodiments of the disclosure are positioned within the wellbore 110. The one or more wellbore tractor charging stations 160, in one or more embodiments, may include a charging station power generation module 162. In one or more embodiments, the charging station power generation module 162 is configured to self-generate power that may then be transferred to a wellbore tractor located within the wellbore 110. In one or more embodiments, the charging station power generation module 162 is a fluid turbine generator, and thus includes a turbine portion 162a and a generation portion 162b. In yet another embodiment, the charging station power generation module 162 is a vortex shedding generator, and thus would include a vortex portion. While the charging station power generation module 162 has been illustrated and described as a fluid turbine generator or a vortex shedding generator, those skilled in the art understand that other charging station power generation techniques (e.g., self-power generation techniques) may be used and remain within the scope of the disclosure.

The one or more wellbore tractor charging stations 160, in one or more embodiments, may additionally include a charging station power transfer module 164 coupled to the charging station power generation module 162. In at least one embodiment, the charging station power transfer module 164 is configured to transfer the power generated by the charging station power generation module 162 to a wellbore tractor while the wellbore tractor is located within the wellbore 110. In one or more embodiments, the charging station power transfer module 164 is an electromagnetic charging station power transfer module, and thus may include a coil 164a and power transfer electronics 164b. In another embodiment, the electromagnetic charging station power transfer module is an inductive coupling charging station power transfer module. In yet another embodiment, the electromagnetic charging station power transfer module is a capacitive coupling charging station power transfer module. While an inductive coupling charging station power transfer module and a capacitive coupling charging station power transfer module have been disclosed as two potential alternatives, those skilled in the art understand that other wireless power transfer mechanisms could be used and remain within the scope of the disclosure. As will be discussed in greater detail below, other embodiments may also exist wherein the charging station power transfer module 164 is a wired (e.g., as opposed to wireless) power transfer module. Accordingly, unless otherwise required, the present disclosure is not limited to a wireless charging station power transfer module.

The one or more wellbore tractor charging stations 160, in one or more embodiments, may additionally include a charging station electronics module 166 coupled to the charging station power generation module 162 and the charging station power transfer module 164. In one or more embodiments, the charging station electronics module 166 includes a power conditioner 166a. For example, in one or more embodiments the power conditioner 166a includes an alternating current (AC) to direct current (DC) converter. In at least one other embodiment, the charging station electronics module 166 additionally includes a battery source 166b coupled between the power conditioner 166a (e.g., the alternating current (AC) to direct current (DC) converter) and the charging station power transfer module 164. In one or more embodiments, the charging station electronics module 166 additionally includes a direct current (DC) to alternating current (AC) converter 166c located between the battery source 166b and the charging station power transfer module 164. In this one example embodiment, the charging station power transfer module 164 is configured to receive alternating current (AC) power received from the direct current (DC) to alternating current (AC) converter 166c and transfer it to the wellbore tractor while the wellbore tractor is located within a wellbore.

In at least one embodiment, the AC current is specifically chosen. For example, in at least one embodiment the AC current is chosen such that the system may operate at or near an electrical resonant peak. In this example embodiment, the electrical resonance is an excitation frequency of the electrical circuit such that the amplitude of the AC current is maximized or the electrical resistance of the AC converter is minimized. The electrical resonance can be an electrical resonance within the power transfer module 164, an electrical resonance within an associated wellbore tractor, or an electrical resonance of the transfer system (transmit+receive), among others.

Thus, in the example embodiment, the charging station power generation module 162 employs fluid to rotate the turbine portion 162a, which in turn causes the generation portion 162b to generate AC power. This AC power is then converted to DC power by way of the power conditioner 166a (e.g., the alternating current (AC) to direct current (DC) converter), and thereafter stored in the battery source 166b. Thereafter, when power is needed to charge the wellbore tractor, the stored DC power of the battery source 166b is converted back to AC power via the direct current (DC) to alternating current (AC) converter 166c, and then transferred to the wellbore tractor using the charging station power transfer module 164.

In at least one other embodiment, the charging station electronics module 166 does not include a battery source 166b, wherein there would be no specific requirement for the power conditioner 166a (e.g., the alternating current (AC) to direct current (DC) converter) and direct current (DC) to alternating current (AC) converter 166c. In this embodiment, AC power generated by the charging station power generation module 162 could be transferred directly to the wellbore tractor via the charging station power transfer module 164 (e.g., without any needed conversion to DC power). The charging station electronics module 166, in one or more other embodiments, may further include memory 166d and one or more processors 166e, as may be needed for intelligent operation of the wellbore tractor charging station 160.

The well tractor charging station 160, in at least one embodiment, may additionally include a redirector (e.g., such as a shroud 168) that is positioned about the turbine portion 162a. In at least one embodiment, the shroud 168 forces the fluid past the turbine portion 162a prior to the fluid being allowed to exit the shroud 168 using one or more shroud openings 169 therein.

Figure 1F:
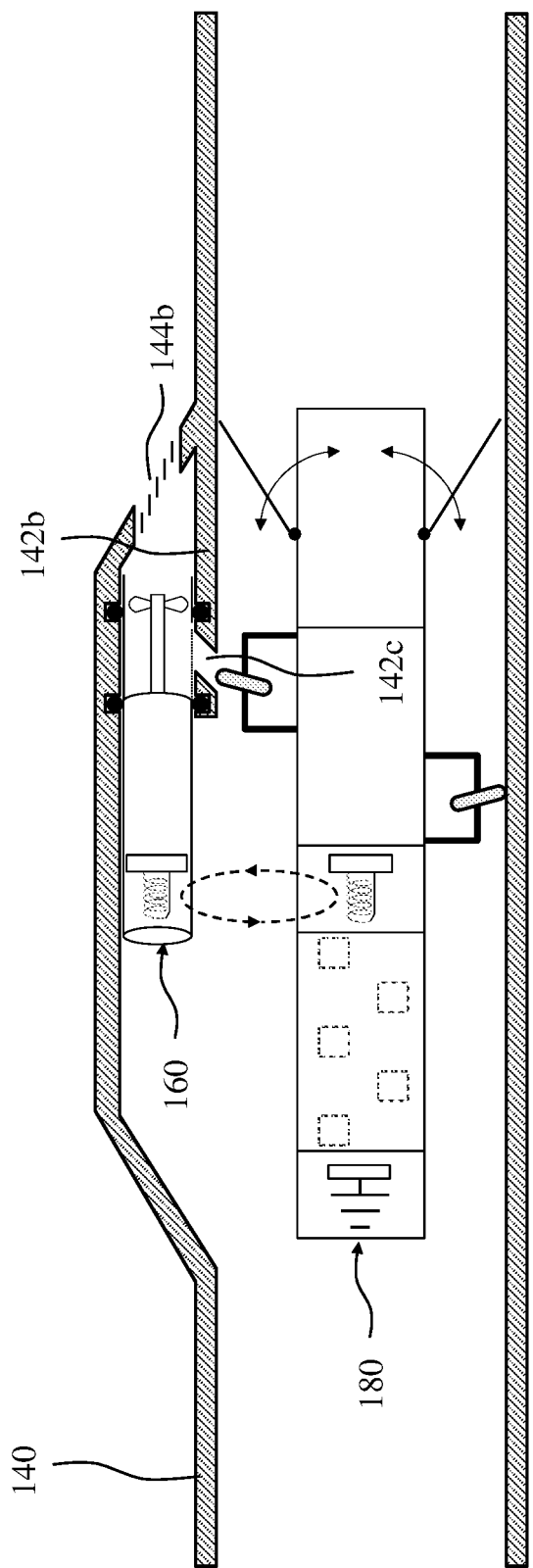
Figure 1G:
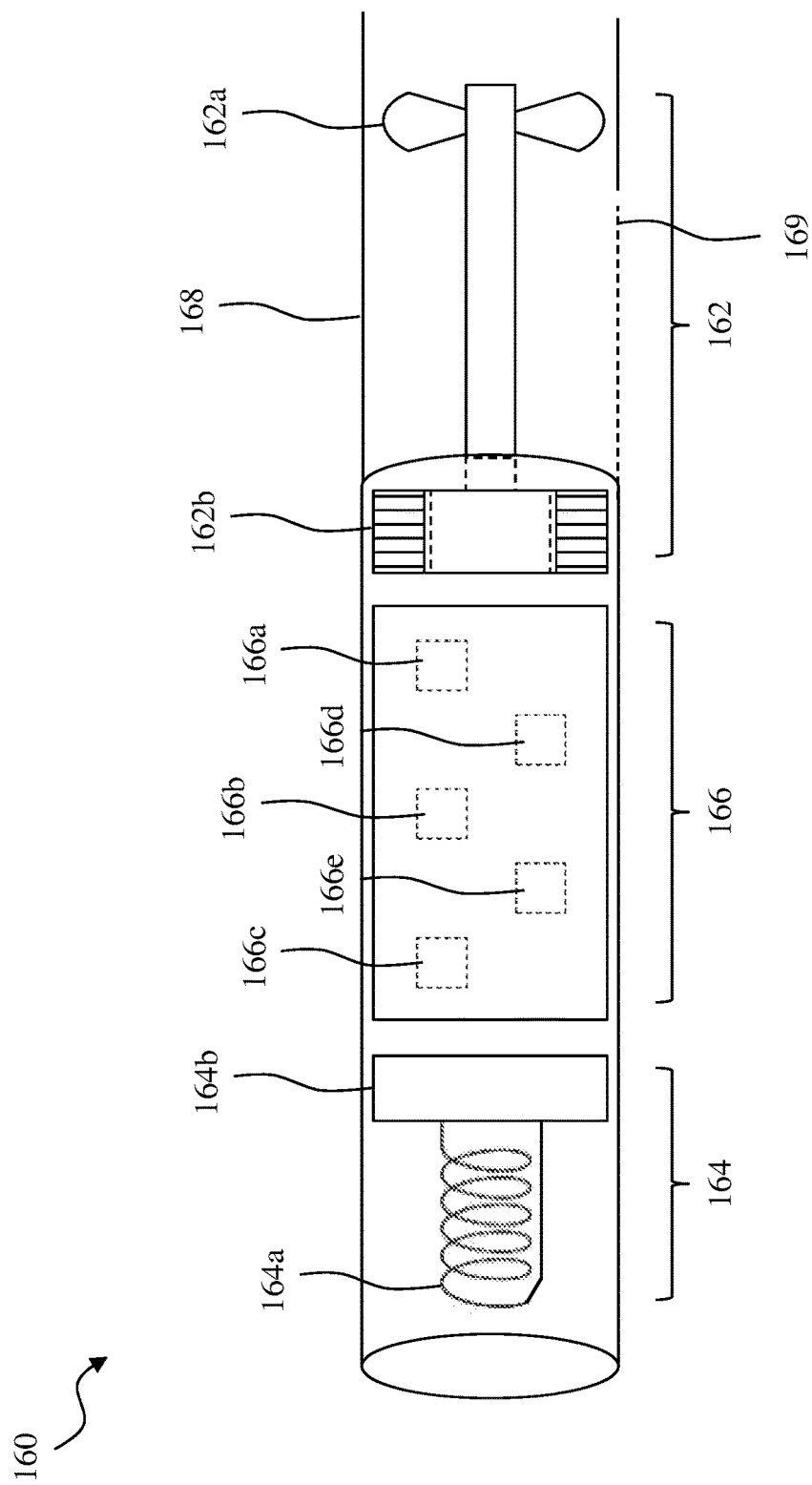

In at least one embodiment, such as the embodiment of FIGS. 1A through 1J, and more particularly FIG. 1F, the one or more wellbore tractor charging stations 160 are coupled to the wellbore tubing 140. For example, in the illustrated embodiment, the one or more wellbore tractor charging stations 160 are located along an inside surface of the wellbore tubing 140. For example, in at least one embodiment, the one or more wellbore tractor charging stations 160 are positioned (e.g., insert) within a charging station sleeve portion 142b of a larger cross-sectional area of the wellbore tubular 140, a charging station opening 144b in the larger cross-sectional area of the wellbore tubular 140 providing the one or more wellbore charging stations 160 access to the subterranean formation 120, including access to fluids within the subterranean formation 120. In this embodiment, the charging station sleeve portion 142b might include a charging station sleeve opening 142c extending through a sidewall thereof (e.g., at least partially aligned with the one or more shroud openings 169 in the shroud 168 when the wellbore tractor charging station 160 is positioned within the charging station sleeve portion 142b). Thus, in this specific embodiment, fluid flow would enter the charging station sleeve portion 142b via the charging station opening 144b, be redirected over the turbine portion 162a by the shroud 168 (e.g., causing the charging station power generation module 162 to generate power) and out of the one or more shroud openings 169, wherein the fluid flow could exit into the wellbore tubular 140 via the charging station sleeve opening 142c.

In the illustrated embodiment of FIGS. 1A through 1J, the well system 100 additionally includes one or more actionable devices 170 located within the wellbore 110. In the illustrated embodiment of FIGS. 1A through 1J, the one or more actionable devices 170 include one or more adjustable valves. The one or more adjustable valves may be any type of valve located within the wellbore 110 regardless of function. In at least one embodiment, the one or more adjustable valves are one or more adjustable flow type valves, such as one or more adjustable safety valves (e.g., sub surface safety valves (SSSVs)). In yet another embodiment, the one or more adjustable valves are one or more adjustable inflow control valves (ICVs), as might be used to allow or disallow fluid flow from the subterranean formation 120 surrounding the wellbore tubular 140 into the wellbore tubular 140. In the illustrated embodiment of FIGS. 1A through 1J, the one or more adjustable devices are one or more adjustable inflow control valves 172, for example including a sliding sleeve 174 for allowing, disallowing, or adjusting fluid flow into the wellbore tubular 140. In yet another embodiment, the one or more adjustable inflow control valves are adjusted by plugging them. For example, the well system 100 could detect a zone that is producing water and then place a patch to reduce/obstruct the flow. The patch can be a metal covering or a polymeric seal, among others.

While the one or more actionable devices 170 have been illustrated as one or more adjustable inflow control valves 172 in the embodiment of FIGS. 1A through 1J, the one or more actionable devices 170 may be any device that can be modified and/or adjusted (e.g., by way of a wellbore tractor) and remain within the scope of the present disclosure. For example, the one or more actionable devices 170 could be inflow control valves, annular barriers, tracers, corrosion inhibitors, scale inhibitors, etc., among others.

In the illustrated embodiment of FIGS. 1A through 1J, a wellbore tractor 180 designed, manufactured and/or operated according to one or more embodiments of the disclosure is located within the wellbore 110. The wellbore tractor 180, in accordance with one or more embodiments, includes a tractor drive module 182. In accordance with at least one embodiment, the tractor drive module 182 is configured to propel the wellbore tractor 180 within a wellbore 110 extending through one or more subterranean formations 120. For example, the tractor drive module 182 may have a motor 182a (e.g., electric motor in one embodiment) and one or more wheels 182b for propelling the wellbore tractor 180 within the wellbore 110.

In accordance with at least one other embodiment of the disclosure, the wellbore tractor 180 may additionally include a tractor electronics module 184 coupled to the tractor drive module 182, and a tractor power transfer module 186 coupled to the tractor electronics module 184. In at least one embodiment, the tractor electronics module 184 may include one or more batteries 184a, the one or more batteries 184a providing power for the motor 182a of the tractor drive module 182. In one or more embodiments, the tractor power transfer module 186 is configured to receive power from the wellbore tractor charging station 160 located within the wellbore 110 and transfer it to the one or more batteries 184a. In yet another embodiment, the tractor power transfer module 186 is configured to receive power from the wellbore tractor charging station 160 located within the wellbore and transfer it (e.g., either directly or from the one or more batteries 184*a*) to one or more wellbore sensors located within the wellbore 110 (e.g., the one or more wellbore sensors 150).

The tractor electronics module 184, in another embodiment, may further include a power conditioner 184*b* electrically coupled between the tractor power module 186 and the one or more batteries 184*a*. In yet another embodiment, the power conditioner 184*b* includes an alternating current (AC) to direct current (DC) converter, for example as may be necessary to convert the AC power from the wellbore tractor charging station 160 to DC power for the one or more batteries 184*a*. In even yet another embodiment, the tractor electronics module 184 may include memory 184*c* and a processor 184*d*, the memory 184*c* and processor 184*d* configured to allow the wellbore tractor 180 to autonomously move within the wellbore 110. Additionally, the tractor electronics module 184 may include a formation controller 184*e*, the memory 184*c*, the processor 184*d* and the formation controller 184*e* configured to employ a model of the wellbore 110 to undertake autonomous tasks within the wellbore 110.

The tractor power transfer module 186, in one or more embodiments, is an electromagnetic tractor power receive module, and thus may include a coil 186*a* and tractor power transfer electronics 186*b*. In another embodiment, the electromagnetic tractor power receive module is an inductive coupling tractor power receive module. In such an embodiment, one or more inductive covers may be located over the coils of the inductive coupling tractor power receive module. In at least one embodiment, the one or more inductive covers are one or more ferromagnetic covers. In such an embodiment, the one or more inductive covers would protect the inductive coils from degradation in the wellbore fluids. The one or more inductive covers can also be a nonferrous metal, such as a stainless steel or titanium, a polymer such as PEEK or HNBR, a ceramic, or a glass, among others. In yet another embodiment, the electromagnetic tractor power receive module is a capacitive coupling tractor power receive module. In such an embodiment, one or more capacitive covers may be located over the capacitive electrodes. In at least one embodiment, the one or more capacitive covers are non-metallic covers over the capacitive electrodes. The one or more capacitive covers protect the capacitive electrodes from electrochemical corrosion, while allowing electric field transmission. The one or more capacitive covers can be polymeric, such as PEEK or HNBR, or they can be a ceramic, or a glass, among others. While an inductive coupling tractor power receive module and a capacitive coupling tractor power receive module have been disclosed as two potential alternatives, those skilled in the art understand that other wireless tractor power transfer mechanisms could be used and remain within the scope of the disclosure. As will be discussed in greater detail below, other embodiments may also exist wherein the tractor power transfer module 186 is a wired (e.g., as opposed to wireless) tractor power transfer module. Accordingly, unless otherwise required, the present disclosure is not limited to a wireless tractor power transfer module.

In accordance with at least one other embodiment of the disclosure, the wellbore tractor 180 may additionally include a tractor manipulator module 188 coupled to the tractor drive module 182. In at least one embodiment, the tractor manipulator module 188 is configured to undertake one or more autonomous tasks within the wellbore 110. In the embodiment of FIGS. 1A through 1J, the tractor manipulator module 188 includes one or more deployable manipulator features 188*a*, as might be used to undertake the one or more autonomous tasks within the wellbore 110. In the illustrated embodiment of FIGS. 1A through 1J, the one or more deployable manipulator features 188*a* rotate to deploy, but in another embodiment the one or more deployable manipulator features 188*a* radially extend in a direction perpendicular to a length of the wellbore tractor 180 to deploy. In even yet another embodiment, the one or more deployable manipulator features 188*a* telescope to deploy.

In accordance with at least one more embodiment of the disclosure, the wellbore tractor 180 may additionally include a tractor communications module 190 coupled with the tractor electronics module 184. In at least one embodiment, the tractor communications module 190 is configured to allow the wellbore tractor 180 to transmit signals from the wellbore tractor 180 or receive signals to the wellbore tractor 180. Accordingly, in at least one embodiment, the tractor communications module 190 includes tractor communications electronics 192*a* and a tractor communications antenna 192*b*, among other features.

The embodiment of FIGS. 1A through 1J illustrates but one example of a method for operating the well system 100, for example such that the wellbore tractor 180 may move (e.g., roam in one embodiment) the wellbore 110 for an extended period of time. In at least one embodiment, as discussed above, the wellbore tractor 180 includes a tractor electronics module 184 that includes one or more batteries 184*a*, as well as memory 184*c*, a processor 184*d*, and a formation controller 184*e*. In one embodiment, the memory 184*c* and the processor 184*d* are configured to allow the wellbore tractor 180 to autonomously move within the wellbore 110, and in another embodiment, the memory 184*c*, the processor 184*d* and the formation controller 184*e* are configured to employ a model of the wellbore 110 to undertake one or more autonomous tasks within the wellbore 110. FIGS. 1A through 1D illustrate various different features of the well system 100 as the wellbore tractor 180 is engaging with a wellbore sensor 150. As shown, the wellbore tractor 180 is located (e.g., parked in one example) proximate the wellbore sensor 150. In this embodiment, the wellbore sensor 180 is transferring data that it has sensed from in and around the wellbore 110 to the wellbore tractor 180. This data may be any of the data discussed above, without limitation, and furthermore can be used to undertake the one or more autonomous tasks as discussed above. In the illustrated embodiment, the data is being transferred from the wellbore sensor 180 wirelessly, but as discussed above, a wired connection is within the scope of the present disclosure.

In contrast, FIGS. 1E through 1H illustrate various different features of the well system 100 as the wellbore tractor 180 is engaging with the wellbore tractor docking station 160. As shown, the wellbore tractor 180 is located (e.g., parked in one example) proximate the wellbore tractor docking station 160. In this embodiment, the wellbore tractor docking station 160 is transferring power (e.g., power that it has self-generated) to the wellbore tractor 180.

Figure 1H:
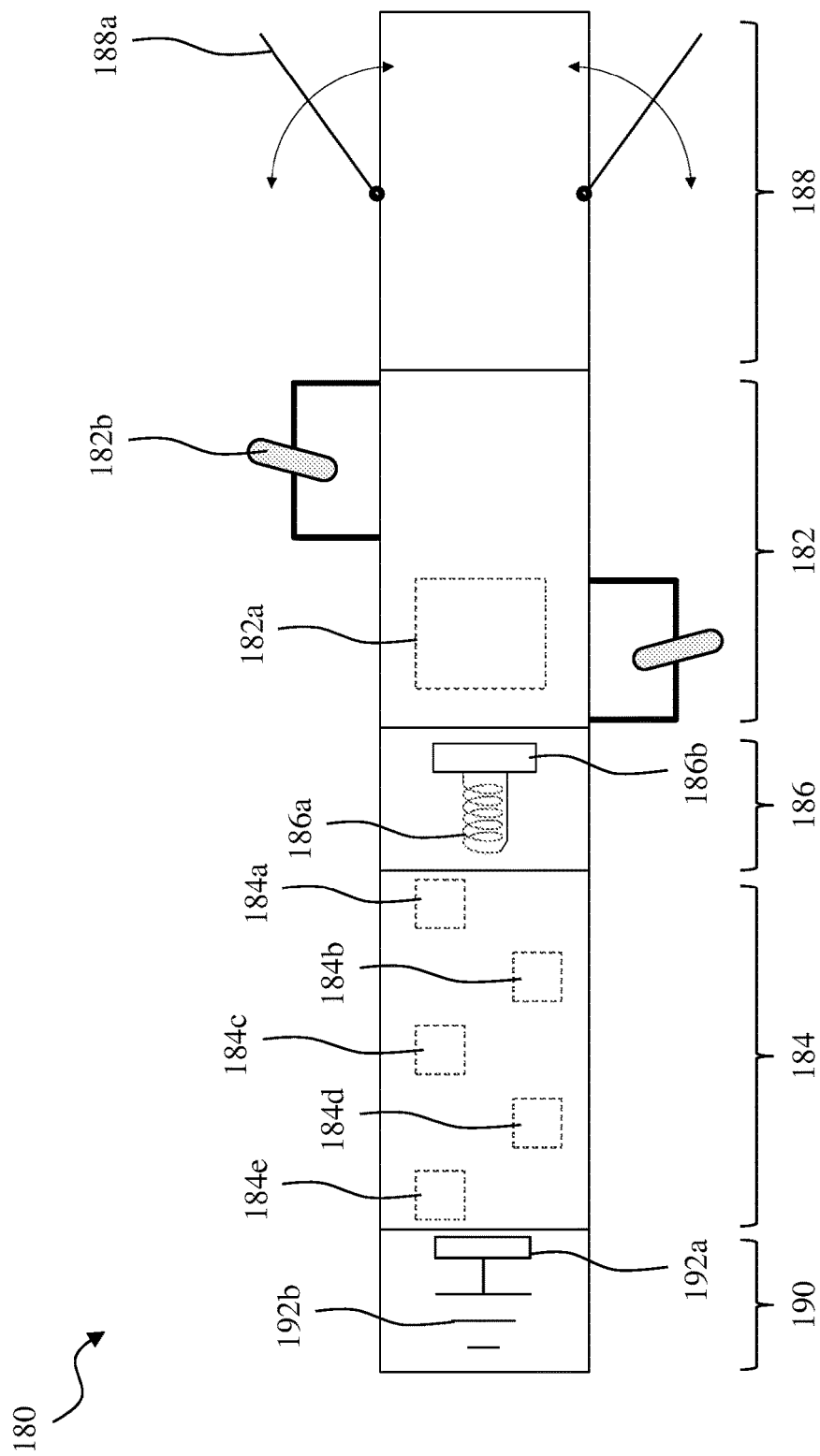
Figure 1I:
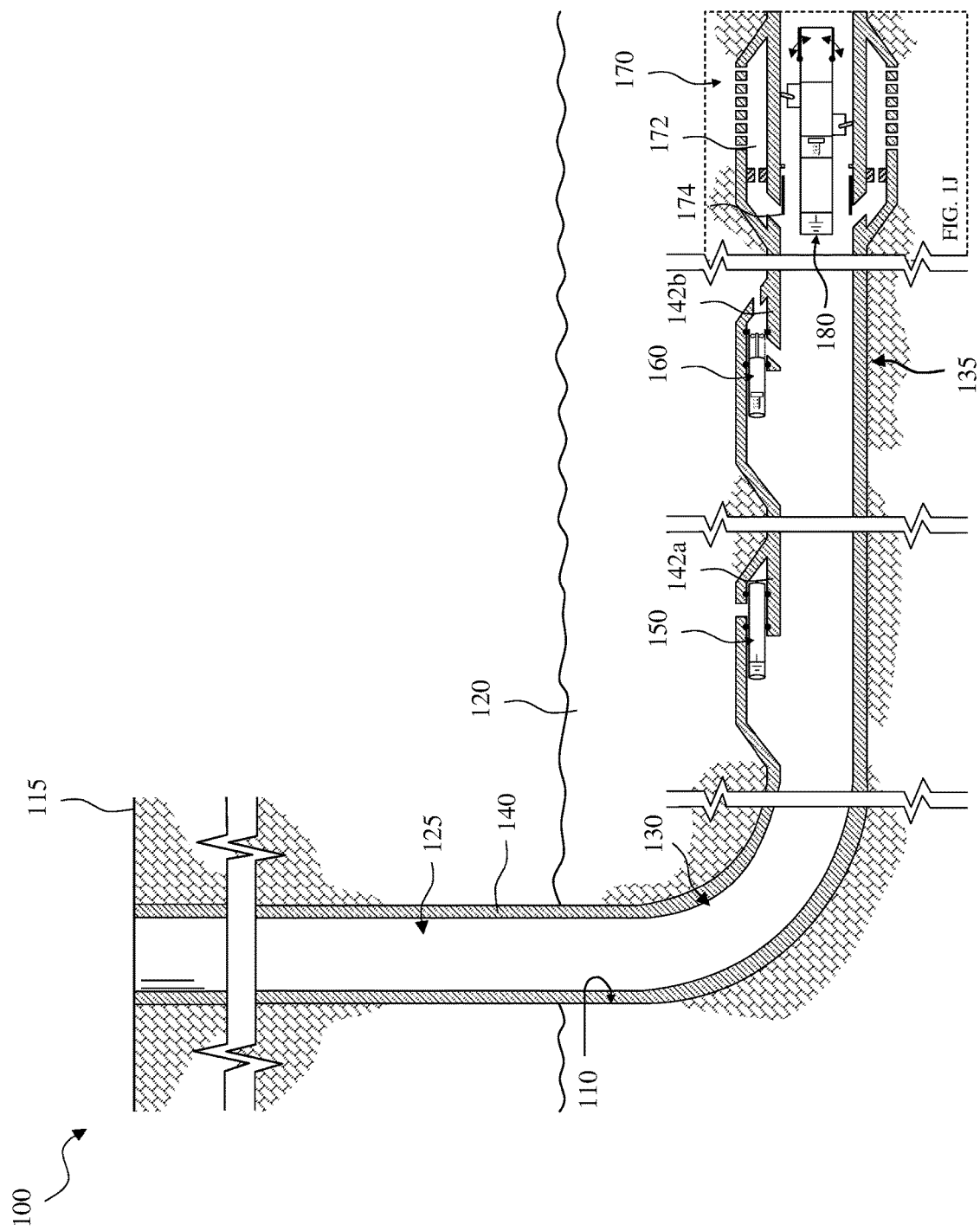
Figure 1J:
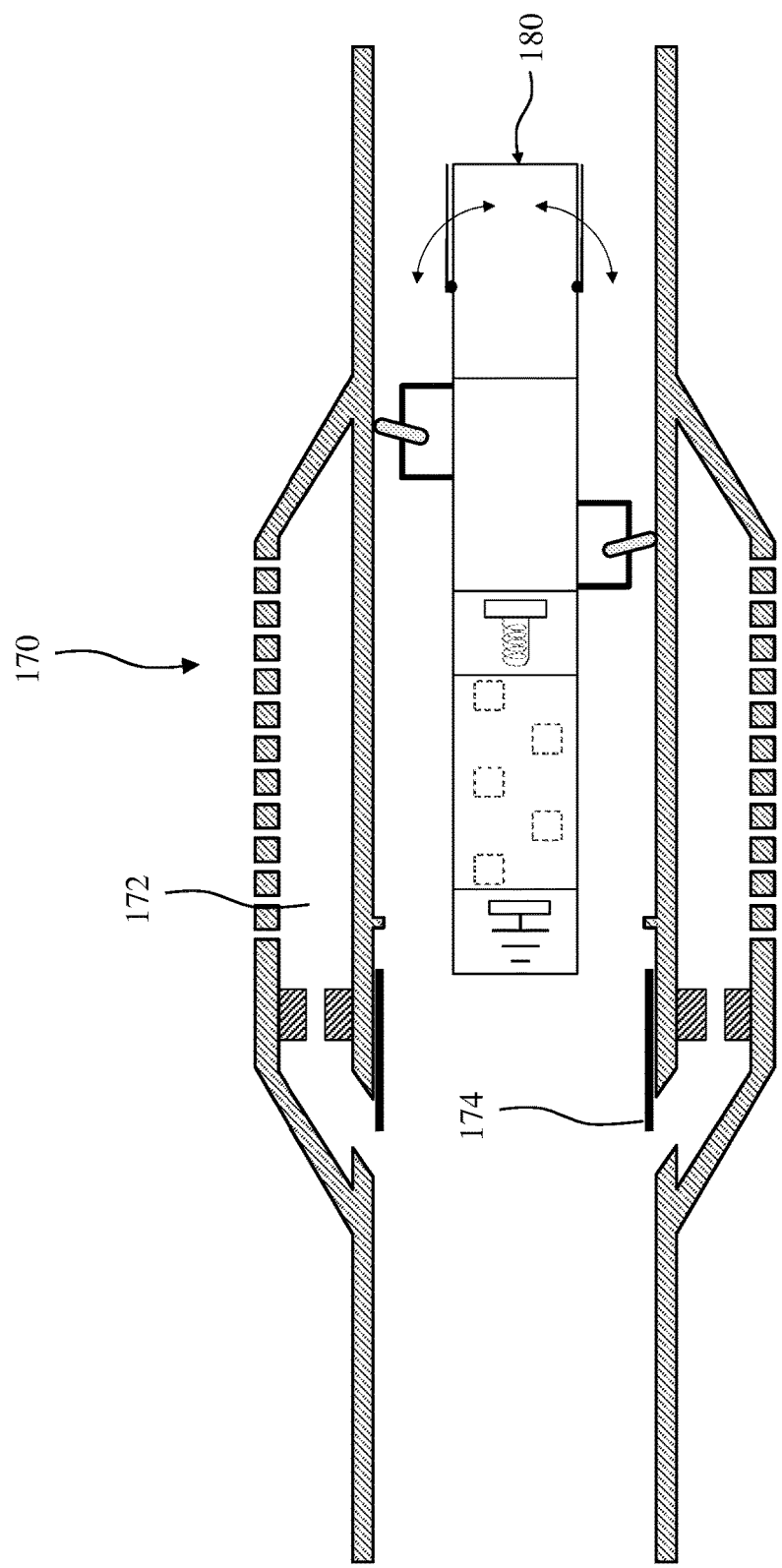
Figure 2A:
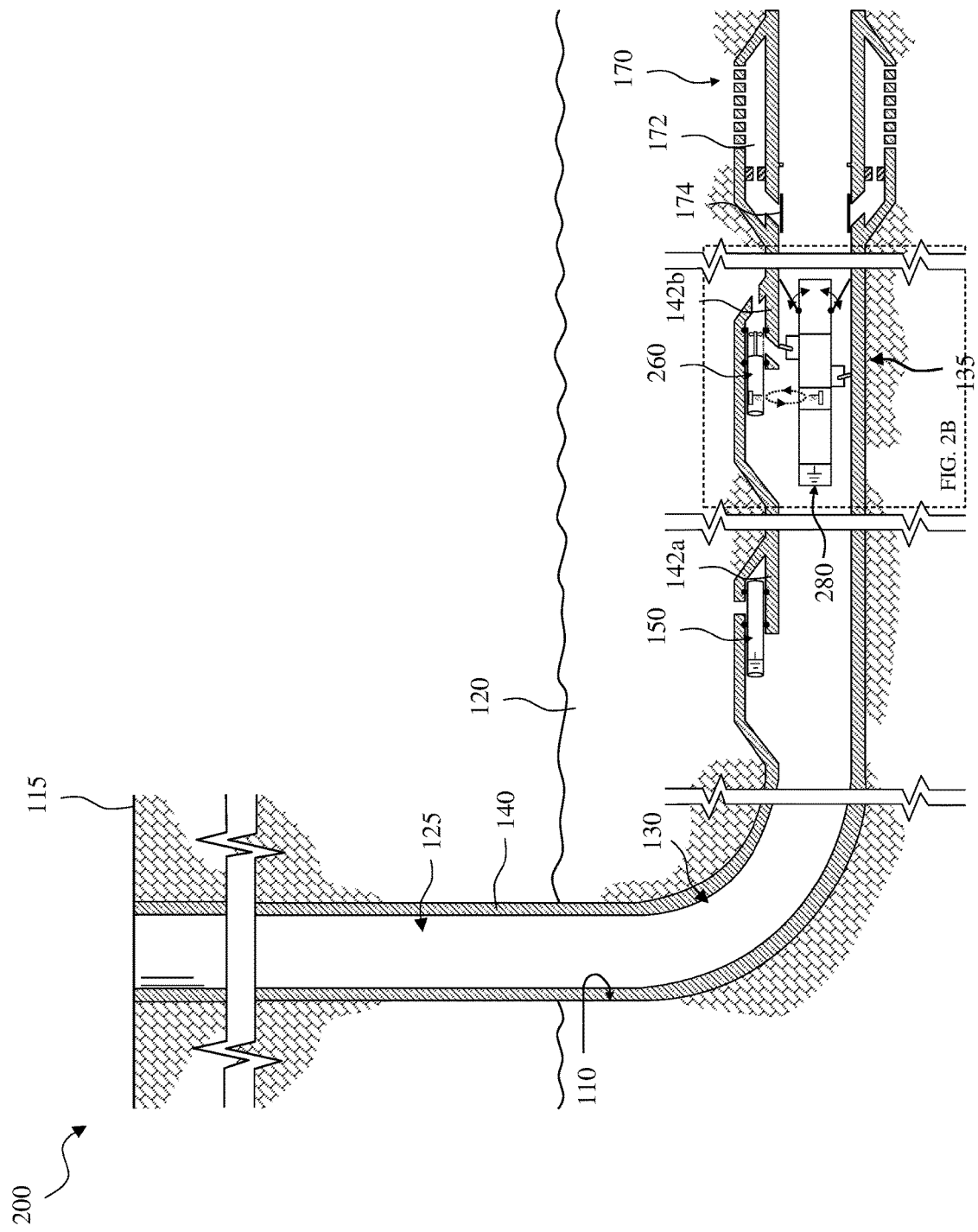
Figure 2B:
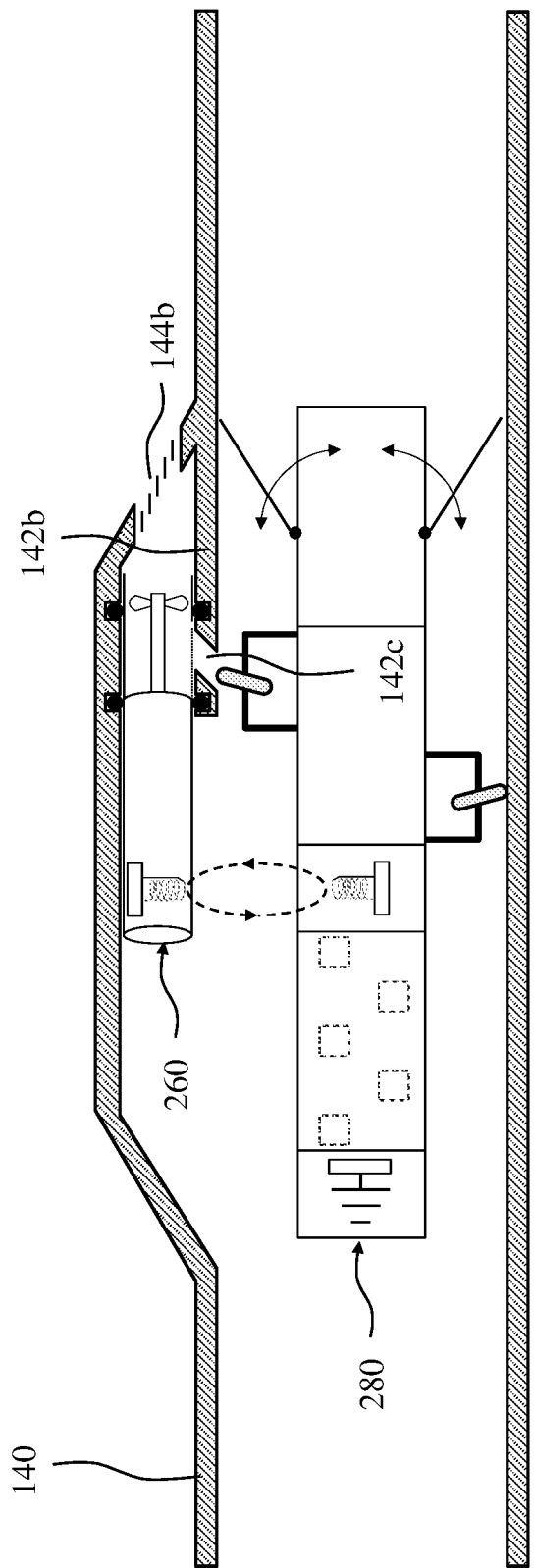
Figure 2C:
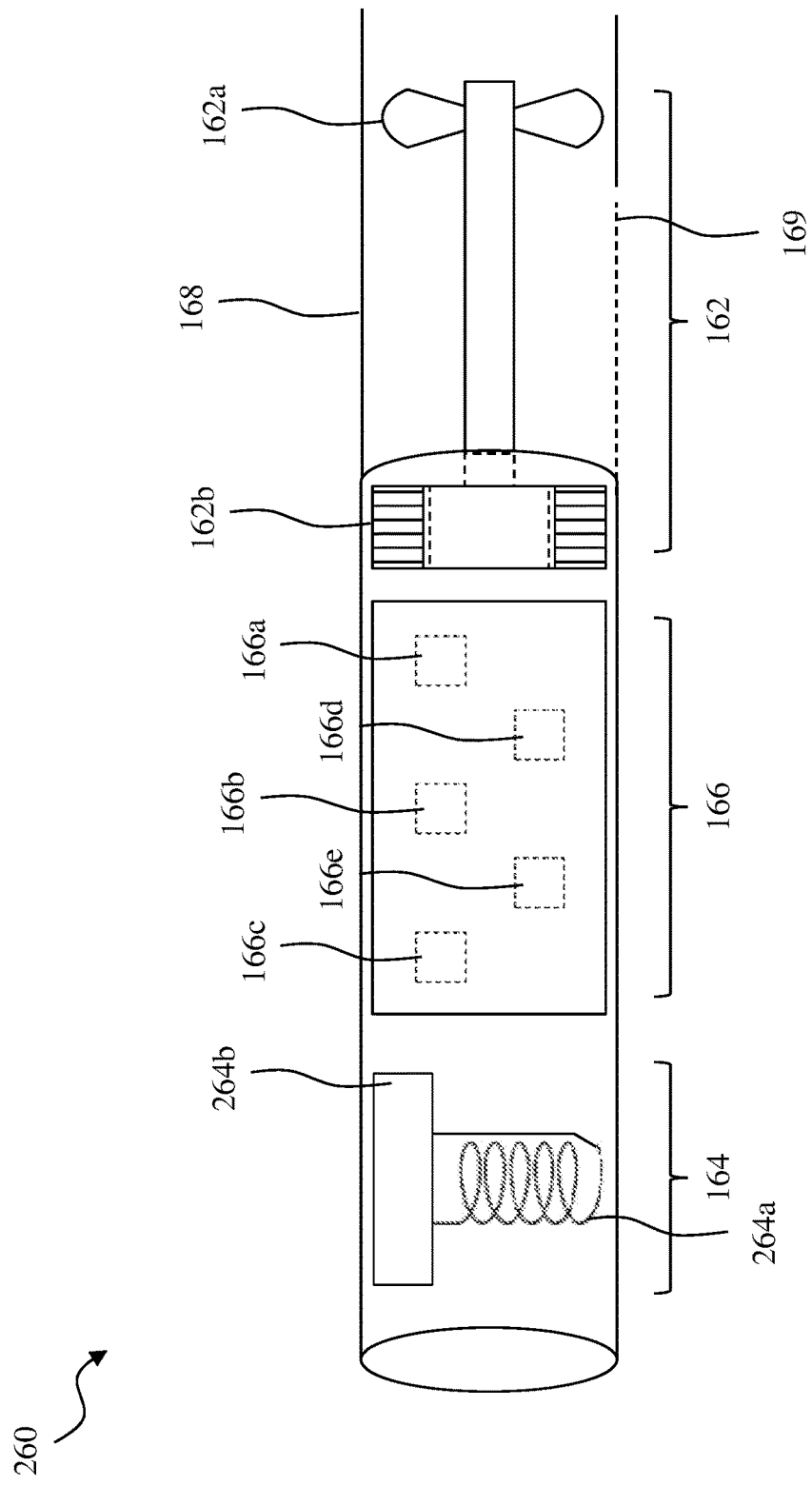
Figure 2D:
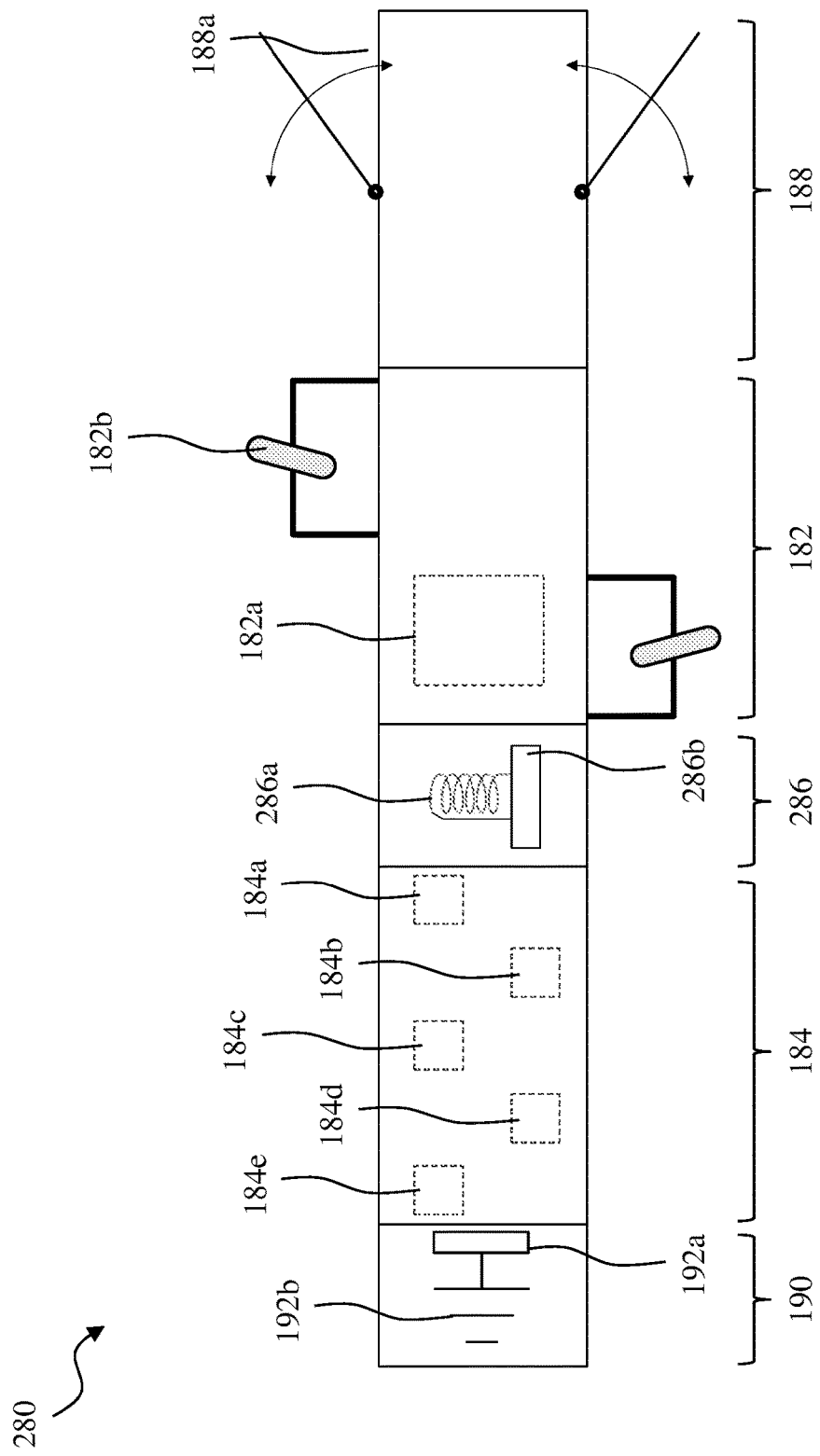

In contrast, FIGS. 1H through 1J illustrate various different features of the well system 100 as the wellbore tractor 180 is engaging with one or more actionable devices 170. In the illustrated embodiment, one or more deployable manipulator features 188*a* of the tractor manipulator module 188 are engaging with the sliding sleeve 174 to undertake one or more autonomous tasks within the wellbore 110. Further to the embodiment of FIGS. 1H and 1J, the sliding sleeve 174 is being adjusted based upon the data that the wellbore tractor 180 received and processed from the wellbore sensor 150. For example, in the illustrated embodiment, a model of the wellbore, along with the memory 184c, the processor 184d, and the formation controller 184e, along with the data received from the wellbore sensor 150, is being used to autonomously adjust the sliding sleeve 174.

While FIGS. 1H through 1J discuss the undertaking one or more autonomous tasks in light of shifting the sliding sleeve 174, any downhole task achievable by the wellbore tractor 180 is within the scope of the present disclosure For example, the downhole task could be manipulating one or more inflow control valves, annular barriers, tracers, corrosion inhibitors, scale inhibitors, etc., among others.

The process of the wellbore tractor 180 obtaining data from one or more sensors 150, obtaining power from one or more wellbore tractor docking stations 160, and undertaking one or more autonomous tasks within the wellbore 110, can be conducted in any particular order. In yet another embodiment, such tasks can be repeated time and time again, as the wellbore tractor 180 roams the wellbore 110. In reality, the wellbore tractor 180, or multiple wellbore tractors 180, could roam the wellbore 110 without stop for an entire life of the wellbore, sensing data from one or more wellbore sensors 150, recharging their batteries at one or more wellbore tractor charging stations 160, and autonomously adjusting one or more adjustable devices, as discussed in great detail above.

Turning to FIGS. 2A through 2D, illustrated is a well system 200 designed, manufactured and/or operated according to an alternative embodiment of the disclosure, for example using a wellbore tractor charging station 260 and/or wellbore tractor 280 designed, manufactured and/or operated according to an alternative embodiment of the disclosure. The well system 200, wellbore tractor charging station 260, and wellbore tractor 280 of FIGS. 2A through 2D are similar in many respects to the well system 100, wellbore tractor charging station 160 and wellbore tractor 180 of FIGS. 1A through 1J. Accordingly, like reference numbers have been used to indicate similar, if not identical, features.

The wellbore tractor charging station 260 of FIGS. 2A through 2D differs, for the most part, from the wellbore tractor charging station 160 of FIGS. 1A through 1J, in that the wellbore tractor charging station 260 employs a radial flux charging coil 264a, as opposed to the axial flux charging coil 164a of FIGS. 1A through 1J. Similarly, the wellbore tractor 280 of FIGS. 2A through 2D differs, for the most part, from the wellbore tractor 180 of FIGS. 1A through 1J, in that the wellbore tractor 280 employs a radial flux charging coil 286a, as opposed to the axial flux charging coil 186a of FIGS. 1A through 1J.

Turning to FIGS. 3A through 3D, illustrated is a well system 300 designed, manufactured and/or operated according to an alternative embodiment of the disclosure, for example using a wellbore tractor charging station 360 designed, manufactured and/or operated according to an alternative embodiment of the disclosure. The well system 300 and the wellbore tractor charging station 360 of FIGS. 3A through 3D are similar in many respects to the well system 100 and wellbore tractor charging station 160 of FIGS. 1A through 1J. Accordingly, like reference numbers have been used to indicate similar, if not identical, features.

Figure 3D:
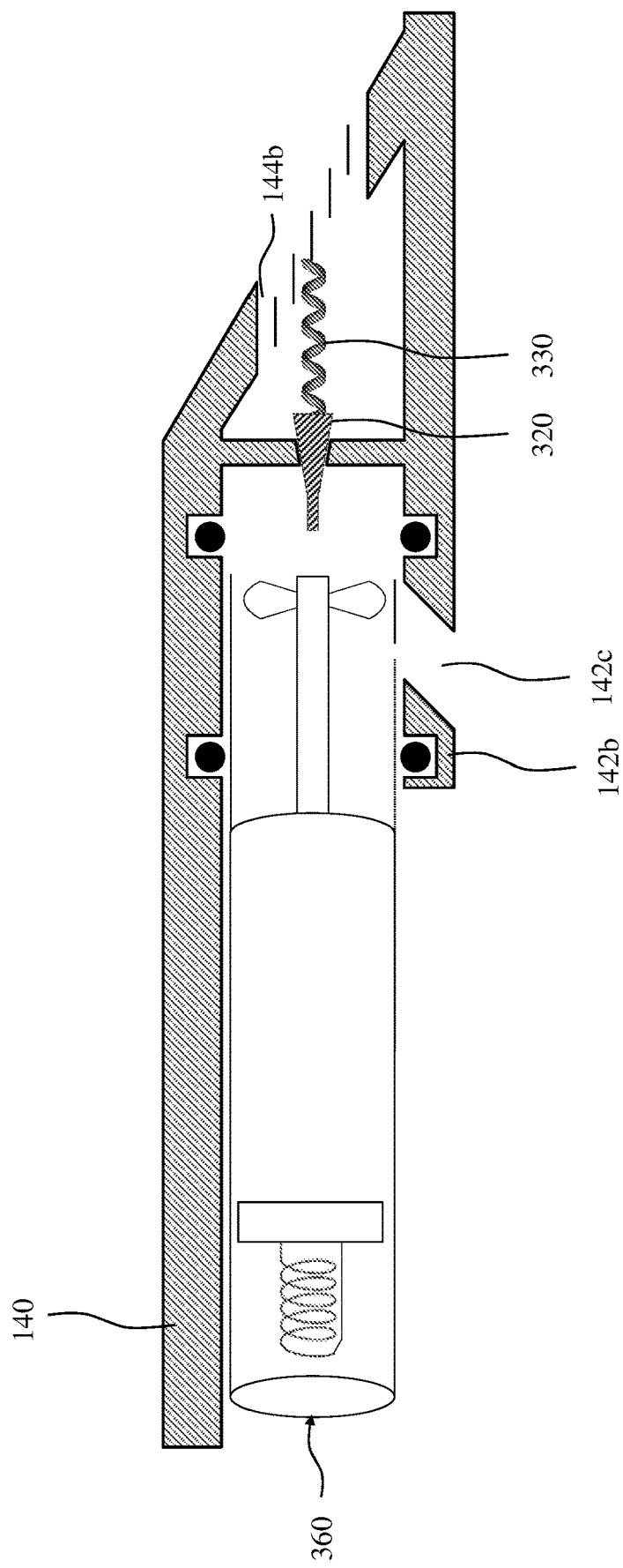
Figure 4A:
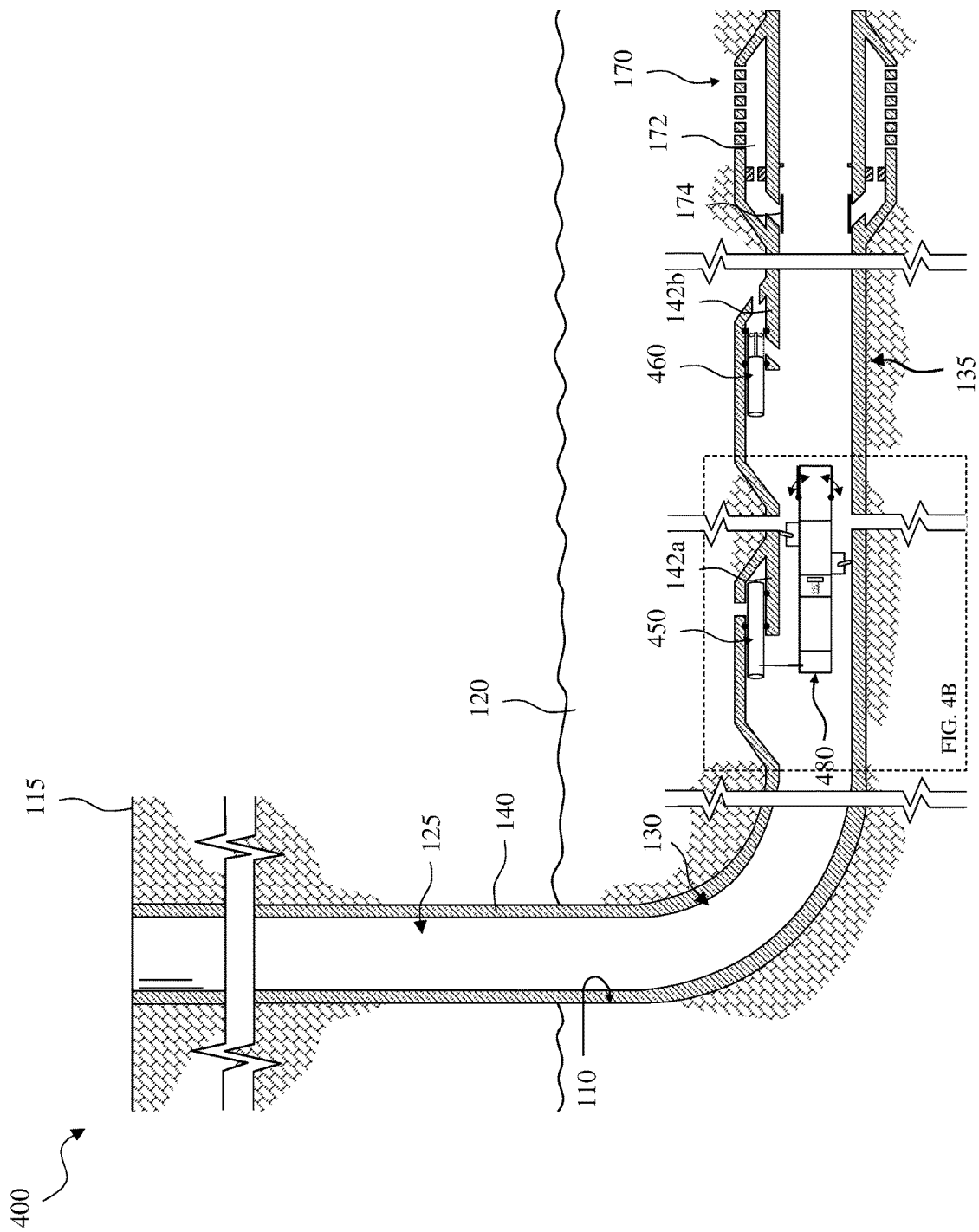
Figure 4B:
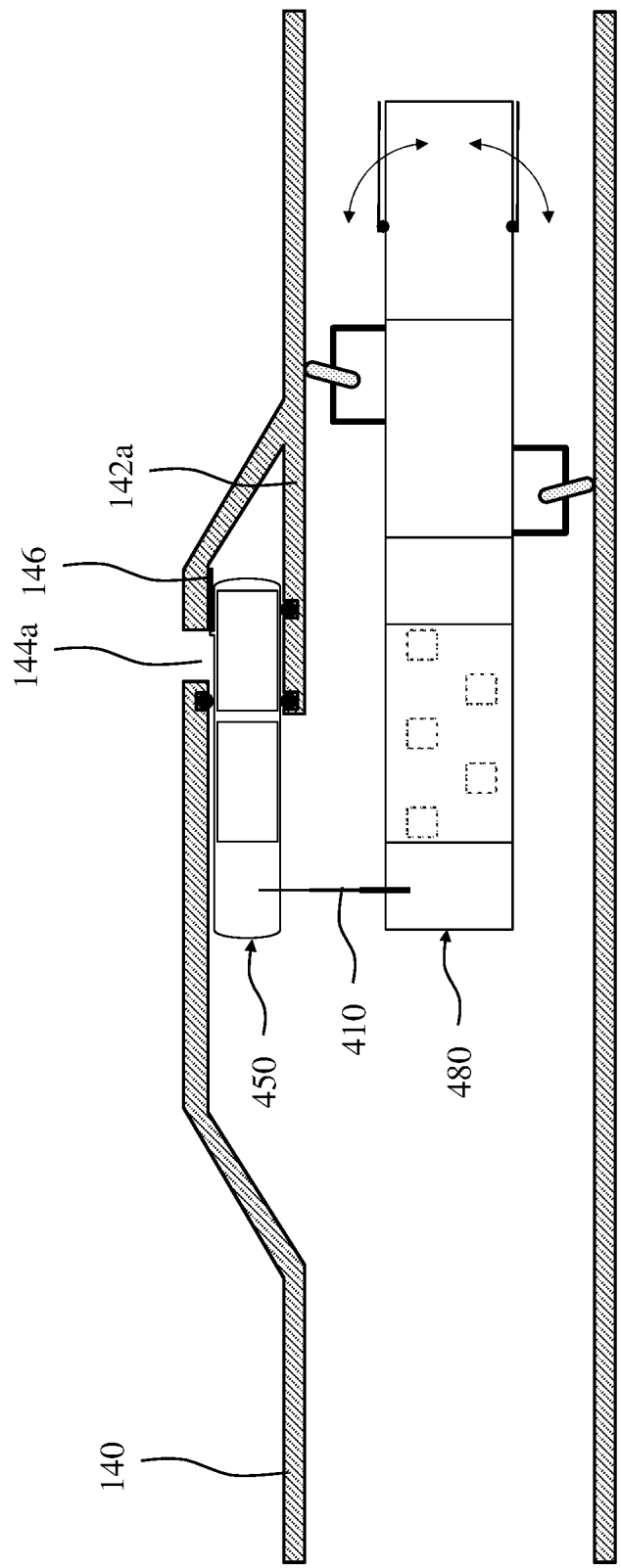
Figure 4C:
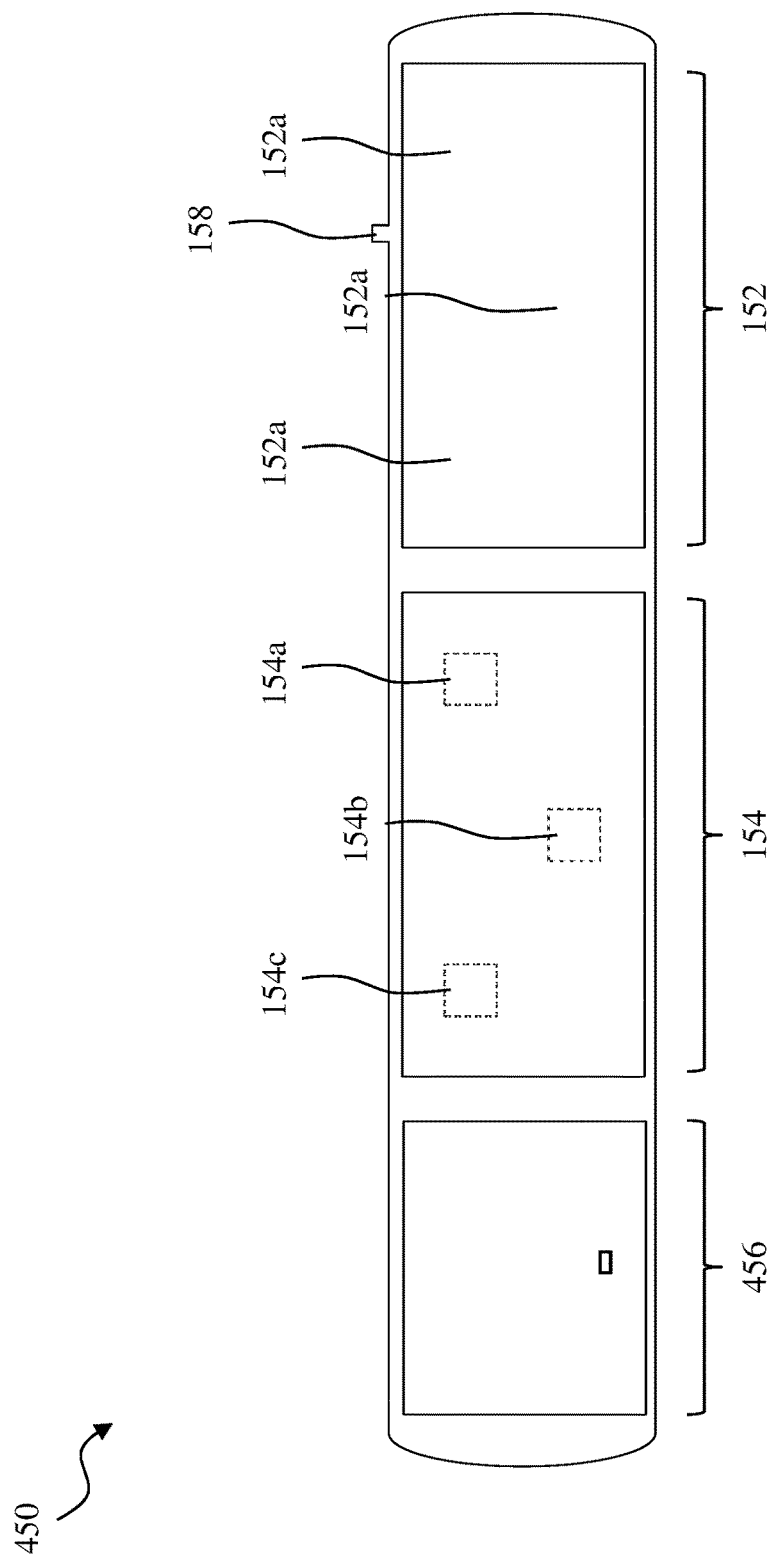
Figure 4D:
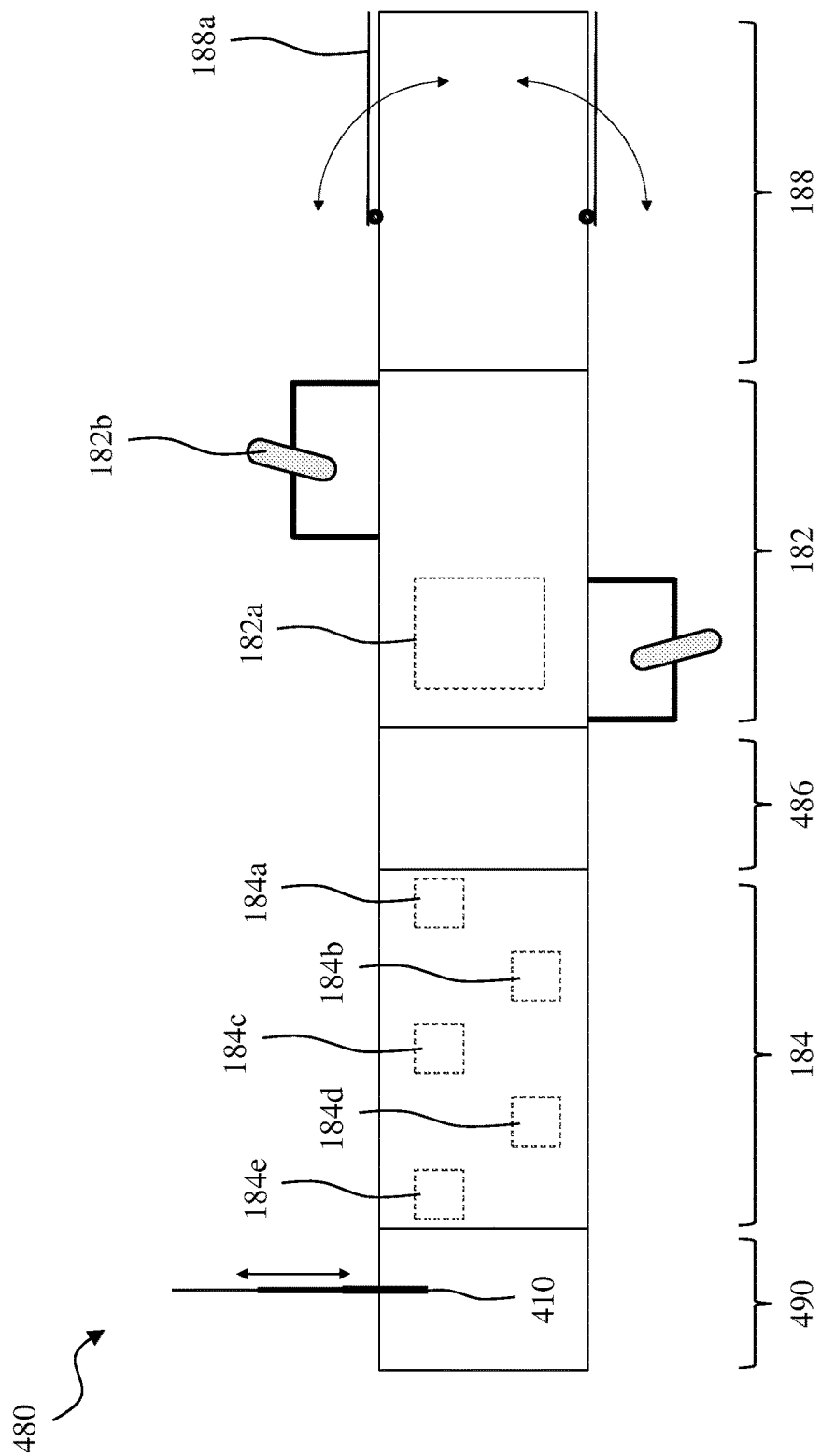
Figure 4E:
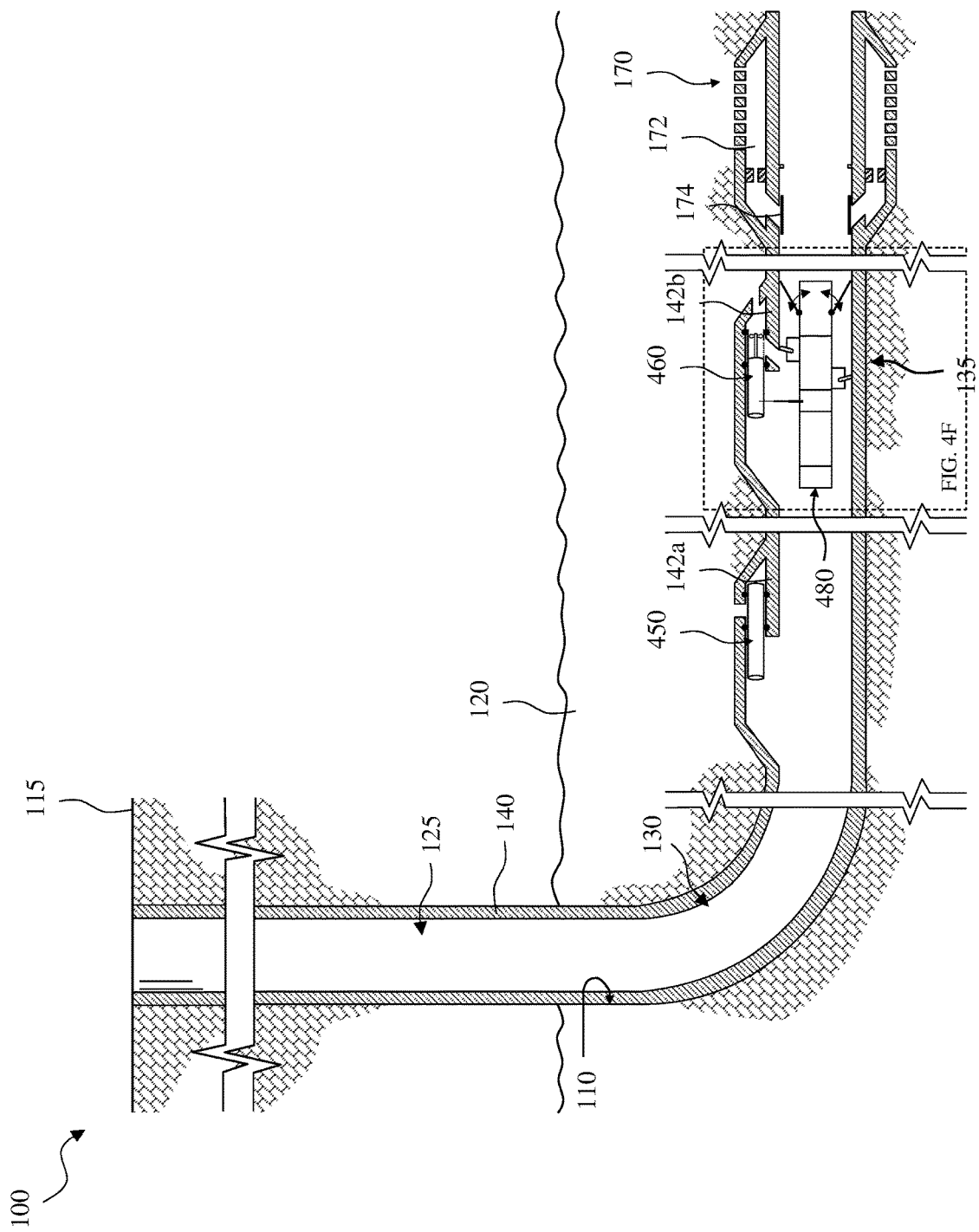
Figure 4F:
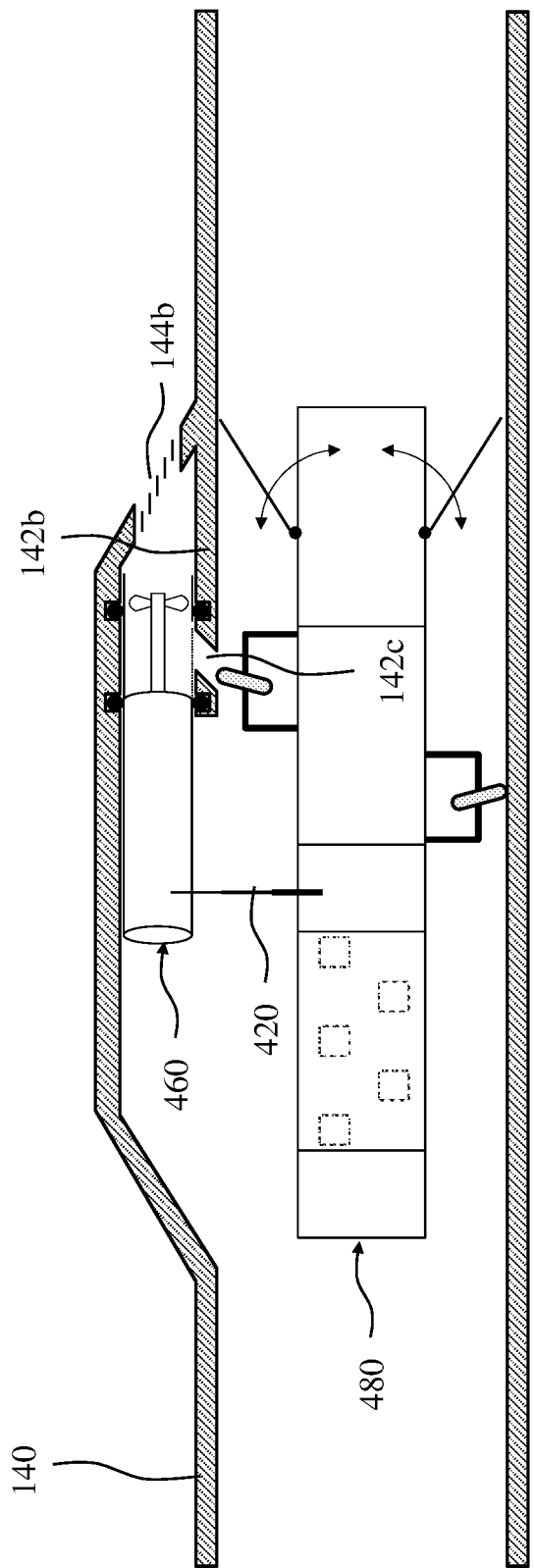
Figure 4G:
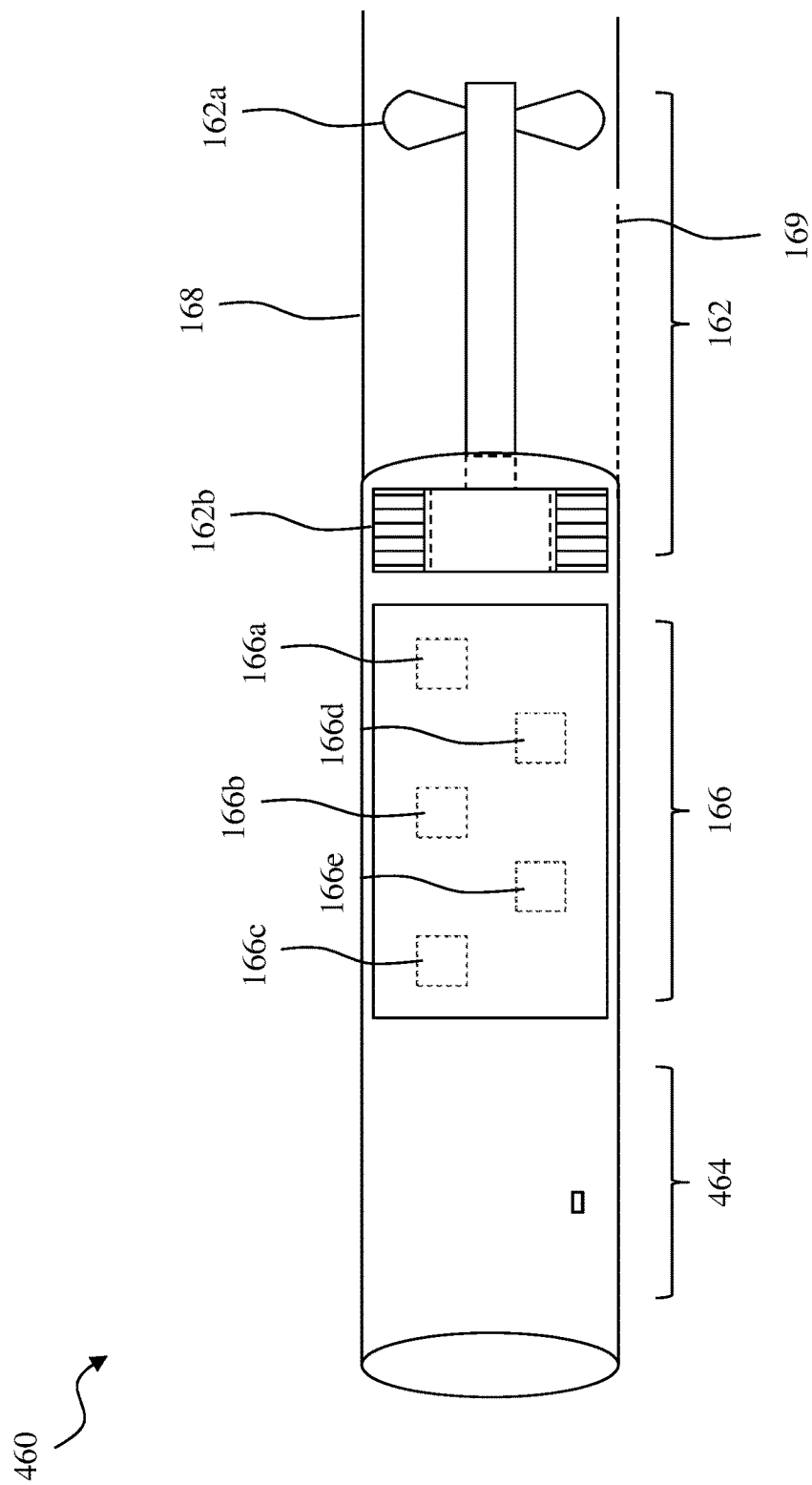
Figure 4H:
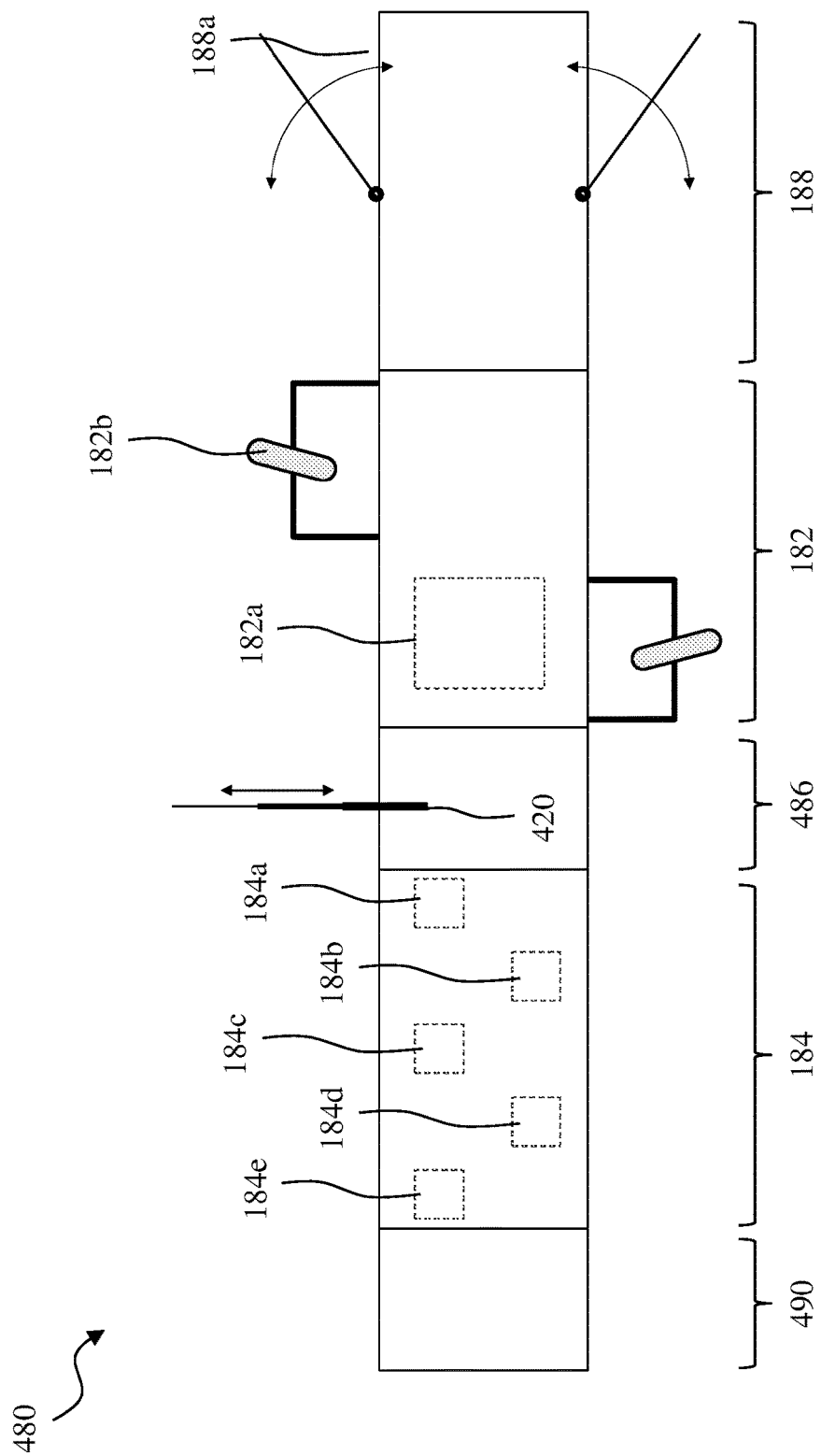

The wellbore tractor charging station 360 of FIGS. 3A through 3D differs, for the most part, from the wellbore tractor charging station 160 of FIGS. 1A through 1J, in that the wellbore tractor charging station 360 employs a valve, such as the piston valve 320, to close the charging station opening 144b when the wellbore tractor charging station 360 is not seated within the charging station sleeve portion 142b, but opens the charging station opening 144b when the wellbore tractor charging station 360 is seated within the charging station sleeve portion 142b. In at least one embodiment, a spring member 330 naturally biases the piston valve 320 toward the closed position, as shown in FIGS. 3C and 3D.

Turning to FIGS. 4A through 4H, illustrated is a well system 400 designed, manufactured and/or operated according to an alternative embodiment of the disclosure, for example using a wellbore sensor 450, a wellbore tractor charging station 460, and a wellbore tractor 480 designed, manufactured and/or operated according to an alternative embodiment of the disclosure. The well system 400, wellbore sensor 450, wellbore tractor charging station 460, and a wellbore tractor 480 of FIGS. 4A through 4H are similar in many respects to the well system 100, wellbore sensor 150, wellbore tractor charging station 160, and a wellbore tractor 180 of FIGS. 1A through 1J. Accordingly, like reference numbers have been used to indicate similar, if not identical, features.

The well system 400, wellbore sensor 450, wellbore tractor charging station 460, and a wellbore tractor 480 of FIGS. 4A through 4H differ, for the most part, from the well system 100, wellbore sensor 150, wellbore tractor charging station 160, and a wellbore tractor 180 of FIGS. 1A through 1J, in that the well system 400 employs one or more physically deployable tethers 410, 420. In the illustrated embodiment, the wellbore tractor 480 employs a first physical deployable tether 410 to physically couple with the wellbore sensor 450. In this embodiment, it is unnecessary (but not entirely unlikely) for the wellbore sensor 450 have the sensor communications module 156 including the sensor communications electronics 156a and a sensor communications antennae 156b. Similarly, in this embodiment, it is unnecessary (but not entirely unlikely) for the wellbore tractor 480 to have the tractor communications module 190 including the tractor communications electronics 192a and the tractor communications antenna 192b.

In the illustrated embodiment, the wellbore tractor 480 employs a second physical deployable tether 420 to physically couple with the wellbore tractor docking station 460. In this embodiment, it is unnecessary (but not entirely unlikely) for the wellbore tractor docking station 460 to have the charging station power transfer module 164 including the coil 164a and power transfer electronics 164b.

The embodiment of FIGS. 4A through 4H illustrate that the one or more physically deployable tethers 410, 420 extend from the wellbore tractor 480. In yet another embodiment, the one or more physically deployable tethers 410, 420 extend from the wellbore sensor 450 and wellbore tractor charging station 460, respectively. In yet another embodiment, the one or more physically deployable tethers 410, 420 extend from each of the wellbore sensors 450, wellbore tractor charging station 460 and wellbore tractor 480 to mate together at a midpoint therebetween.

Figure 5B:
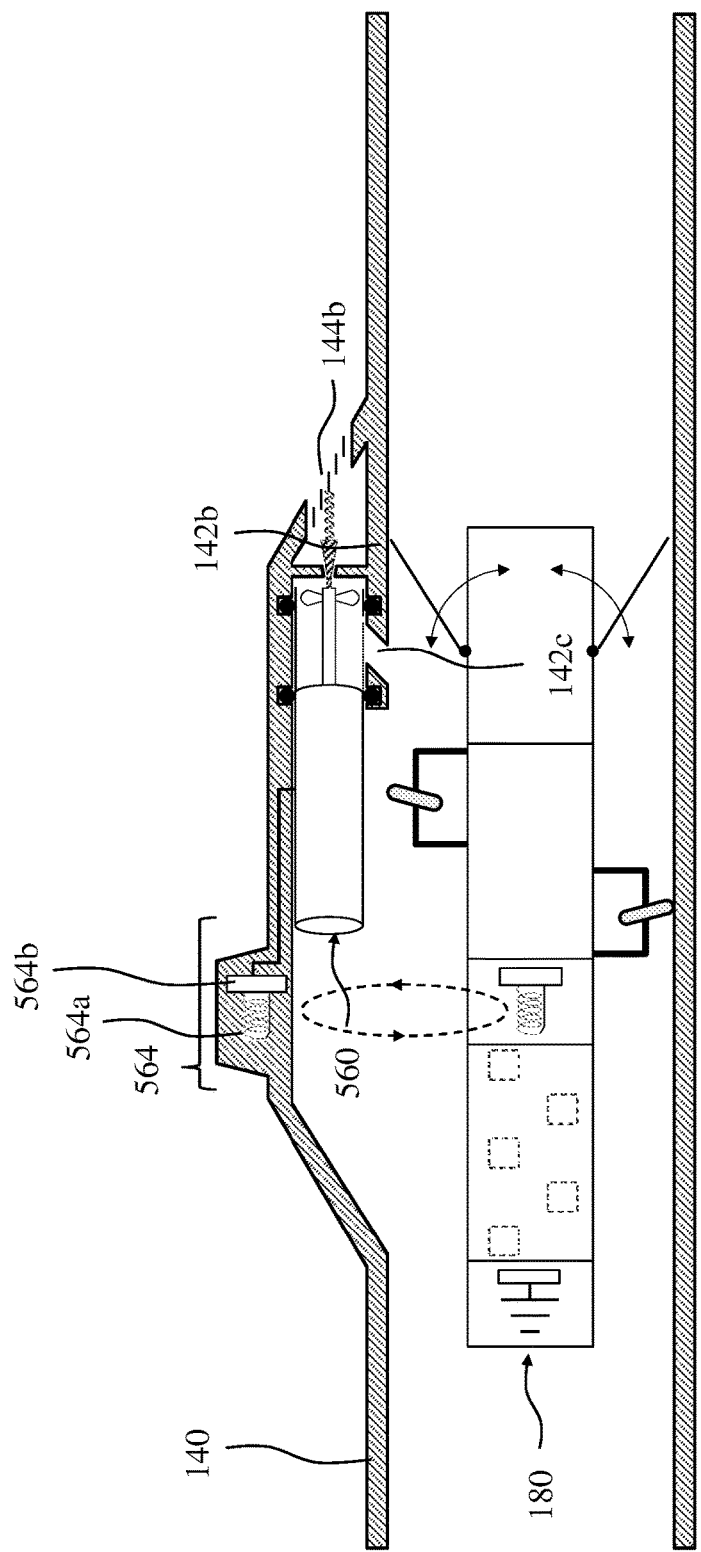

Turning to FIGS. 5A and 5B, illustrated is a well system 500 designed, manufactured and/or operated according to an alternative embodiment of the disclosure, for example using a wellbore tractor charging station 560 designed, manufactured and/or operated according to an alternative embodiment of the disclosure. The well system 500 and wellbore tractor charging station 560 of FIGS. 5A and 5B are similar in many respects to the well system 300 and wellbore tractor charging station 360 of FIGS. 3A through 3D. Accordingly, like reference numbers have been used to indicate similar, if not identical, features.

The well system 500 and wellbore tractor charging station 560 of FIGS. 5A and 5B differ, for the most part, from the well system 300 and wellbore tractor charging station 360 of FIGS. 3A through 3D, in that the wellbore tractor charging station 560 employs a charging station power transfer module 564 that is located in a sidewall of the wellbore tubular 140, or radially outside of the wellbore tubular 140. In the illustrated embodiment, the coil 564a and the power transfer electronics 564b are located in a sidewall thickness of the wellbore tubular 140.

Figure 6A:
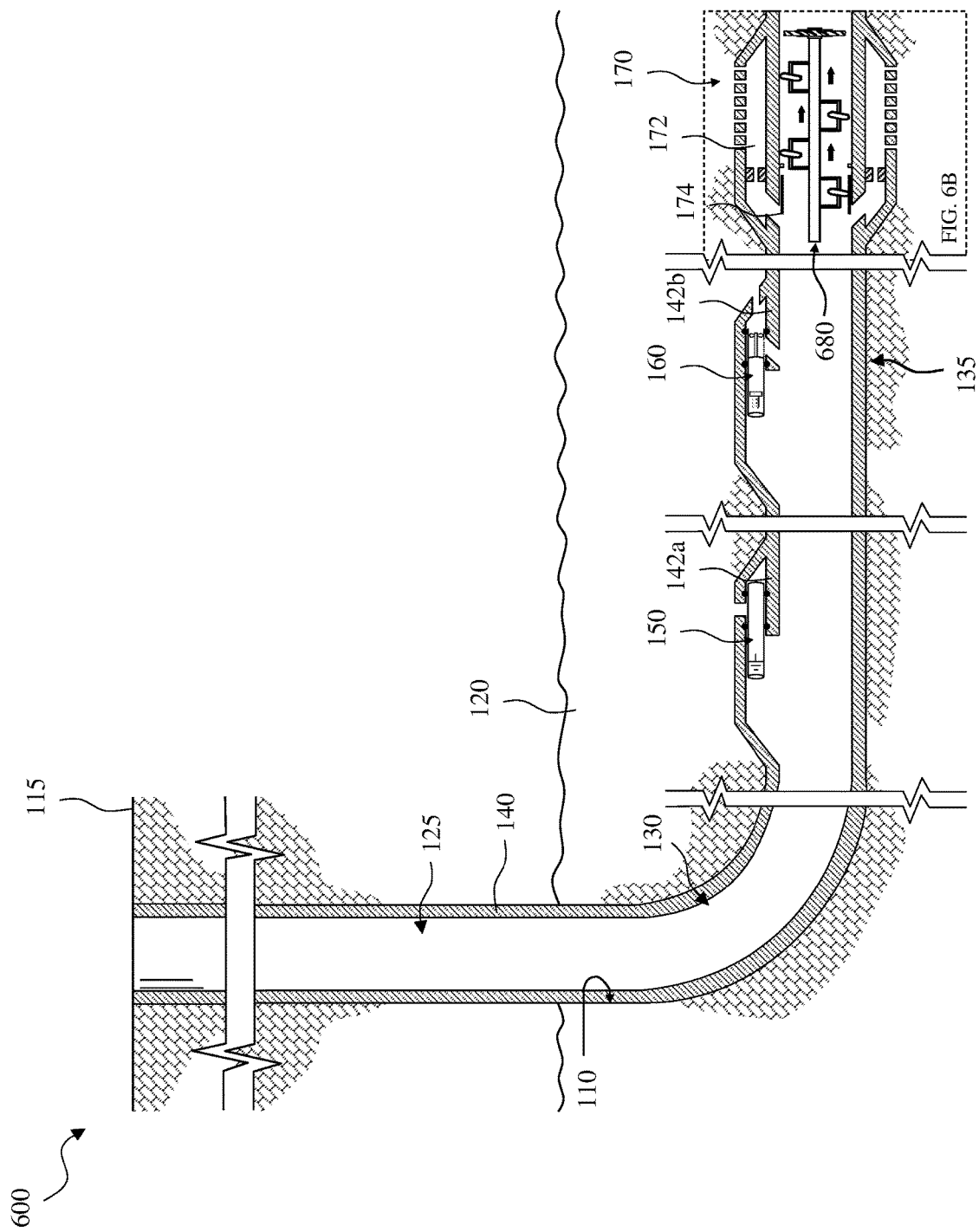
Figure 6B:
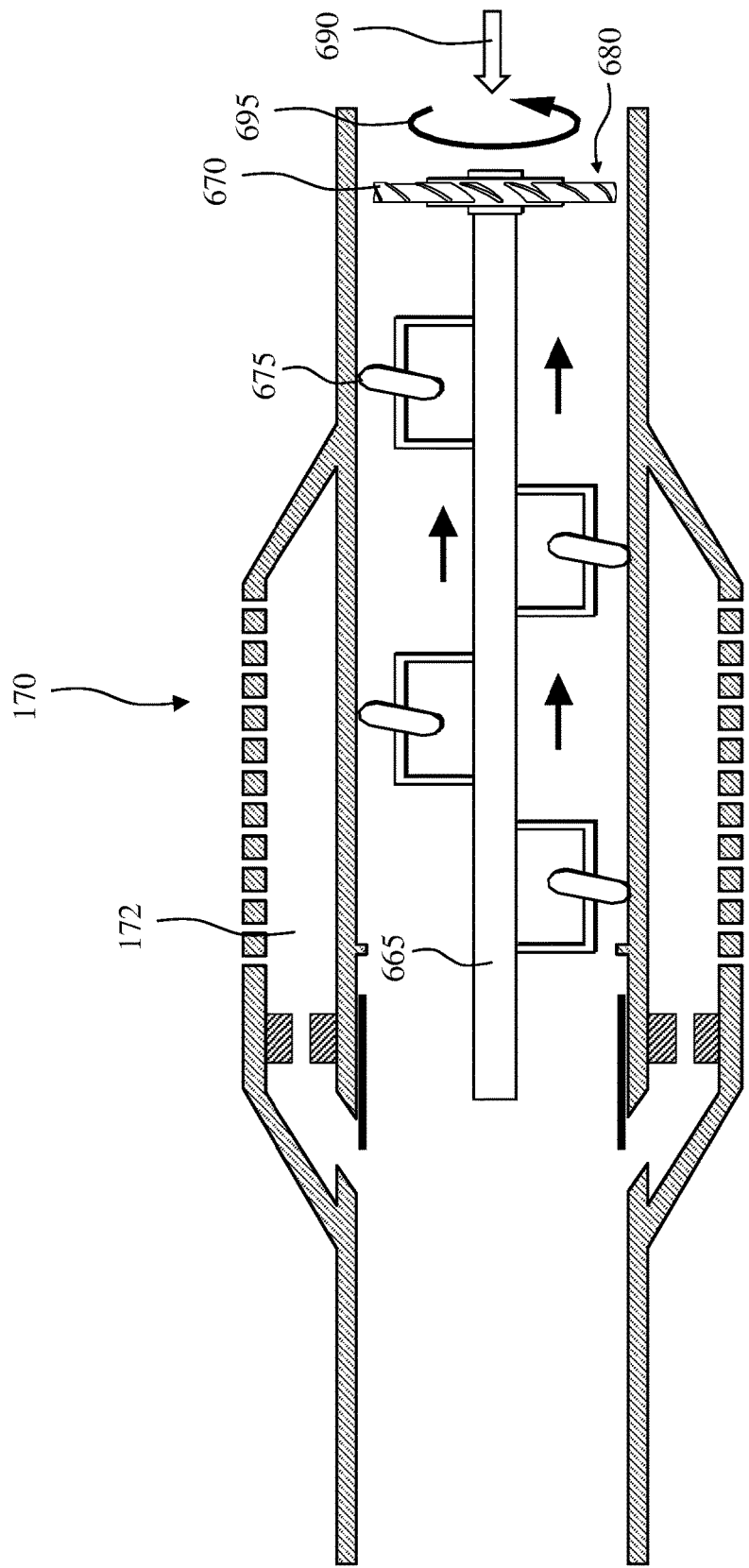

Turning to FIGS. 6A and 6B, illustrated is a well system 600 designed, manufactured and/or operated according to an alternative embodiment of the disclosure, for example using a wellbore tractor 680 designed, manufactured and/or operated according to an alternative embodiment of the disclosure. In accordance with one embodiment of the disclosure, the wellbore tractor 680 is mechanically powered by wellbore fluid 690. In this instance, energy from the wellbore fluid 690 spins the wellbore tractor 680, causing the wellbore tractor 680 to spiral into the flow.

The wellbore tractor 680 illustrated in FIGS. 6A and 6B includes a base member 665. The base member 665 is illustrated as a shaft in the illustrative embodiment, but may comprise many different designs and/or sizes and remain within the scope of the disclosure. A single turbine 670 is fixed to the base member 665 in the embodiment of FIGS. 6A and 6B. The term "fixed" as used herein, means that the base member 665 and the one or more turbines 670 rotate as a single unit. The term "turbine" as used herein, is meant to include a structure having two or more blades or vanes that are positioned to induce rotation. Given the foregoing, the turbine 670 is configured to rotate the base member 665 in a first rotational direction 695 based upon a first direction of fluid flow, which in the illustrated embodiment is the fluid 690. It should be noted that while a single turbine 670 is fixed to the base member 665 in the illustrated embodiment of FIGS. 6A and 6B, other embodiments exist wherein additional turbines are coupled and/or fixed to the base member 665, as will be further discussed below.

The wellbore tractor 680 additionally includes one or more wellbore engaging devices 675 radially extending from the base member 665. In accordance with one embodiment of the disclosure, the one or more wellbore engaging devices 675 are contactable, and in fact in contact with, a surface of the wellbore 110. Accordingly, the one or more wellbore engaging devices 675 displace the base member 665 and turbine 670 axially downhole as the turbine 670 rotates in the first rotational direction 695, for example in response to the flow of the fluid 690 there past. The wellbore tractor 680 illustrated in FIGS. 6A and 6B is fairly simple in design, and thus does not include one or more of the other aspects, including an automation section, for example as discussed above.

In accordance with one embodiment of the disclosure, the fluid 690, which is production fluid in one embodiment, may be controlled from the surface of the wellbore 110. For example, in one embodiment, the velocity of the flow of production fluid 690 may be controlled from the surface of the wellbore 110 to speed up or slow down the displacement of the wellbore tractor 680 axially downhole. In another embodiment, the velocity of the flow of production fluid 690 may be increased (e.g., from the surface) to a value sufficient to overcome friction between the one or more wellbore engaging devices 675 and the surface of the wellbore 110 and thus push the wellbore tractor 680 uphole. In yet another embodiment, the wellbore tractor 680 may be subjected to fluid (e.g., fluid from the surface) in a second opposite direction to rotate the base member 665 in a second opposite rotational direction to displace the wellbore tractor 680 axially uphole.

Figure 7A:
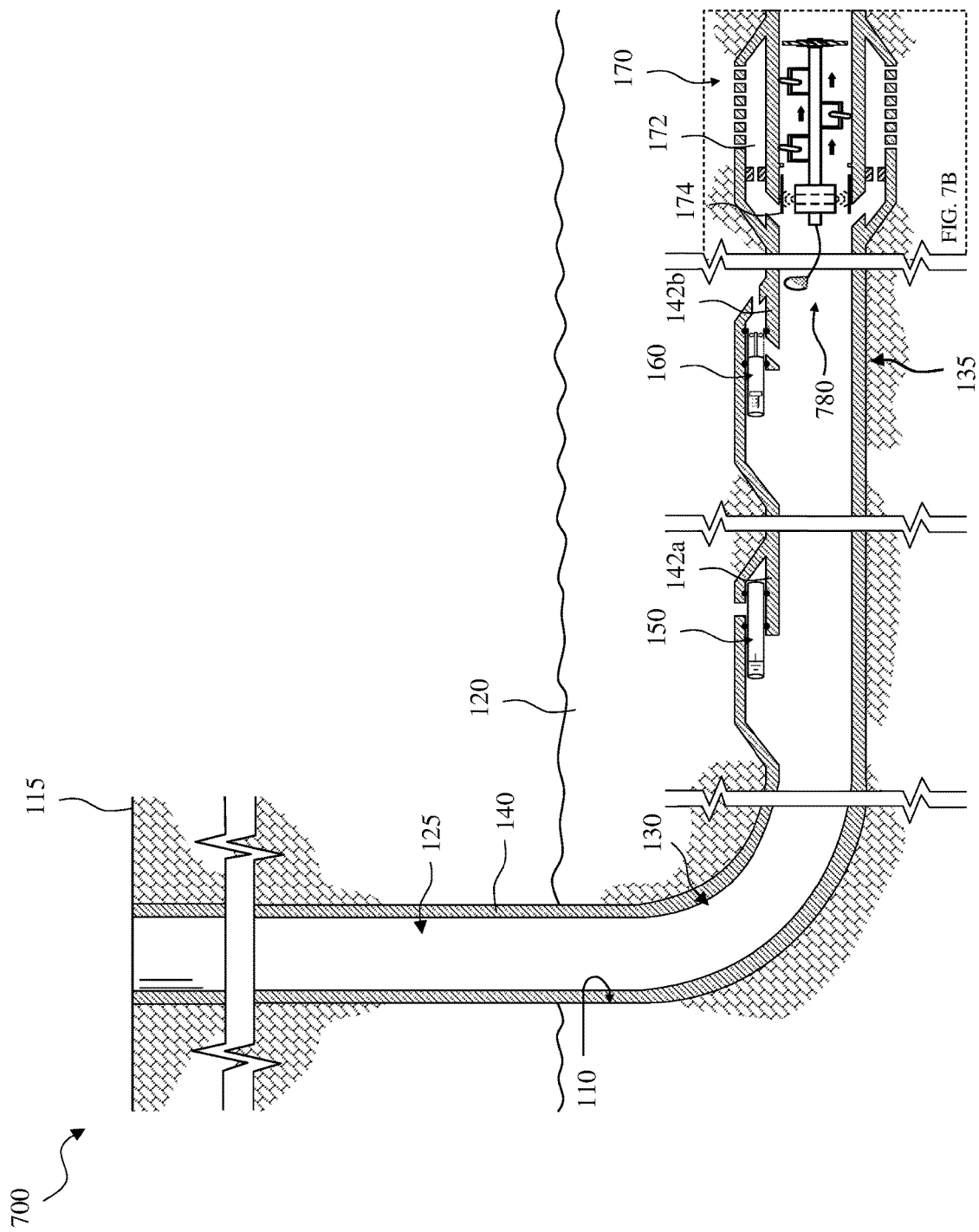
Figure 7B:
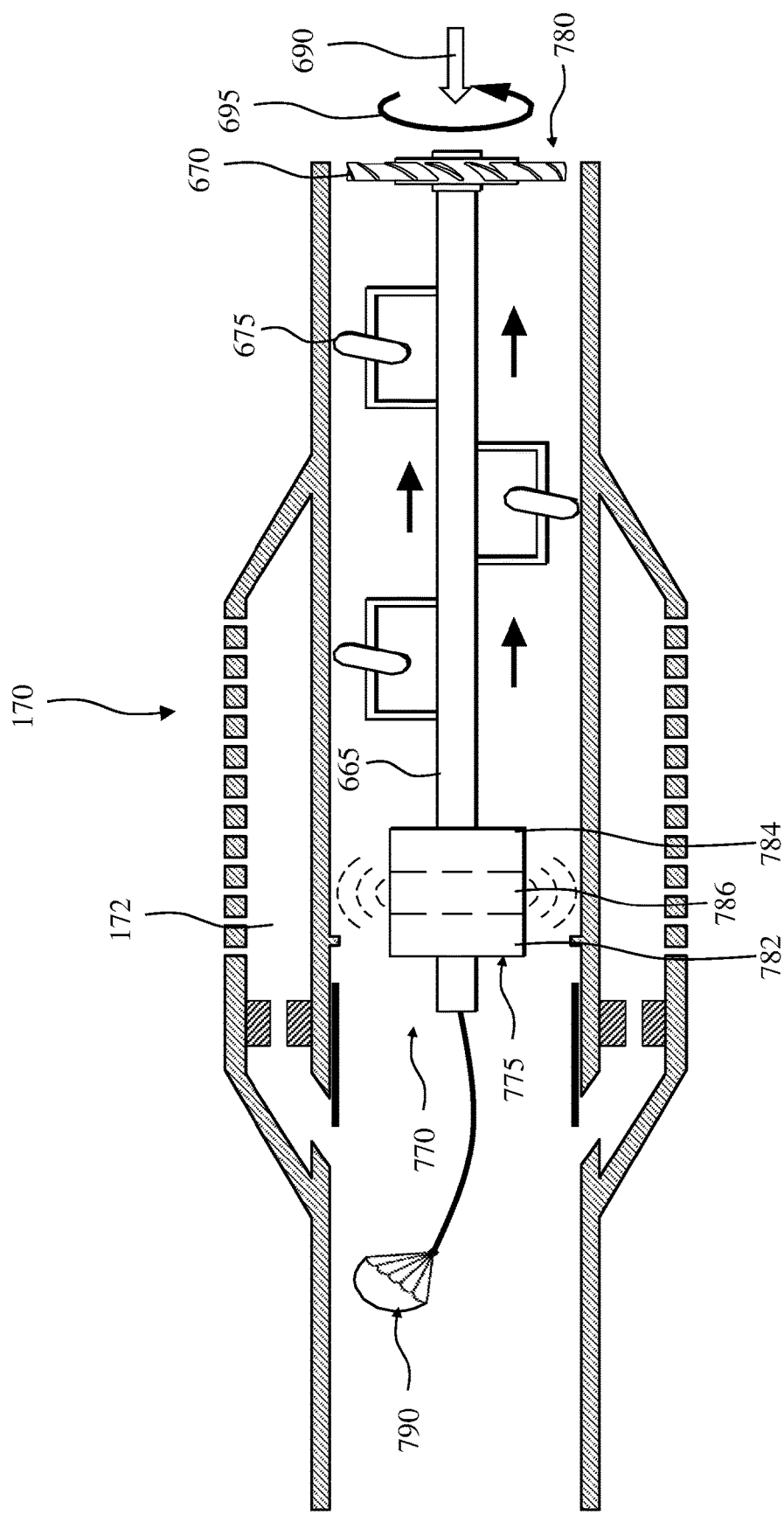

Turning to FIGS. 7A and 7B, illustrated is a well system 700 designed, manufactured and/or operated according to an alternative embodiment of the disclosure, for example using a wellbore tractor 780 designed, manufactured and/or operated according to an alternative embodiment of the disclosure. The well system 700 and wellbore tractor 780 share many elements with the well system 600 and wellbore tractor 680 illustrated in FIGS. 6A and 6B. Accordingly, like reference numerals may be used to indicate similar, if not identical, features. In the embodiment of FIGS. 7A and 7B, the base member 665, turbine 670, and one or more wellbore engaging devices 675 form at least a portion of a flow based drive section, and the wellbore tractor 780 additionally including an automation section 770 for performing a downhole task. In the particular embodiment of FIGS. 7A and 7B, the automation section 770 is a logging tool 775. The logging tool 775, in one embodiment, includes a power source 782, memory 784, and a wireless transmitter 786, among other relevant features, and is configured to log one or more parameters of the wellbore 110. In one embodiment, the logging tool 775 logs the wellbore 110 as it is displaced axially downhole. In another embodiment, the logging tool 775 travels to a downhole end of the wellbore 110, and then logs the wellbore 110 as it travels axially uphole. As discussed above, the logging tool 775, or at least the memory 784 thereof, may return uphole using the flow of the fluid 690, or alternatively using a chute 790.

Figure 8A:
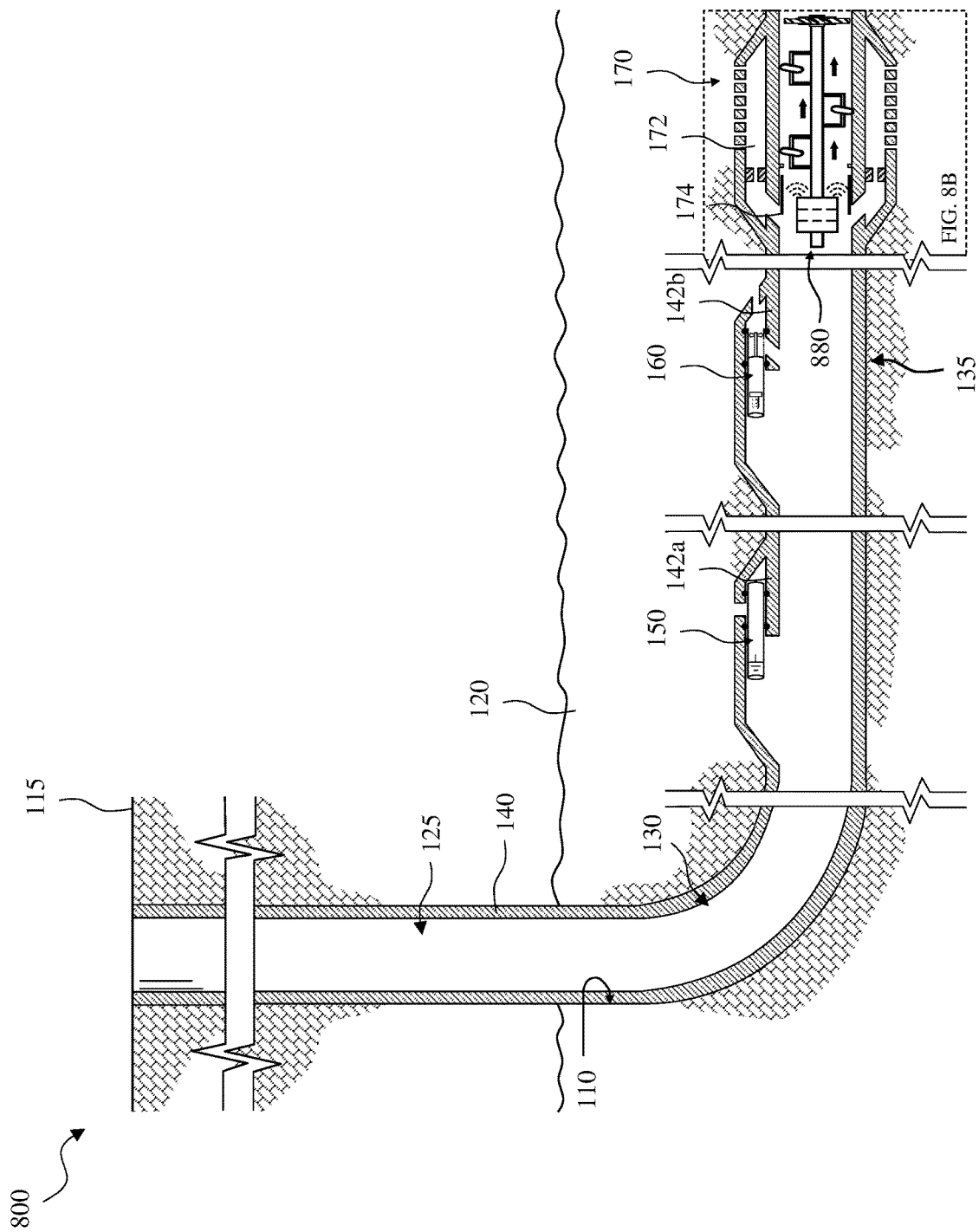
Figure 8B:
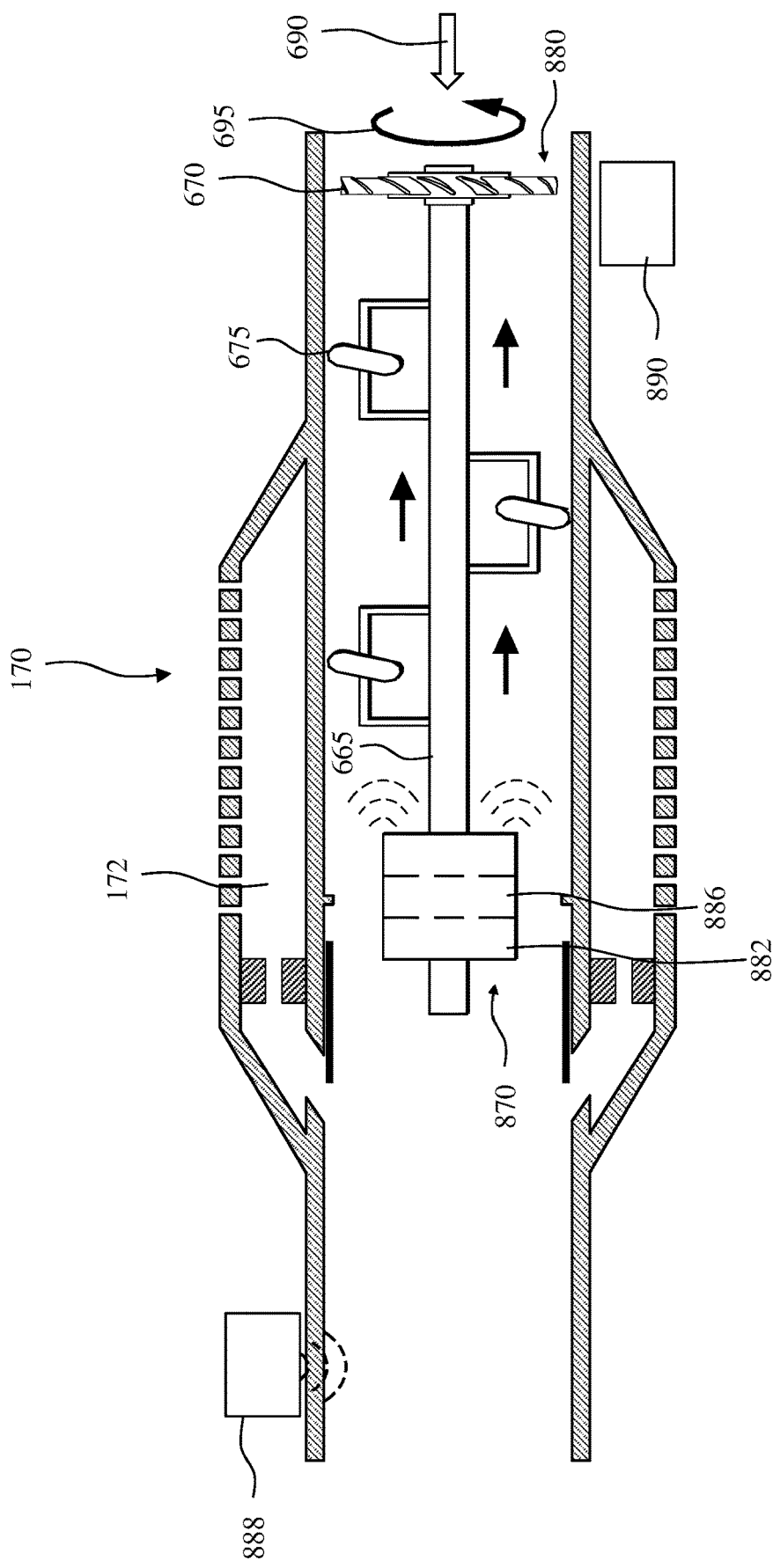

Turning to FIGS. 8A and 8B, illustrated is a well system 800 designed, manufactured and/or operated according to an alternative embodiment of the disclosure, for example using a wellbore tractor 880 designed, manufactured and/or operated according to an alternative embodiment of the disclosure. The well system 800 and wellbore tractor 880 share many elements with the well system 700 and wellbore tractor 780 illustrated in FIGS. 7A and 7B. Accordingly, like reference numerals may be used to indicate similar, if not identical, features. In the particular embodiment of FIGS. 8A and 8B, the wellbore tractor 880 includes an automation section 870 including memory 882 and a transceiver 886. The memory 882 and transceiver 886, in the embodiment of FIGS. 8A and 8B, are configured to receive information from one downhole device 888 (e.g., a flow sensor in one embodiment) and transmit the information to another downhole device 890 (e.g., an ICV in one embodiment), for example wirelessly, as discussed above. While it has been illustrated in FIGS. 8A and 8B that the downhole device 888 transmits the information and the downhole device 890 receives the information, the opposite may also be true.

Figure 9A:
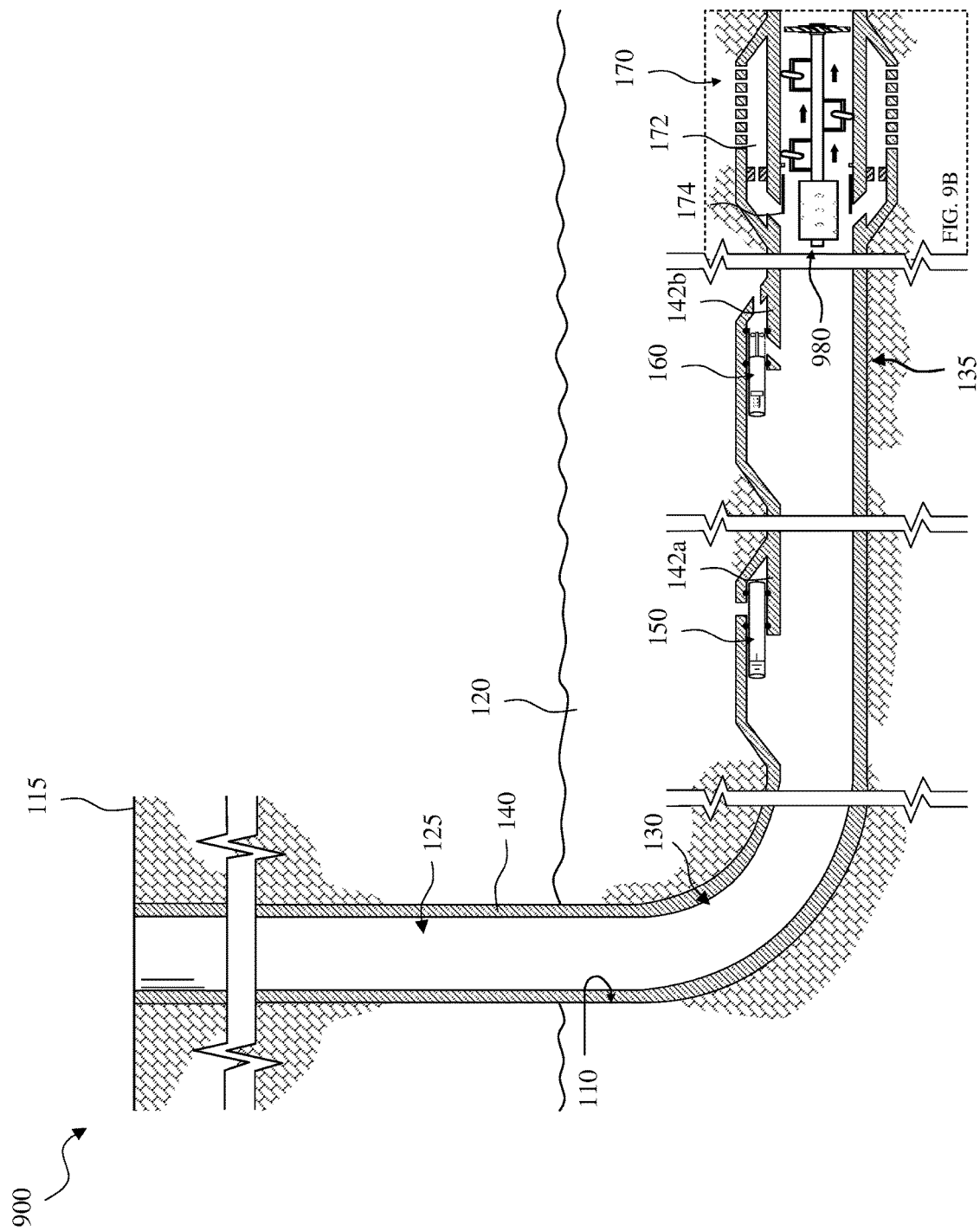
Figure 9B:
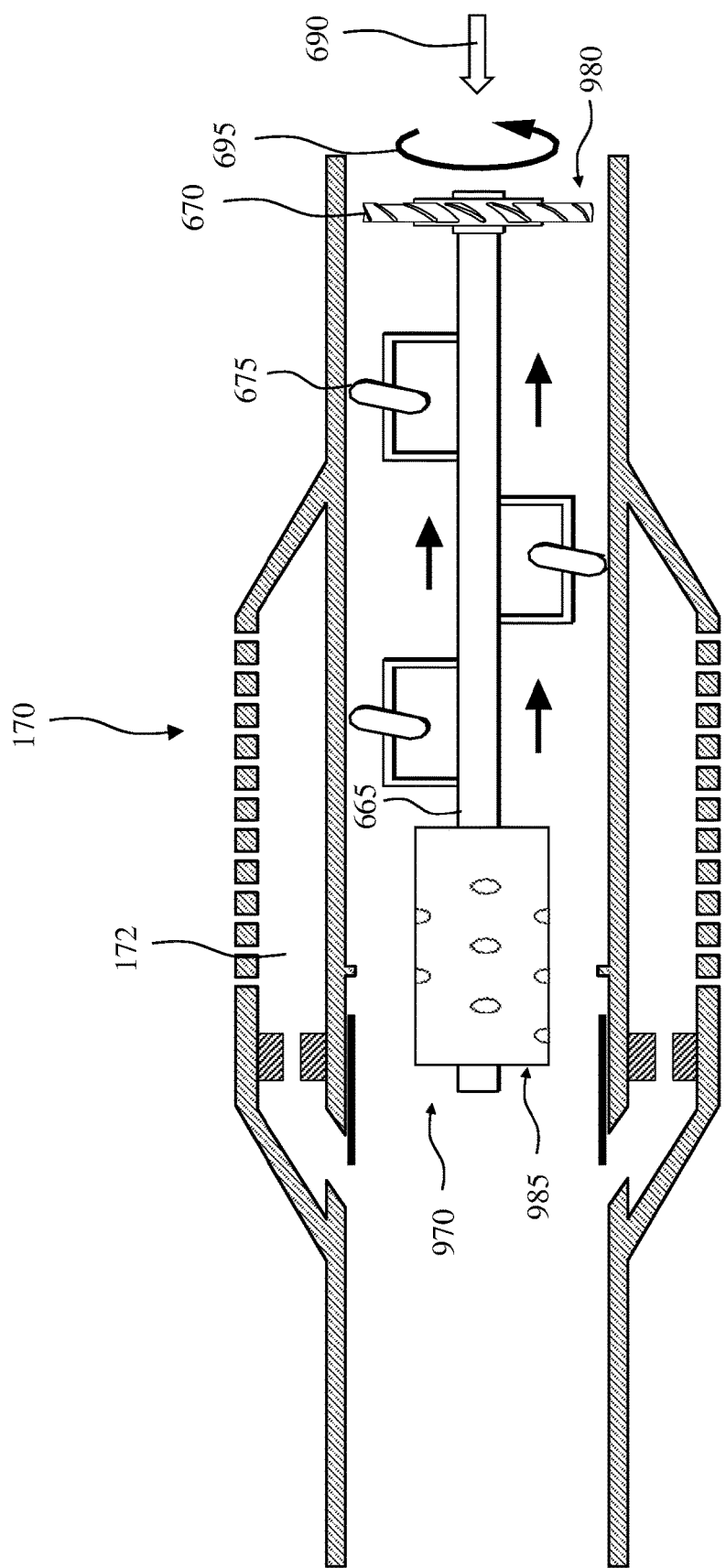

Turning to FIGS. 9A and 9B, illustrated is a well system 900 designed, manufactured and/or operated according to an alternative embodiment of the disclosure, for example using a wellbore tractor 980 designed, manufactured and/or operated according to an alternative embodiment of the disclosure. The well system 900 and wellbore tractor 980 share many elements with the well system 700 and wellbore tractor 780 illustrated in FIGS. 7A and 7B. Accordingly, like reference numerals may be used to indicate similar, if not identical, features. In the particular embodiment of FIGS. 9A and 9B, the wellbore tractor 980 includes an automation section 970. The automation section 970, in the embodiment of FIGS. 9A and 9B, is a perforator tool 985. The perforator tool 985, as those skilled in the art appreciate, may be taken downhole using the wellbore tractor 980 and then used to perforate the wellbore 110, as discussed in greater detail above.

Figure 10A:
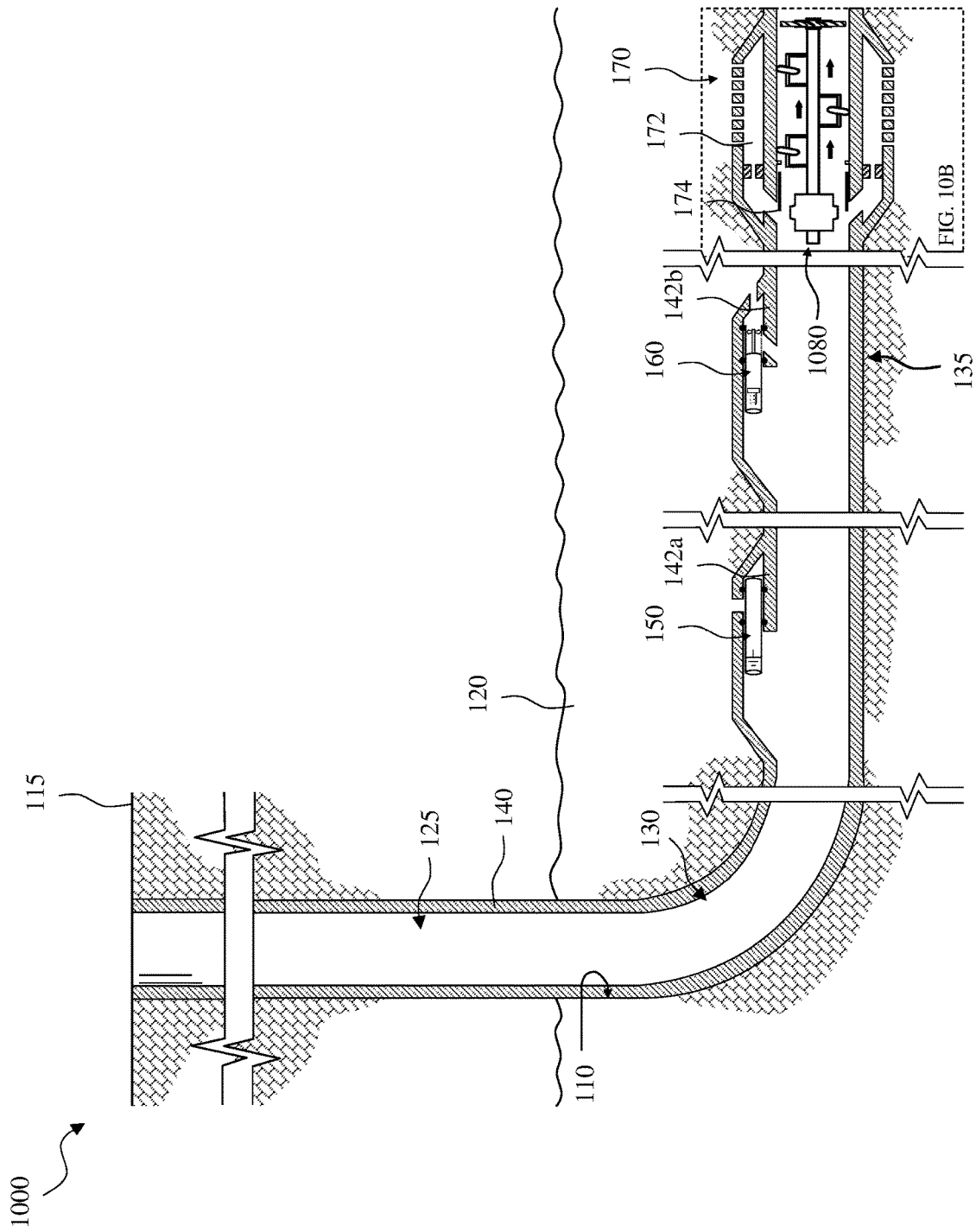
Figure 10B:
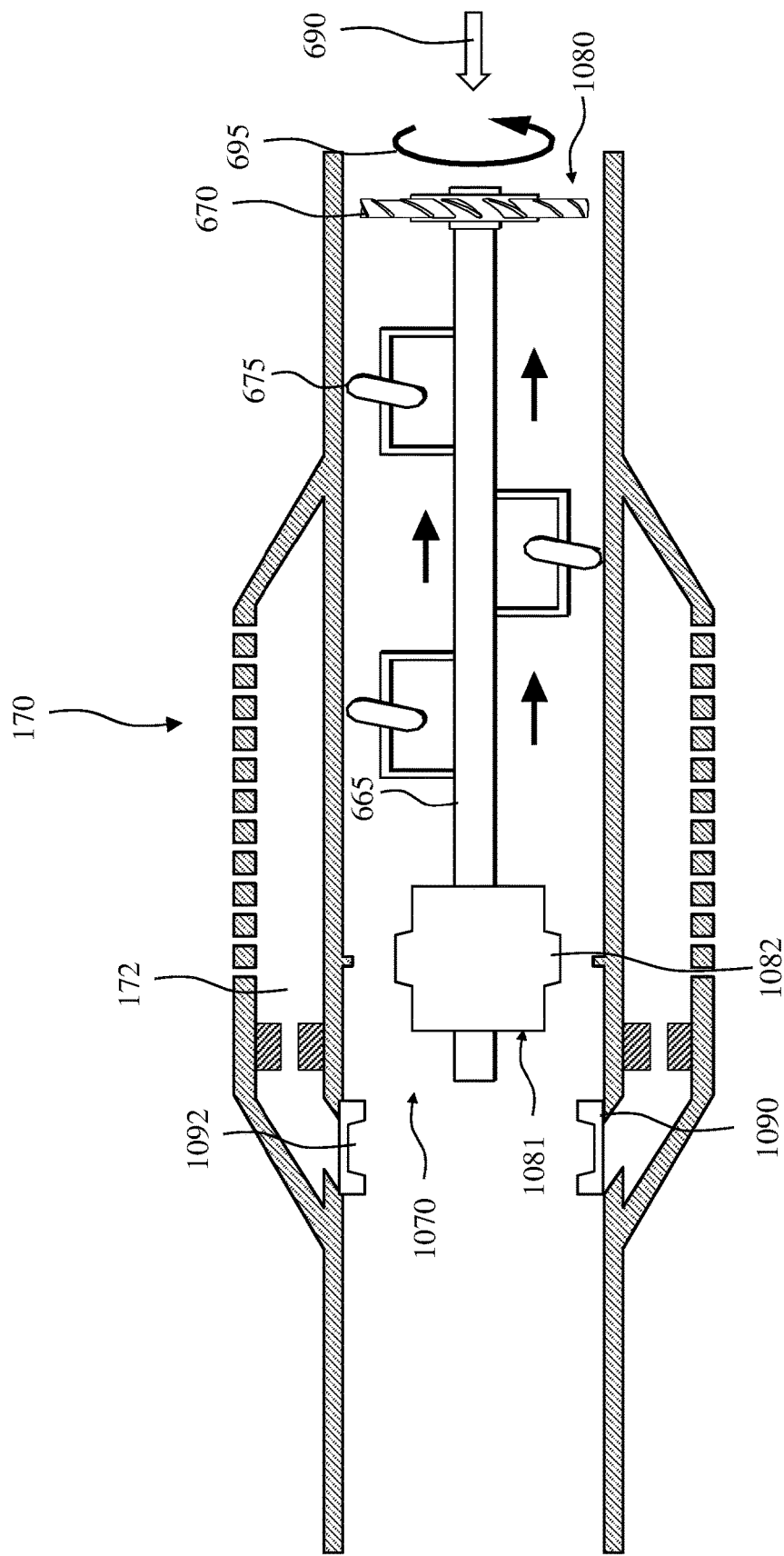

Turning to FIGS. 10A and 10B, illustrated is a well system 1000 designed, manufactured and/or operated according to an alternative embodiment of the disclosure, for example using a wellbore tractor 1080 designed, manufactured and/or operated according to an alternative embodiment of the disclosure. The well system 1000 and wellbore tractor 1080 share many elements with the well system 700 and wellbore tractor 780 illustrated in FIGS. 7A and 7B. Accordingly, like reference numerals may be used to indicate similar, if not identical, features. In the particular embodiment of FIGS. 10A and 10B, the wellbore tractor 1080 includes an automation section 1070. The automation section 1070, in the embodiment of FIGS. 10A and 10B, is a sleeve shifting tool 1081. The sleeve shifting tool 1081, in one embodiment, has a profile 1082 configured to engage with a corresponding profile 1092 in a downhole sleeve 1090. The sleeve shifting tool 1081, as those skilled in the art appreciate, may be taken downhole using the wellbore tractor 1080 and then used to shift the downhole sleeve 1090, as discussed in greater detail above.

Figure 11A:
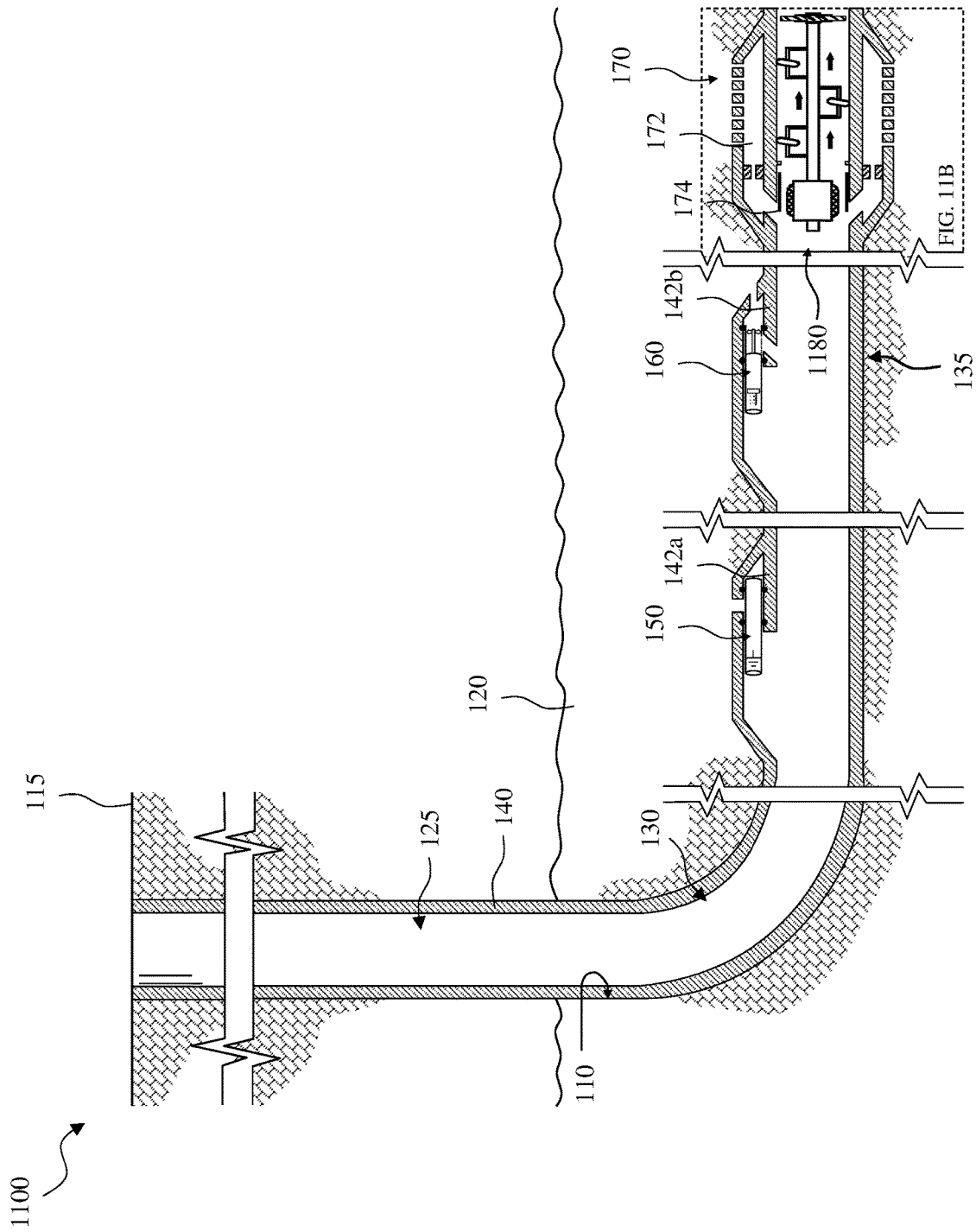
Figure 11B:
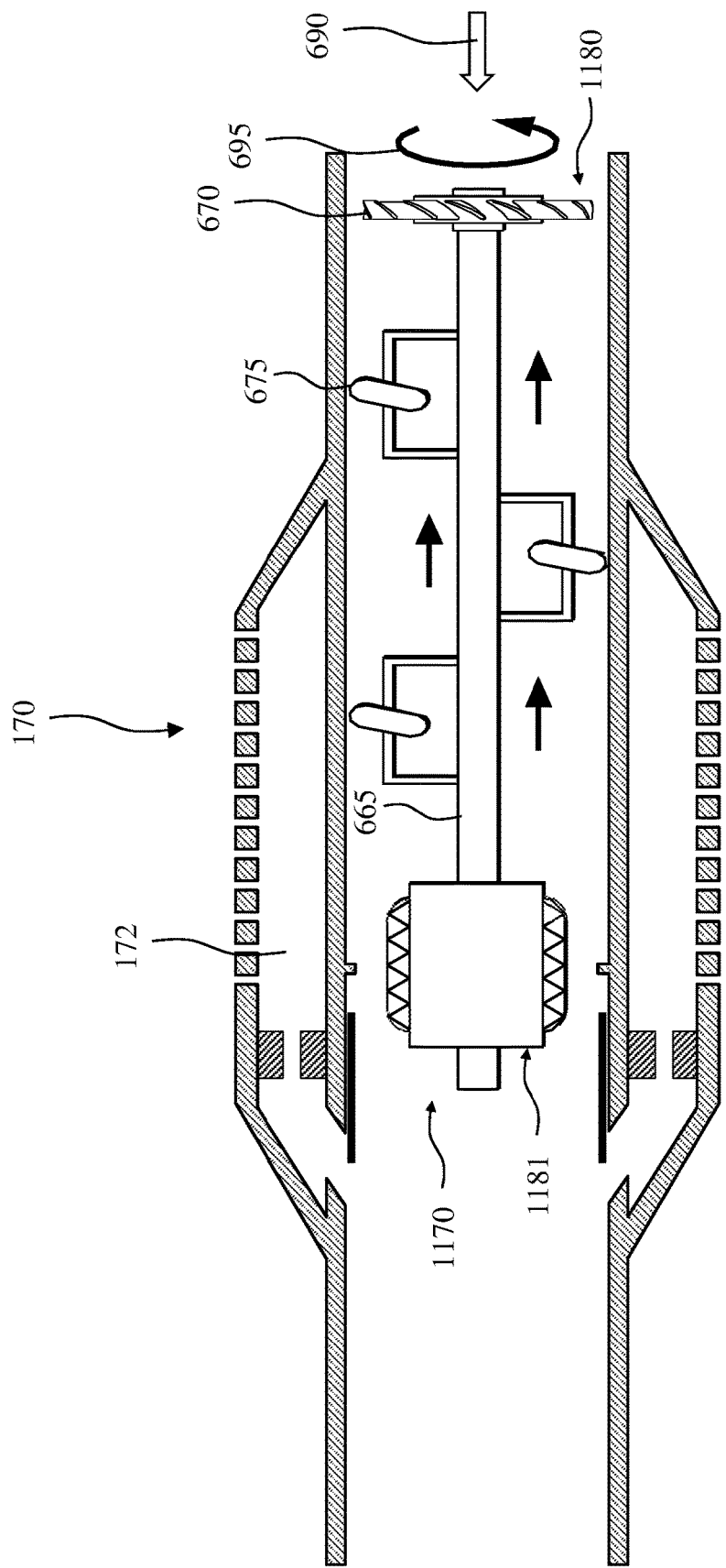

Turning to FIGS. 11A and 11B, illustrated is a well system 1100 designed, manufactured and/or operated according to an alternative embodiment of the disclosure, for example using a wellbore tractor 1180 designed, manufactured and/or operated according to an alternative embodiment of the disclosure. The well system 1100 and wellbore tractor 1180 share many elements with the well system 700 and wellbore tractor 780 illustrated in FIGS. 7A and 7B. Accordingly, like reference numerals may be used to indicate similar, if not identical, features. In the particular embodiment of FIGS. 11A and 11B, the wellbore tractor 1180 includes an automation section 1170. The automation section 1170, in the embodiment of FIGS. 11A and 11B, is a swellable packer tool 1181. The swellable packer tool 1181, as those skilled in the art appreciate, may be taken downhole using the wellbore tractor 1180 and then swell to function as a packer or isolation plug, as discussed in greater detail above.

Figure 12A:
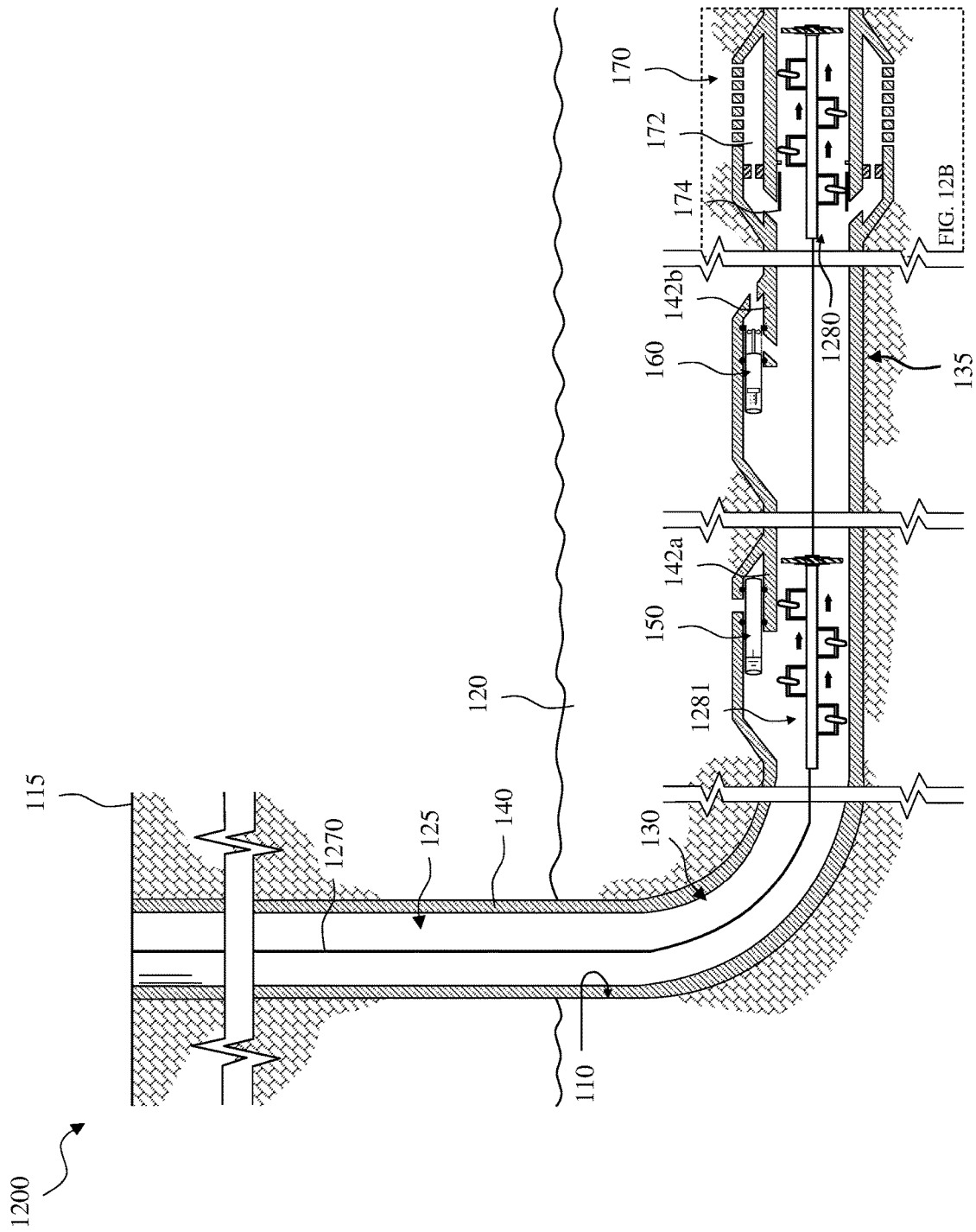
Figure 12B:
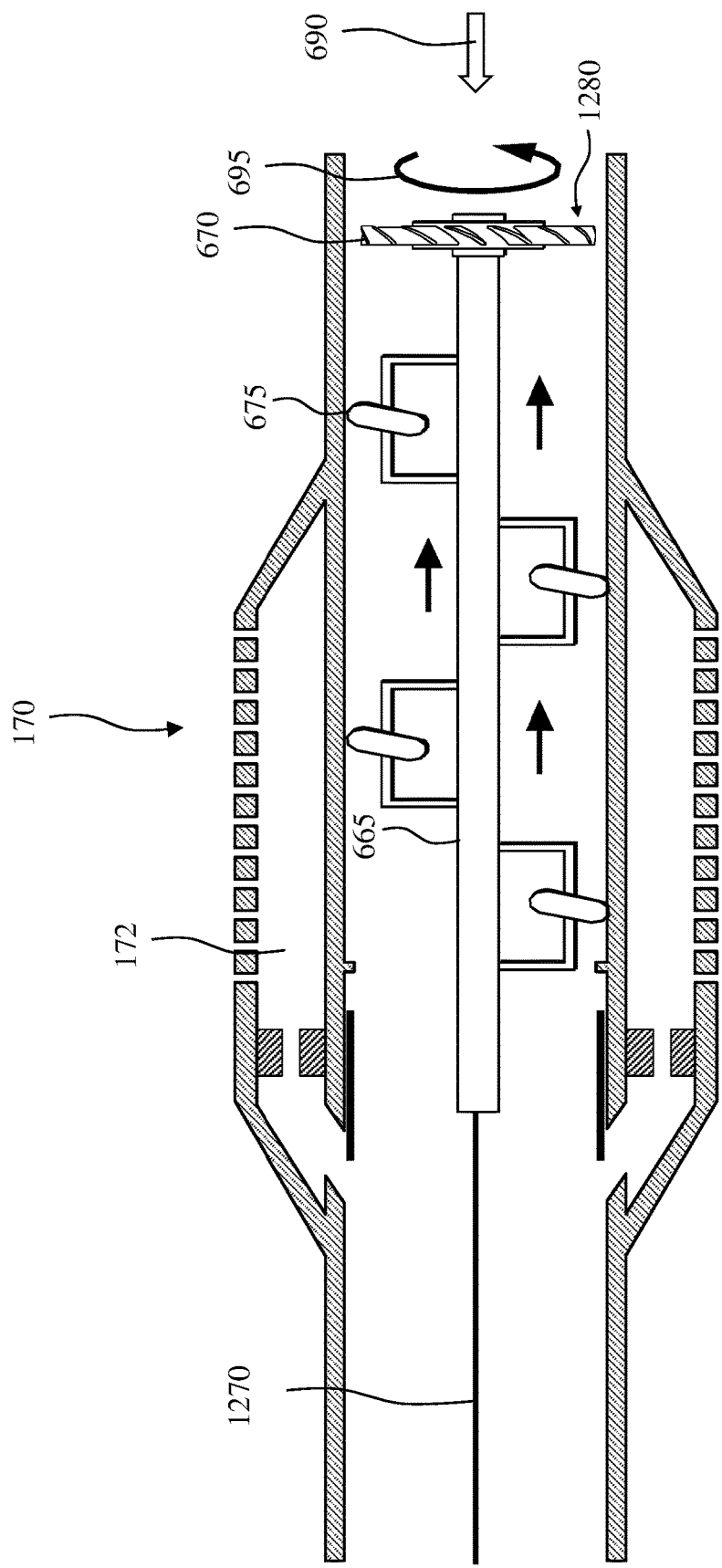

Turning to FIGS. 12A and 12B, illustrated is a well system 1200 designed, manufactured and/or operated according to an alternative embodiment of the disclosure, for example using a wellbore tractor 1280 designed, manufactured and/or operated according to an alternative embodiment of the disclosure. The well system 1200 and wellbore tractor 1280 share many elements with the well system 600 and wellbore tractor 680 illustrated in FIGS. 6A and 6B. In the particular embodiment of FIGS. 12A and 12B, the wellbore tractor 1280 is coupled proximate a downhole end of a wireline 1270. The term wireline, as used in this embodiment, is intended to include traditional wireline, slickline, sandline, e-line, braided cable, fiber-optic cable, etc. In the embodiment of FIGS. 12A and 12B, the wireline 1270 may be pulled downhole using the wellbore tractor 1280. Further to the embodiment of FIGS. 12A and 12B, the wellbore tractor 1280 is a first wellbore tractor, and the well system 1200 further includes a second wellbore tractor 1281. The second wellbore tractor 1281, as shown, may be coupled to an intermediate location of the wireline 1270 uphole of the first wellbore tractor 1280. In accordance with one embodiment of the disclosure, the first and second wellbore tractors 1280, 1281 may also help return the wireline 1270 uphole.

Turning now to FIGS. 13 to 22, illustrated are different embodiments of wellbore tractors manufactured and designed according to the disclosure. The wellbore tractors illustrated in FIGS. 13 to 22 differ from one another primarily in the way their drive section operates. As the wellbore tractors illustrated in FIGS. 13 to 22 share many features, similar reference numerals may be used to indicate similar, if not identical, features. Additional details for each of the wellbore tractors illustrated in FIGS. 13 to 22 may be found in the preceding paragraphs.

Figure 13:
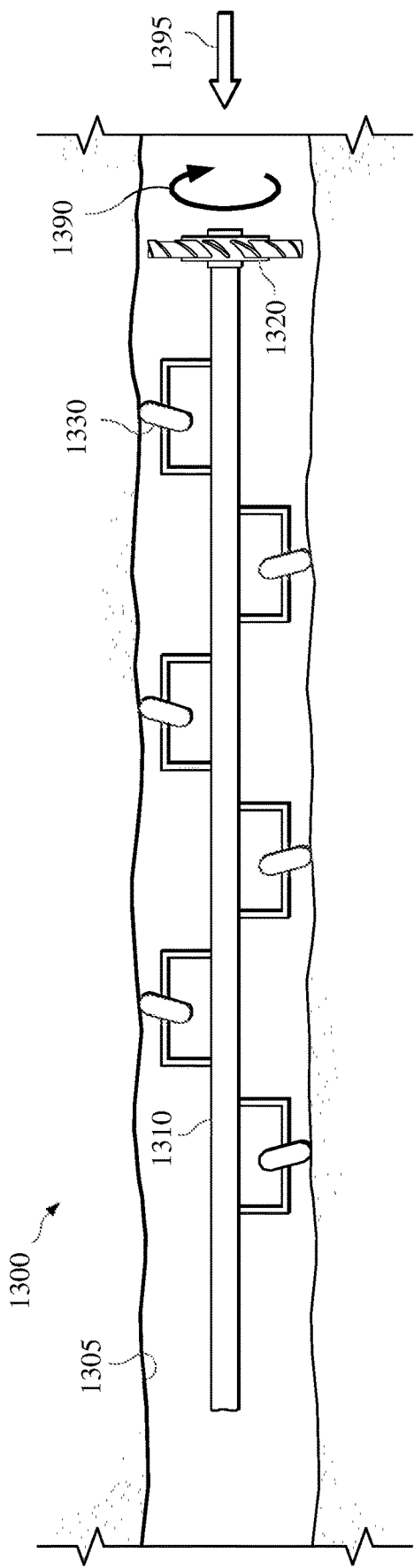

FIG. 13 illustrates one simple embodiment of a wellbore tractor 1300 manufactured and designed according to the disclosure, and placed within a wellbore 1305. The wellbore tractor 1300 includes a base member 1310, and a turbine 1320 fixed to the base member 1310. As is well understood by now, the turbine 1320 is designed to rotate the base member 1310 in a first rotational direction 1390 based upon a first direction of fluid flow, such as may occur with the fluid 1395. The wellbore tractor 1300 additionally includes a plurality of wellbore engaging devices 1330 radially extending from the base member 1310. The plurality of wellbore engaging devices 1330, in the illustrated embodiment, are contactable with a surface of a wellbore 1305 for displacing the base member 1310 and turbine 1320 axially downhole as the turbine 1320 rotates in the first rotational direction 1390.

In accordance with the embodiment of FIG. 13, the one or more wellbore engaging devices 1330 are one or more wheels. For example, the wheels are positioned at a first tilted direction relative to an axial surface of the wellbore 1305. Accordingly, the tilted wheels are configured to displace the base member 1310 and turbine 1320 axially downhole.

In accordance with one embodiment of the disclosure, the one or more wellbore engaging devices 1330, or other features of the wellbore tractor 1300, are dissolvable in response to a downhole condition. For example, the one or more wellbore engaging devices 1330, or the other features of the wellbore tractor 1300 including the turbine 1320, may be dissolvable in response to time, temperature, pressure, or fluid type, among other downhole conditions. As discussed in greater detail above, the dissolvable nature of the wellbore tractor 1300 allows different parts, or the entirety, of the wellbore tractor 1300 to return to the surface of the wellbore 1305, in certain instances simply using the flow of the fluid 1395.

Figure 14:
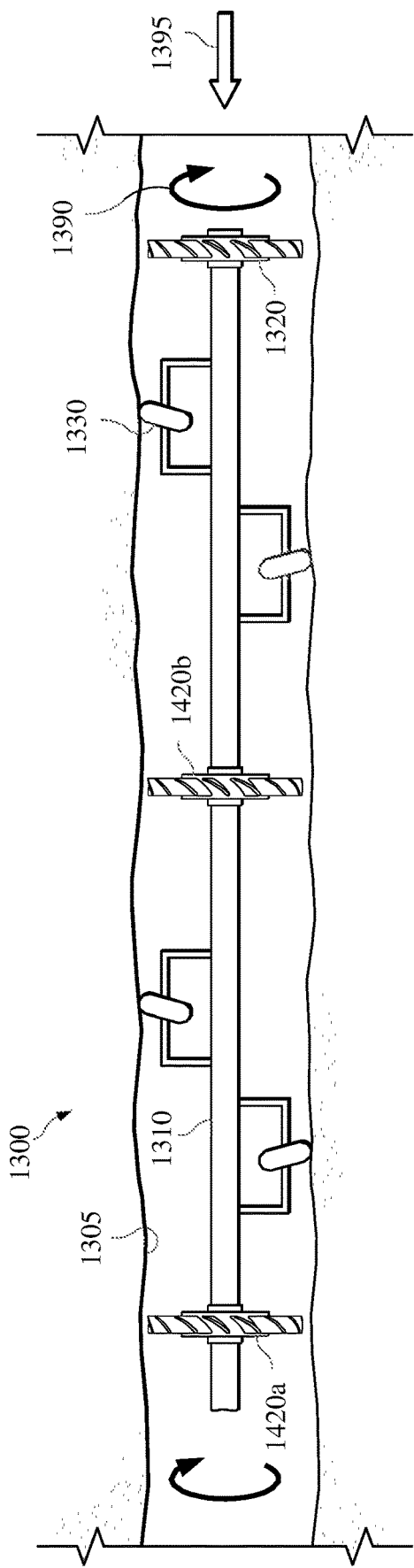

Turning to FIG. 14, illustrated is an alternative embodiment of a wellbore tractor 1400 manufactured and designed according to the disclosure. The wellbore tractor 1400 primarily differs from the wellbore tractor 1300 of FIG. 13 in that the wellbore tractor 1400 includes a second turbine 1420a, and in this particular embodiment a third turbine 1420b. In the illustrated embodiment, the second turbine 1420a and turbine 1320 are fixed at opposing ends of the base member 1310. Additionally, the third turbine 1420b is positioned between the second turbine 1420a and the turbine 1320, for example substantially at a midpoint between the two. The second and third turbines 1420a, 1420b, in the illustrated embodiment, have the same orientation or handedness as the turbine 1320, and thus are also configured to rotate the base member 1310 in the first rotational direction 1390. In the illustrated embodiment of FIG. 14, the turbines 1320, 1420a, 1420b are configured to rotate the base member clockwise to advance the wellbore tractor 1400 downhole (e.g., as looking up at the wellbore tractor 1400 from downhole). The second and third turbines 1420a, 1420b, as those skilled in the art now understand, provide additional torque for displacing the wellbore tractor 1400 axially downhole.

Figure 15:
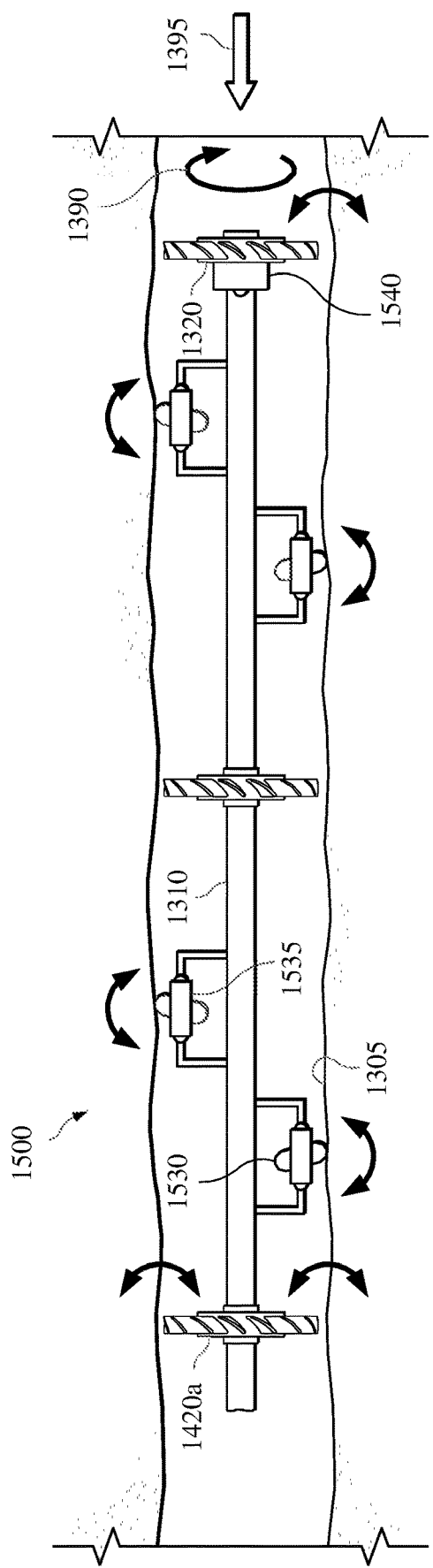

Turning to FIG. 15, illustrated is an alternative embodiment of a wellbore tractor 1500 manufactured and designed according to the disclosure. The wellbore tractor 1500 primarily differs from the wellbore tractor 1300 of FIG. 13 in that the one or more wellbore engaging devices 1330 are one or more wheels 1530, and the wellbore tractor 1500 further includes one or more wheel actuation members 1535 coupled to the one or more wheels 1530. In the illustrated embodiment of FIG. 15, the one or more wheel actuation members 1535 are configured to adjust an angle of tilt of the one or more wheels 1530 relative to the axial surface of the wellbore 1305. Such adjustments to the angle of tilt may be used for speeding up or slowing down the displacement of the wellbore tractor 1500 axially downhole. The one or more wheel actuation members 1535, in certain embodiments, may also be used to move the one or more wheels 1530 from the first tilted direction (e.g., as illustrated in FIG. 15) to a second opposite tilted direction (not shown) relative to the axial surface of the wellbore 1305 for displacing the wellbore tractor 1500 axially uphole.

The wellbore tractor 1500 illustrated in FIG. 15, in one embodiment, may further include one or more turbine actuation members 1540 coupled to the one or more turbines. In the illustrated embodiment of FIG. 15, the one or more turbine actuation members 1540 are configured to adjust an angle of tilt of the one or more turbines, and more particularly their blades and/or vanes, relative to the first direction of fluid flow. Accordingly, the one or more turbine actuation members 1540 may be used to speed up or slow down the displacement of the wellbore tractor 1500 axially downhole, as well as potentially reverse totally, wherein the wellbore tractor 1500 can be displaced axially uphole using the same direction of fluid flow.

The one or more wheel actuation members 1535 may be operable in response to a variety of different signals or conditions. In one embodiment, the one or more wheel actuation members 1535 receive a signal from uphole. In another embodiment, the one or more wheel actuation members 1535 are operable in response to a downhole signal generated in the wellbore tractor 1500. For example, the one or more wheel actuation members 1535 could move in response to changes in time, temperature, or pressure, among other conditions measured in the wellbore tractor 1500, particularly when changing from a state that moves the wellbore tractor 1500 axially downhole to an opposite state that moves the wellbore tractor 1500 axially uphole. The one or more turbine actuation members 1540 may also be operable in response to a variety of different signals or conditions, including the same signals or conditions as the one or more wheel actuation members 1535

Figure 16:
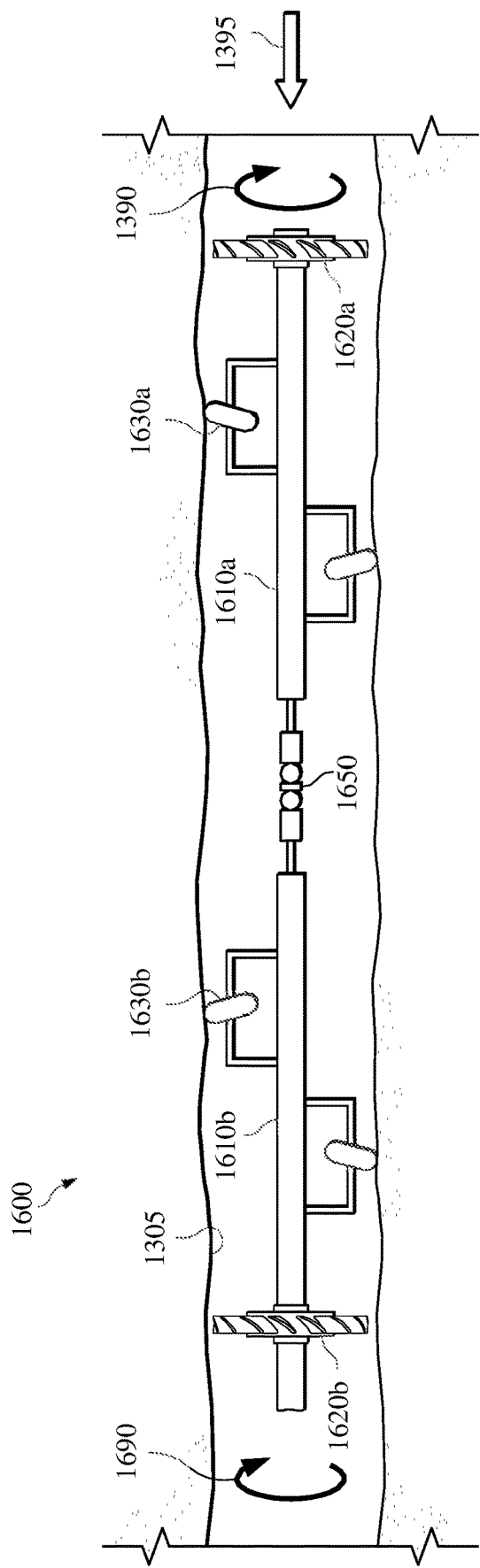

Turning to FIG. 16, illustrated is an alternative embodiment of a wellbore tractor 1600 manufactured and designed according to the disclosure. The wellbore tractor 1600 differs significantly from the wellbore tractor 1300 of FIG. 13. In the embodiment illustrated in FIG. 16, the base member 1310 is a first base member 1610*a*, the one or more turbines 1320 are one or more first turbines 1620*a*, and the one or more wellbore engaging devices 1330 are one or more first wellbore engaging devices 1630*a*. The wellbore tractor 1600 illustrated in FIG. 16 further includes a second base member 1610*b*, and one or more second turbines 1620*b* fixed to the second base member 1610*b*. The one or more second turbines 1620*b*, in the illustrated embodiment, are operable for rotating the second base member 1610*b* in a second opposite rotational direction 1690 based upon the first direction of fluid flow 1395. Accordingly, the one or more second turbines 1620*b* have an opposite orientation or handedness as the one or more first turbines 1620*a*. For example, while the one or more first turbines 1620*a*, in the illustrated embodiment, are configured to rotate the first base member 1610*a* clockwise to advance the wellbore tractor 1600 downhole (e.g., as looking up at the wellbore tractor 1600 from downhole), the one or more second turbines 1620*b*, in the illustrated embodiment, are configured to rotate the second base member 1610*b* counter clockwise to advance the wellbore tractor 1600 downhole (e.g., as looking up at the wellbore tractor 1600 from downhole).

The wellbore tractor 1600 additionally includes one or more second wellbore engaging devices 1630*b* radially extending from the second base member 1610*b*. In this embodiment, the one or more second wellbore engaging devices 1630*b* are also contactable with the surface of the wellbore 1305 for displacing the second base member 1610*b* and one or more second turbines 1620*b* axially downhole as the one or more second turbines 1620*b* rotate in the second opposite rotational direction 1690. In the embodiment of FIG. 16, the first and second base members 1610*a*, 1610*b* are rotatably coupled to one another to allow for the first rotational direction 1390 and second opposite rotational direction 1690. For example, a swivel 1650, or another similar device, could be used to rotatably couple the first and second base members 1610*a*, 1610*b* to one another.

Figure 17:
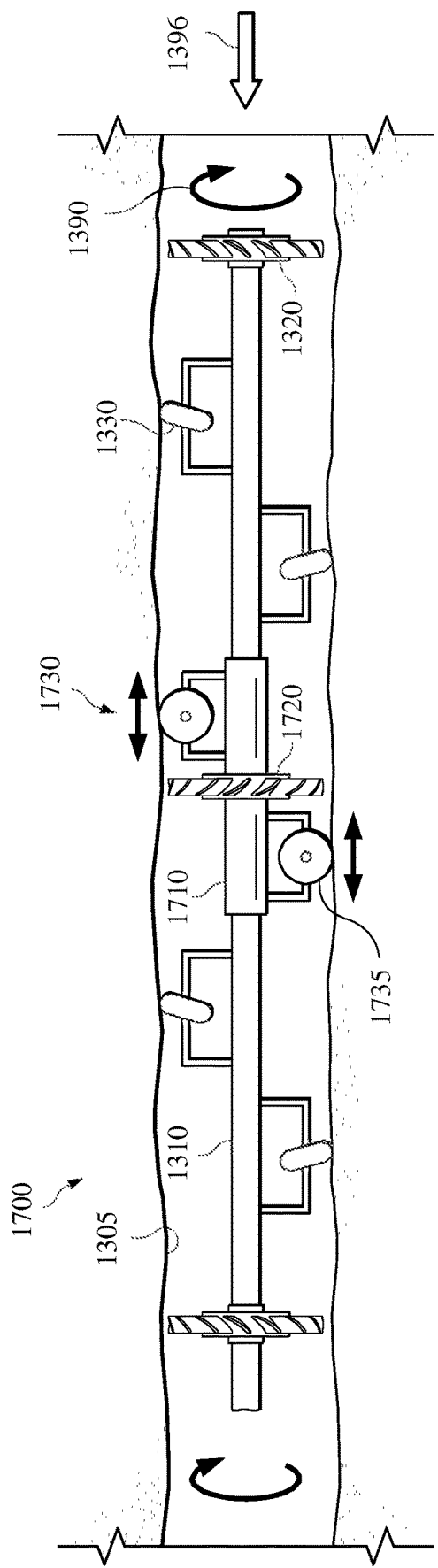

Turning to FIG. 17, illustrated is yet another embodiment of a wellbore tractor 1700 manufactured and designed according to the disclosure. The wellbore tractor 1700, in addition to many of the features of wellbore tractor 1300, additionally includes a stator member 1710 rotatably surrounding at least a portion of the base member 1310. In the embodiment of FIG. 17, the stator member 1710 has one or more stator turbines 1720 (e.g., a single turbine in this embodiment) fixed thereto for reversing a swirling action of fluid flow exiting the one or more turbines 1320. In one embodiment of the disclosure, such as shown in FIG. 17, blades of the one or more stator turbines 1720 have an opposite orientation or handedness to blades of the one or more turbines 1320. Such a configuration helps to reverse the swirling action, and thus provide more torque for the wellbore tractor 1700.

The wellbore tractor 1700 additionally includes one or more stator wellbore engaging devices 1730 radially extending from the stator member 1710, the one or more stator wellbore engaging devices 1730 contactable with the surface of the wellbore 1305. In accordance with the embodiment shown, the one or more stator wellbore engaging devices 1730 are one or more stator wheels 1735 substantially aligned with a length of the wellbore tractor 1700. Accordingly, the one or more stator wheels 1735 are configured to substantially prevent rotation of the stator member 1710 relative to the surface of the wellbore 1305 as the wellbore tractor 1700 is displaced axially downhole. The phrase "substantially prevent rotation," as that phrase is used herein, means that the stator rotates at a rate less than 10 percent of a rate of rotation of the turbine 1320.

Figure 18:
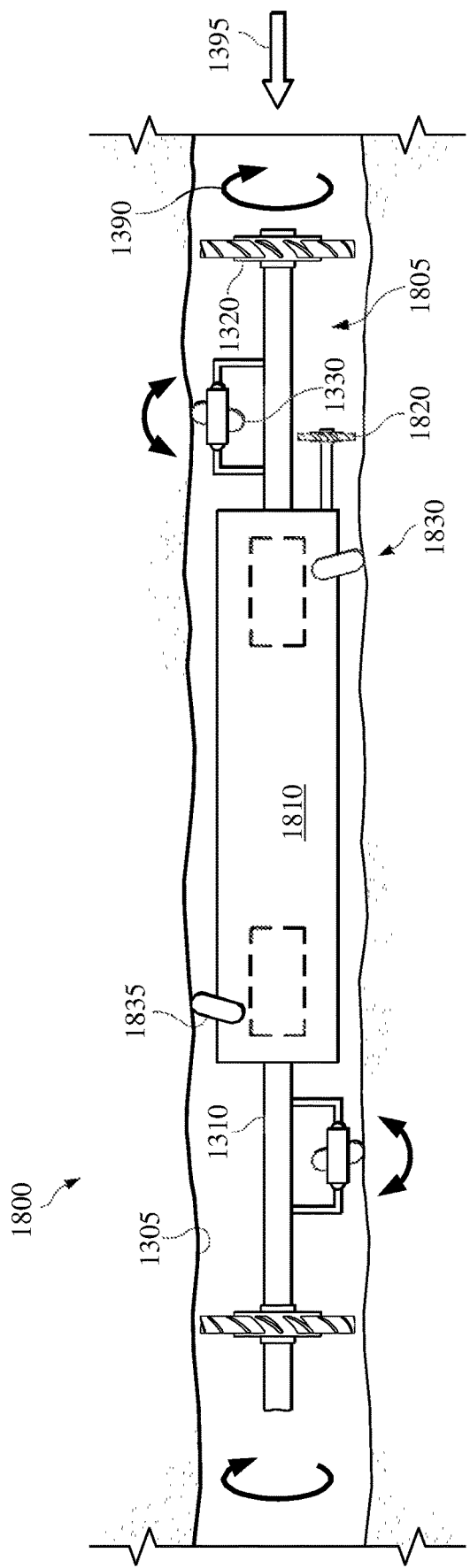

Turning now to FIG. 18, illustrated is another wellbore tractor 1800 manufactured and designed according to another embodiment. The wellbore tractor 1800 is similar in many respects to the wellbore tractor 1500 illustrated in FIG. 15. The wellbore tractor 1800, in the embodiment of FIG. 18, employs the base member 1310, one or more turbines 1320 and one or more wellbore engaging devices 1330 as features of a flow based drive section 1805. The wellbore tractor 1800, in addition to the flow based drive section 1805, includes a powered drive section 1810 coupled to the base member 1310. In accordance with the embodiment shown, the powered drive section 1810 includes one or more powered wellbore engaging devices 1830 radially extending therefrom. In this embodiment, the one or more powered wellbore engaging devices 1830 are also contactable with the surface of the wellbore 1305 for displacing the wellbore tractor axially downhole.

In certain embodiments, the flow based drive section 1805 is a primary drive section and the powered drive section 1810 is a secondary hydraulically powered drive section. For example, the secondary hydraulically powered drive section may be designed to displace the wellbore tractor 1800 axially downhole if the primary flow based drive section is unable to do so. As discussed in greater detail above, the secondary hydraulic powered drive section may be powered by the fluid flow, for example using the turbine 1320 or its own turbine 1820.

In certain other embodiments, the flow based drive section 1805 is the primary drive section and the powered drive section 1810 is a secondary electrically powered drive section configured to displace the wellbore tractor 1800 axially downhole if the primary flow based drive section is unable to do so.

Depending on the design of the wellbore tractor 1800, the one or more powered wellbore engaging devices 1830 are one or more powered wheels 1835 positioned at a first powered tilted direction relative to an axial surface of the wellbore 1305. Accordingly, the powered wellbore engaging devices 1830 may also be used to displace the wellbore tractor 1800 axially downhole.

Figure 19:
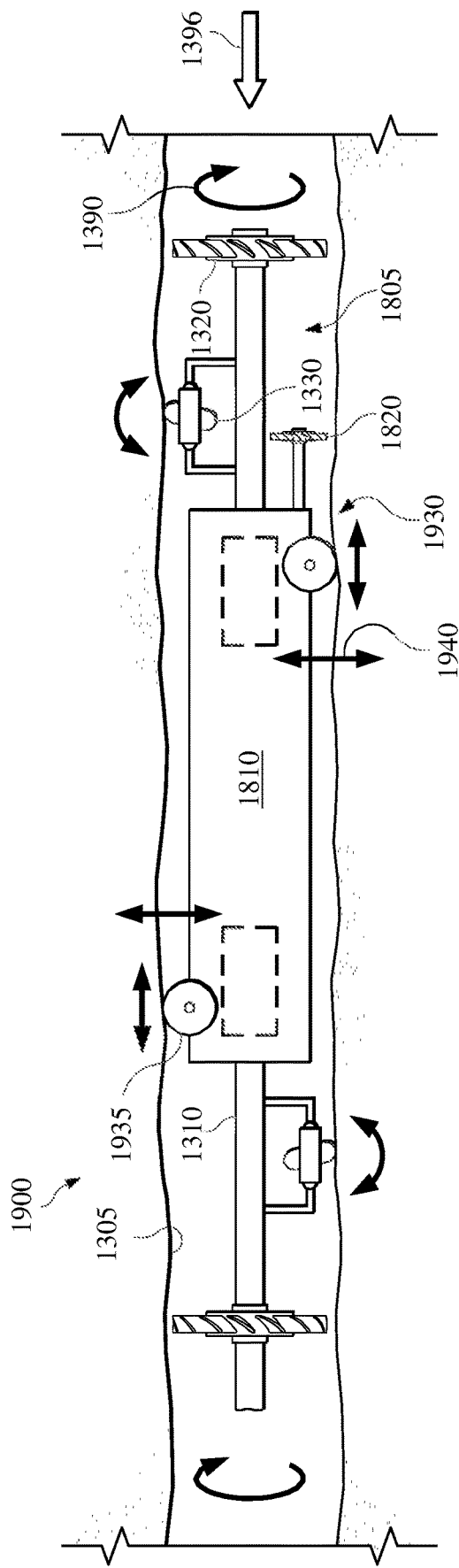

Turning to FIG. 19, illustrated is another embodiment of a wellbore tractor 1900 manufactured and designed according to the disclosure. The wellbore tractor 1900 shares many of the same features as the wellbore tractor 1800. The wellbore tractor 1900 primarily differs from the wellbore tractor 1800 in that its powered wellbore engaging devices 1930, and in the embodiment shown the powered wheels 1935, are substantially aligned with a length of the wellbore tractor 1800 for displacing the wellbore tractor axially downhole. In this embodiment, the one or more powered wellbore engaging devices 1930 could be movable from a first radially retracted state to a second radially extended state in contact with the surface of the wellbore 1305, as shown by arrow 1940. The radial movement of the powered wellbore engaging devices 1930 allows them to engage and disengage from the wellbore 1305, such that the flow based drive section 1805 may operate.

Figure 20:
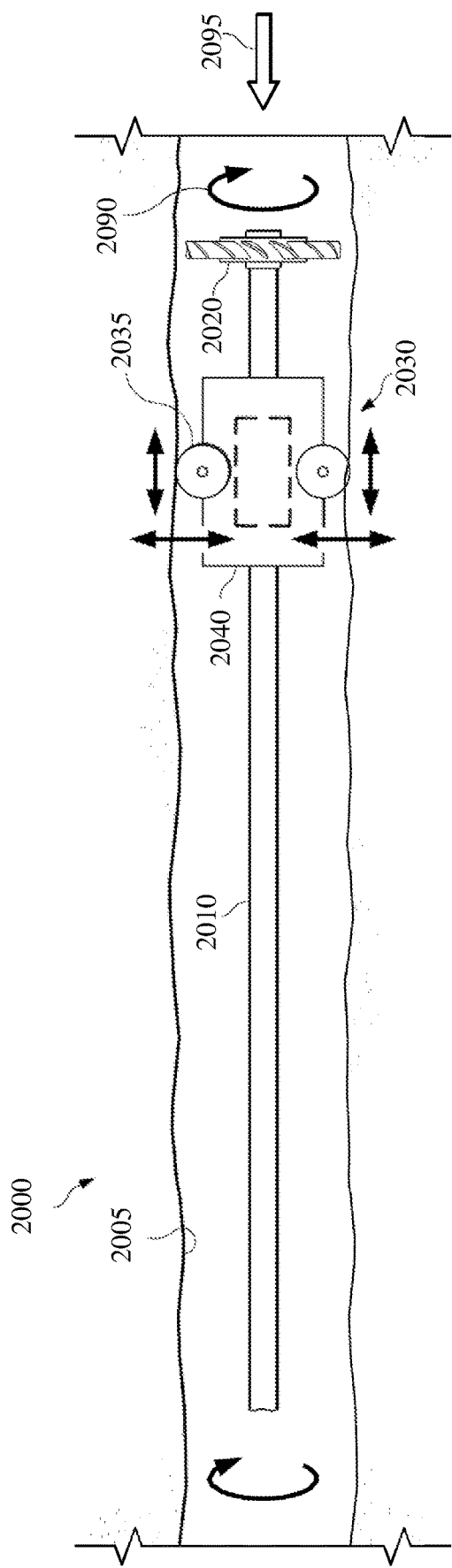

Turning to FIG. 20, illustrated is another, substantially different, embodiment of a wellbore tractor 2000 manufactured and designed according to the disclosure. The wellbore tractor 2000 includes a base member 2010, having a hydraulically powered drive section 2040 coupled thereto. The wellbore tractor 2000 illustrated in FIG. 20 additionally includes one or more turbines 2020 coupled to the hydraulically powered drive section 2040. In accordance with this embodiment, the one or more turbines 2020 power the hydraulically powered drive section 2040 based upon fluid 2095 flow across the one or more turbines 2020, and rotation 2090 thereof. The wellbore tractor 2000 additionally includes one or more wellbore engaging devices 2030 radially extending from the hydraulically powered drive section 2040, the one or more wellbore engaging devices 2030 contactable with a surface of a wellbore 2005 for displacing the wellbore tractor 2000 axially downhole. In the embodiment shown, the one or more wellbore engaging devices 2030 are one or more powered wheels 2035 that are substantially aligned with a length of the wellbore tractor 2000 for displacing the wellbore tractor 2000 axially downhole. In a simple form of this embodiment, the one or more turbines 2020 power the hydraulically powered drive section 2040 using the fluid 2095, the hydraulically powered drive section 2040 then being used to displace the wellbore tractor 2000 axially downhole.

Figure 21:
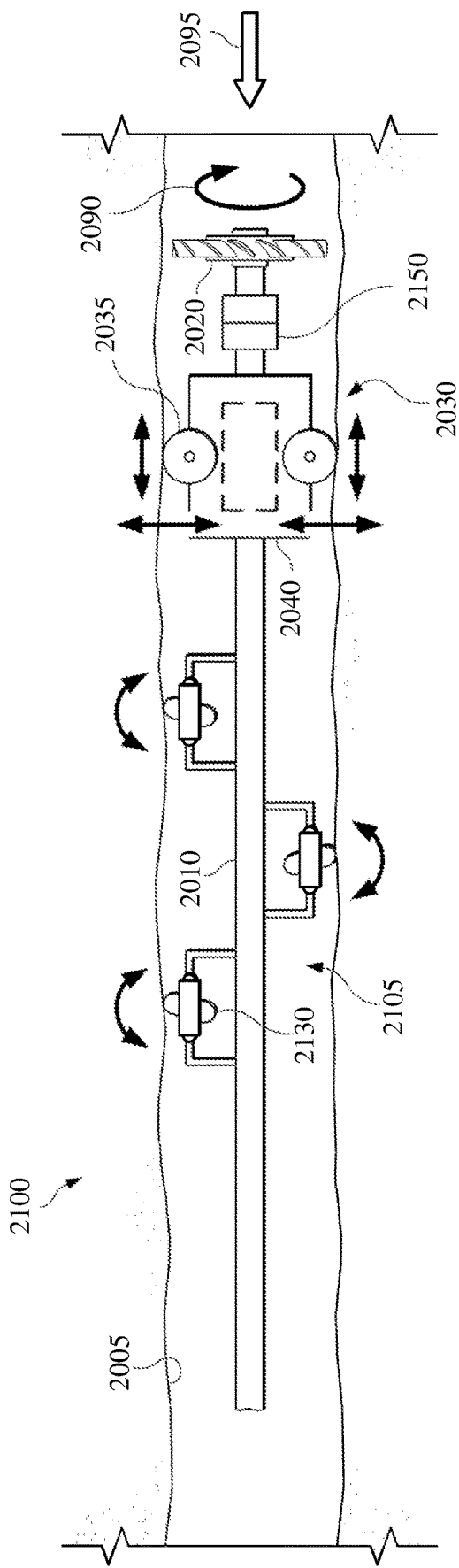

Turning now to FIG. 21, illustrated is yet another embodiment of a wellbore tractor 2100 manufactured and designed according to the disclosure. The wellbore tractor 2100 shares many of the same features as the wellbore tractor 2000 illustrated in FIG. 20, thus similar reference numerals may be used to indicated similar, if not identical, features. The wellbore tractor 2100 mainly differs from the wellbore tractor 2000, in that the hydraulically powered drive section 2040 is a secondary hydraulically powered drive section and the one or more wellbore engaging devices 2030 are one or more hydraulically powered wellbore engaging devices, and further that the wellbore tractor 2100 additionally includes a primary mechanical drive section 2105 coupled to the base member 2010. The primary mechanical drive section 2105, in the illustrated embodiment, includes one or more mechanical wellbore engaging devices 2130 radially extending from the base member 2010. In accordance with this embodiment, the one or more mechanical wellbore engaging devices 2130 are also contactable with the surface of a wellbore 2005 for displacing the wellbore tractor 2100 axially downhole.

The wellbore tractor 2100 illustrated in FIG. 21, in certain embodiments, may include a slip clutch 2150 positioned on the base member 2010 between the one or more turbines 2020 and the hydraulic powered drive section 2040. In accordance with this embodiment, the slip clutch 2150 is configured to fix the one or more turbines 2020 to the base member 2010 and thus displace the wellbore tractor 2100 axially downhole using the one or more mechanical wellbore engaging devices 2130 when in a gripping clutch position. However, the slip clutch 2150 is additionally configured to allow the one or more turbines 2020 to slip with regard to the base member 2010 to power the hydraulically powered drive section 2040 thus displacing the wellbore tractor 2100 axially downhole using the one or more hydraulically powered wellbore engaging devices 2030 when in a slipping clutch position. Additional details for the slip clutch may be found in various paragraphs above.

Figure 22:
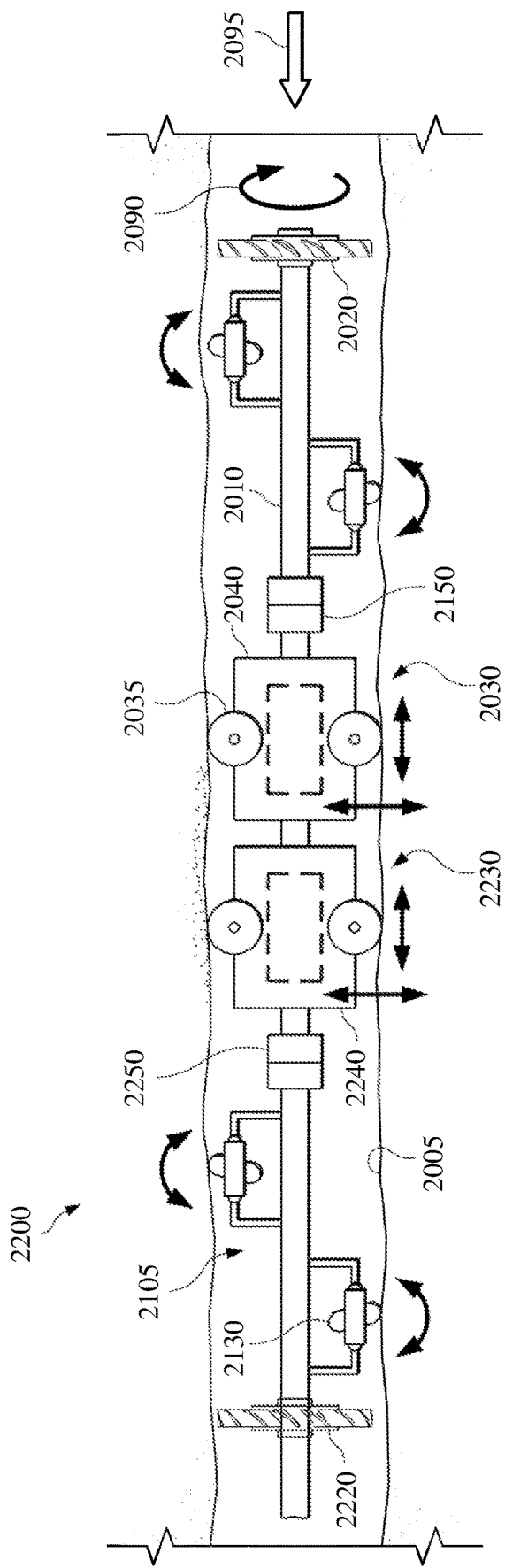

Turning now to FIG. 22, illustrated is another embodiment of a wellbore tractor 2200 manufactured and designed according to the disclosure. The wellbore tractor 2200 shares many of the same features as the wellbore tractor 2100. The wellbore tractor 2200 further includes an electrically powered drive section 2240 coupled to the base member 2010. In this embodiment, one or more electrically powered wellbore engaging devices 2230 radially extending from the electrically powered drive section 2240. As illustrated, the one or more wellbore engaging devices 2230 are contactable with the surface of the wellbore 2005 for displacing the wellbore tractor 2200 axially downhole.

Further to this embodiment, the slip clutch 2150 is a first slip clutch, and the wellbore tractor 2200 further includes a second slip clutch 2250 positioned on the base member 2010. The second slip clutch 2250, in this embodiment, is configured to fix the one or more turbines 2020 to the base member 2010 and thus displace the wellbore tractor 2200 axially downhole using the one or more mechanical wellbore engaging devices 2130 when in a second gripping clutch position, and configured to allow the one or more turbines 2020 to slip with regard to the base member 2010 to power the electrically powered drive section 2240 thus displacing the wellbore tractor 2200 axially downhole using the one or more electrically powered wellbore engaging devices 2230 when in a second slipping clutch position.

The wellbore tractor 2200 illustrated in FIG. 22, in certain embodiments, further includes one or more second turbines 2220. In this embodiment, the second slip clutch 2250 is positioned on the base member 2010 between the one or more second turbines 2220 and the electrically powered drive section 2240. Accordingly, the first slip clutch 2150 may be used in the conjunction with the hydraulically powered drive section 2040, and the second slip clutch 2250 may be used in conjunction with the electrically powered drive section 2240.

Aspects disclosed herein include:
- A. A wellbore tractor charging station, the wellbore tractor charging station including: 1) a charging station power generation module, the charging station power generation module configured to self-generate power for transfer to a wellbore tractor located within a wellbore; and 2) a charging station power transfer module coupled to the charging station power generation module, the charging station power transfer module configured to transfer the power generated by the charging station power generation module to the wellbore tractor while the wellbore tractor is located within a wellbore.
- B. A well system, the well system including: 1) a wellbore extending through one or more subterranean formations; and 2) a wellbore tractor charging station located in the wellbore, the wellbore tractor charging station including: a) a charging station power generation module, the charging station power generation module configured to self-generate power for transfer to a wellbore tractor located within the wellbore; and b) a charging station power transfer module coupled to the charging station power generation module, the charging station power transfer module configured to transfer the power generated by the charging station power generation module to the wellbore tractor while the wellbore tractor is located within a wellbore.
- C. A method, the method including: 1) positioning a wellbore tractor charging station in a wellbore extending through one or more subterranean formations, the wellbore tractor charging station including: a) a charging station power generation module, the charging station power generation module configured to self-generate power; and b) a charging station power transfer module coupled to the charging station power generation module; and 2) positioning a wellbore tractor within the wellbore proximate the wellbore tractor charging station such that the charging station power transfer module transfers power generated by the charging station power generation module to the wellbore tractor.
- D. A wellbore tractor, the wellbore tractor including: 1) a tractor drive module, the tractor drive module configured to propel the wellbore tractor within a wellbore extending through one or more subterranean formations; 2) a tractor electronics module coupled to the tractor drive module, the tractor electronics module including one or more batteries; and 3) a tractor power transfer module coupled to the tractor electronics module, the tractor power transfer module configured to receive power from a wellbore tractor charging station located within the wellbore and transfer it to the one or more batteries.
- E. A well system, the well system including: 1) a wellbore extending through one or more subterranean formations; and 2) a wellbore tractor located in the wellbore, the wellbore tractor including: a) a tractor drive module, the tractor drive module configured to propel the wellbore tractor within a wellbore extending through one or more subterranean formations; b) a tractor electronics module coupled to the tractor drive module, the tractor electronics module including one or more batteries; and c) a tractor power receive module coupled to the tractor electronics module, the tractor power receive module configured to receive power from a wellbore tractor charging station located within the wellbore and transfer it to the one or more batteries.
- F. A method, the method including: 1) positioning a wellbore tractor in a wellbore extending through one or more subterranean formations, the wellbore tractor charging station including: a) a tractor drive module, the tractor drive module configured to propel the wellbore tractor within a wellbore extending through one or more subterranean formations; b) a tractor electronics module coupled to the tractor drive module, the tractor electronics module including one or more batteries; and c) a tractor power receive module coupled to the tractor electronics module, the tractor power receive module configured to receive power from a wellbore tractor charging station located within the wellbore and transfer it to the one or more batteries; and 2) autonomously moving the wellbore tractor within the wellbore using the tractor electronics and the tractor drive module.
- G. A well system, the well system including: 1) a wellbore extending through one or more subterranean formations; 2) one or more wellbore sensors located in the wellbore; and 3) a wellbore tractor located in the wellbore, the wellbore tractor configured to obtain data from the one or more wellbore sensors and undertake one or more autonomous tasks within the wellbore based upon the obtained data.
- H. A method, the method including: 1) positioning a wellbore tractor in a wellbore extending through one or more subterranean formations and including one or more sensors located therein; 2) obtaining data from the one or more sensors using the wellbore tractor; and 3) undertaking one or more autonomous tasks within the wellbore based upon the obtained data using the wellbore tractor.

Aspects A, B, C, D, E, F, G, and H may have one or more of the following additional elements in combination: Element 1: further including a charging station electronics module coupled to the charging station power generation module and the charging station power transfer module. Element 2: wherein the charging station electronics module includes a power conditioner. Element 3: wherein the power conditioner includes an alternating current (AC) to direct current (DC) converter. Element 4: wherein the charging station electronics module includes a battery source coupled between the alternating current (AC) to direct current (DC) converter and the charging station power transfer module. Element 5: wherein the charging station electronics module further includes a direct current (DC) to alternating current (AC) converter located between the battery source and the charging station power transfer module, the charging station power transfer module configured to receive alternating current (AC) power received from the direct current (DC) to alternating current (AC) converter and transfer it to the wellbore tractor while the wellbore tractor is located within a wellbore. Element 6: wherein the charging station power transfer module is an electromagnetic charging station power transfer module. Element 7: wherein the electromagnetic charging station power transfer module is an inductive coupling charging station power transfer module. Element 8: wherein the electromagnetic charging station power transfer module is a capacitive coupling charging station power transfer module. Element 9: wherein the charging station power generation module includes a fluid turbine generator. Element 10: wherein the charging station power generation module includes a vortex shedding generator. Element 11: further including wellbore tubing located within the wellbore, and further wherein the wellbore tractor charging station is coupled to the wellbore tubing. Element 12: wherein the wellbore tractor charging station is located along an inside surface of the wellbore tubing. Element 13: wherein the wellbore tubing has a larger cross-sectional area region and a smaller cross-sectional area region, and further wherein the wellbore tractor charging station is located along an inside surface of the larger cross-sectional area region. Element 14: wherein the larger cross-sectional area region includes a charging station sleeve portion, and further wherein the wellbore tractor charging station is located within the charging station sleeve portion. Element 15: wherein the charging station sleeve portion is fluidly coupled to an exterior of the wellbore tubular via a charging station wellbore tubular opening, the charging station wellbore tubular opening configured to provide fluid flow from an exterior of the wellbore tubular to the wellbore tractor charging station located within the charging station sleeve portion. Element 16: wherein the charging station sleeve portion includes a charging station sleeve opening extending through a sidewall thereof, the charging station sleeve opening configured to allow the fluid flow to enter the charging station sleeve portion and flow over the wellbore charging station before flowing into the wellbore tubing. Element 17: wherein the wellbore tractor charging station is removably located along an inside surface of the wellbore tubing. Element 18: further including a wellbore tractor located within the wellbore and proximate the wellbore tractor charging station. Element 19: further including a charging station electronics module coupled to the charging station power generation module and the charging station power transfer module. Element 20: wherein the charging station electronics module includes a power conditioner. Element 21: wherein the power conditioner includes an alternating current (AC) to direct current (DC) converter. Element 22: wherein the charging station electronics module includes a battery source coupled between the alternating current (AC) to direct current (DC) converter and the charging station power transfer module. Element 23: wherein the charging station electronics module further includes a direct current (DC) to alternating current (AC) converter located between the battery source and the charging station power transfer module, the charging station power transfer module configured to receive alternating current (AC) power received from the direct current (DC) to alternating current (AC) converter and transfer it to the wellbore tractor while the wellbore tractor is located within a wellbore. Element 24: wherein the charging station power transfer module is an electromagnetic charging station power transfer module. Element 25: wherein the electromagnetic charging station power transfer module is an inductive coupling charging station power transfer module. Element 26: wherein the electromagnetic charging station power transfer module is a capacitive coupling charging station power transfer module. Element 27: wherein the charging station power generation module includes a fluid turbine generator. Element 28: wherein the charging station power generation module includes a vortex shedding generator. Element 29: wherein the charging station power transfer module only transmits power when instructed to do so. Element 30: wherein the charging station power transfer module continuously broadcasts the power. Element 31: wherein the wellbore charging station transfers the power generated by the charging station power generation module to a battery of the wellbore tractor. Element 32: wherein the tractor drive module includes one or more wheels configured to propel the wellbore tractor within the wellbore. Element 33: wherein the tractor electronics module includes a power conditioner electrically coupled between the tractor power transfer module and the one or more batteries. Element 34: wherein the power conditioner includes an alternating current (AC) to direct current (DC) converter. Element 35: wherein the tractor power transfer module is an electromagnetic tractor power receive module. Element 36: wherein the electromagnetic tractor power receive module is an inductive coupling tractor power receive module. Element 37: wherein the electromagnetic tractor power receive module is a capacitive coupling tractor power receive module. Element 38: wherein the tractor electronics module includes memory and a processor, the memory and processor configured to allow the wellbore tractor to autonomously move within the wellbore. Element 39: wherein the tractor electronics module includes a formation controller, the memory, the processor and the formation controller configured to employ a model of the wellbore to undertake autonomous tasks within the wellbore. Element 40: further including a tractor manipulator module coupled to the tractor drive module, the tractor manipulator module configured to undertake the autonomous tasks within the wellbore. Element 41: wherein the tractor manipulator module includes one or more deployable manipulator features. Element 42: further including a tractor communications module coupled with the tractor electronics module, the tractor communications module configured to allow the wellbore tractor to transmit signals from the wellbore tractor or receive signals to the wellbore tractor. Element 43: wherein the tractor communications module includes tractor communications electronics and a tractor communications antenna. Element 44: wherein the one or more batteries are configured to power the tractor drive module. Element 45: wherein the tractor drive module includes one or more wheels configured to propel the wellbore tractor within the wellbore. Element 46: wherein the tractor electronics module includes a power conditioner electrically coupled between the tractor power receive module and the one or more batteries. Element 47: wherein the power conditioner includes an alternating current (AC) to direct current (DC) converter. Element 48: wherein the tractor power receive module is an electromagnetic tractor power receive module. Element 49: wherein the electromagnetic tractor power receive module is an inductive coupling tractor power receive module. Element 50: wherein the electromagnetic tractor power receive module is a capacitive coupling tractor power receive module. Element 51: wherein the tractor electronics module includes memory and a processor, the memory and processor configured to allow the wellbore tractor to autonomously move within the wellbore. Element 52: wherein the tractor electronics module includes a formation controller, the memory, the processor and the formation controller configured to employ a model of the wellbore to undertake autonomous tasks within the wellbore. Element 53: further including a tractor manipulator module coupled to the tractor drive module, the tractor manipulator module configured to undertake the autonomous tasks within the wellbore. Element 54: wherein the tractor manipulator module includes one or more deployable manipulator features. Element 55: further including a tractor communications module coupled with the tractor electronics module, the tractor communications module configured to allow the wellbore tractor to transmit signals from the wellbore tractor or receive signals to the wellbore tractor. Element 56: wherein the tractor communications module includes tractor communications electronics and a tractor communications antenna. Element 57: wherein the one or more batteries are configured to power the tractor drive module. Element 58: further including autonomously coupling with a wellbore tractor charging station located within the wellbore. Element 59: further including autonomously coupling with a wellbore sensor located within the wellbore. Element 60: wherein the tractor electronics module includes memory and a processor, the memory and processor configured to allow the wellbore tractor to autonomously move within the wellbore. Element 61: wherein the tractor electronics module includes a formation controller, the memory, the processor and the formation controller configured to employ a model of the wellbore to undertake autonomous tasks within the wellbore. Element 62: further including a tractor manipulator module coupled to the tractor drive module, the tractor manipulator module configured to undertake the autonomous tasks within the wellbore. Element 63: wherein the tractor manipulator module includes one or more deployable manipulator features. Element 64: further including adjusting a wellbore valve using the one or more deployable manipulator features. Element 65: wherein the wellbore tractor includes a tractor electronics module including one or more batteries. Element 66: wherein the tractor electronics module includes memory and a processor, the memory and the processor configured to allow the wellbore tractor to autonomously move within the wellbore. Element 67: wherein the tractor electronics module includes a formation controller, the memory, the processor and the formation controller configured to employ a model of the wellbore to undertake the one or more autonomous tasks within the wellbore. Element 68: wherein the wellbore tractor further includes a tractor manipulator module coupled to a tractor drive module, the tractor manipulator module configured to undertake the one or more autonomous tasks within the wellbore. Element 69: further including one or more actionable devices located in the wellbore, and further wherein the tractor manipulator module includes one or more deployable manipulator features, the memory, the processor, the formation controller and the one or more deployable manipulator features configured to employ the model of the wellbore to autonomously adjust the one or more adjustable devices. Element 70: wherein the one or more actionable devices are one or more adjustable wellbore valves. Element 71: wherein the one or more adjustable wellbore valves are one or more adjustable inflow control valves. Element 72: wherein the memory, the processor, the formation controller and the one or more deployable manipulator features are configured to employ the model of the wellbore to autonomously adjust the one or more adjustable inflow control valves to maintain consistent flow rate along a length of the wellbore. Element 73: wherein the memory, the processor, the formation controller and the one or more deployable manipulator features are configured to employ the model of the wellbore to autonomously adjust the one or more adjustable inflow control valves to achieve consistent differential pressure across production zones of the wellbore. Element 74: wherein the memory, the processor, the formation controller and the one or more deployable manipulator features are configured to employ the model of the wellbore to autonomously adjust the one or more adjustable inflow control valves to increase oil production across production zones of the wellbore. Element 75: wherein the memory, the processor, the formation controller and the one or more deployable manipulator features are configured to employ the model of the wellbore to autonomously adjust the one or more adjustable inflow control valves to decrease water production across production zones of the wellbore. Element 76: wherein the memory, the processor, the formation controller and the one or more deployable manipulator features are configured to employ the model of the wellbore to autonomously adjust the one or more adjustable inflow control valves to maximize oil production across production zones of the wellbore over a lifespan of the wellbore. Element 77: further including a wellbore tractor charging station located within the wellbore, and further wherein the wellbore tractor includes a tractor power receive module coupled to the tractor electronics module, the tractor power receive module configured to receive power from the wellbore tractor charging station and transfer it to the one or more batteries. Element 78: wherein the wellbore tractor charging station includes: 1) a power generation module, the power generation module configured to self-generate power for transfer to the wellbore tractor located within the wellbore; and 2) a power transfer module coupled to the power generation module, the power transfer module configured to transfer the power generated by the power generation module to the wellbore tractor while the wellbore tractor is located within the wellbore. Element 79: wherein the power transfer module is an electromagnetic power transfer module. Element 80: wherein the electromagnetic power transfer module is an inductive coupling power transfer module. Element 81: wherein the electromagnetic power transfer module is a capacitive coupling power transfer module. Element 82: wherein the power generation module includes a fluid turbine generator. Element 83: wherein the power generation module includes a vortex shedding generator. Element 84: wherein the wellbore tractor includes a tractor electronics module including one or more batteries. Element 85: wherein the tractor electronics module includes memory and a processor, the memory and the processor allowing the wellbore tractor to autonomously move within the wellbore. Element 86: wherein the tractor electronics module includes a formation controller, the memory, the processor and the formation controller employing a model of the wellbore to undertake the one or more autonomous tasks within the wellbore. Element 87: wherein the wellbore tractor further includes a tractor manipulator module coupled to a tractor drive module, the tractor manipulator module undertaking the one or more autonomous tasks within the wellbore. Element 88: further including one or more actionable devices located in the wellbore, and further wherein the tractor manipulator module includes one or more deployable manipulator features, the memory, the processor, the formation controller and the one or more deployable manipulator features employing the model of the wellbore to autonomously adjust the one or more adjustable devices. Element 89: wherein the one or more actionable devices are one or more adjustable wellbore valves. Element 91: wherein the one or more adjustable wellbore valves are one or more adjustable inflow control valves. Element 92: wherein the memory, the processor, the formation controller and the one or more deployable manipulator features employ the model of the wellbore to autonomously adjust the one or more adjustable inflow control valves to maintain consistent flow rate along a length of the wellbore. Element 93: wherein the memory, the processor, the formation controller and the one or more deployable manipulator features employ the model of the wellbore to autonomously adjust the one or more adjustable inflow control valves to achieve consistent differential pressure across production zones of the wellbore. Element 94: wherein the memory, the processor, the formation controller and the one or more deployable manipulator features employ the model of the wellbore to autonomously adjust the one or more adjustable inflow control valves to increase oil production across production zones of the wellbore. Element 95: wherein the memory, the processor, the formation controller and the one or more deployable manipulator features employ the model of the wellbore to autonomously adjust the one or more adjustable inflow control valves to decrease water production across production zones of the wellbore. Element 96: wherein the memory, the processor, the formation controller and the one or more deployable manipulator features employ the model of the wellbore to autonomously adjust the one or more adjustable inflow control valves to maximize oil production across production zones of the wellbore over a lifespan of the wellbore. Element 97: further including a wellbore tractor charging station located within the wellbore, and further wherein the wellbore tractor includes a tractor power receive module coupled to the tractor electronics module, the tractor power receive module receiving power from the wellbore tractor charging station and transferring it to the one or more batteries. Element 98: wherein the wellbore tractor charging station includes: 1) a power generation module, the power generation module self-generating power for transfer to the wellbore tractor located within the wellbore; and 3) a power transfer module coupled to the power generation module, the power transfer module transferring the power generated by the power generation module to the wellbore tractor while the wellbore tractor is located within the wellbore. Element 99: wherein the power transfer module is an electromagnetic power transfer module. Element 100: wherein the electromagnetic power transfer module is an inductive coupling power transfer module. Element 101: wherein the electromagnetic power transfer module is a capacitive coupling power transfer module. Element 102: wherein the power generation module includes a fluid turbine generator. Element 103: wherein the power generation module includes a vortex shedding generator. Element 104: further including replacing one or more of the sensors using the wellbore tractor.

Those skilled in the art to which this application relates will appreciate that other and further additions, deletions, substitutions, and modifications may be made to the described embodiments.

What is claimed is:

1. A wellbore tractor, comprising:
    a tractor drive module, the tractor drive module configured to propel the wellbore tractor within a wellbore extending through one or more subterranean formations;
    a tractor electronics module coupled to the tractor drive module, the tractor electronics module including one or more batteries; and
    a tractor power transfer module coupled to the tractor electronics module, the tractor power transfer module configured to receive power from a wellbore tractor charging station located within the wellbore and transfer it to the one or more batteries, the tractor electronics module including an alternating current (AC) to direct current (DC) converter coupled between the tractor power transfer module and the one or more batteries, the alternating current (AC) to direct current (DC) converter configured to convert alternating current (AC) generated by a downhole power generation source to direct current (DC) for use in the one or more batteries.

2. The wellbore tractor as recited in claim 1, wherein the tractor drive module includes one or more wheels configured to propel the wellbore tractor within the wellbore.

3. The wellbore tractor as recited in claim 1, wherein the tractor electronics module includes a power conditioner electrically coupled between the tractor power transfer module and the one or more batteries.

4. The wellbore tractor as recited in claim 1, wherein the tractor power transfer module is an electromagnetic tractor power receive module.

5. The wellbore tractor as recited in claim 4, wherein the electromagnetic tractor power receive module is an inductive coupling tractor power receive module.

6. The wellbore tractor as recited in claim 4, wherein the electromagnetic tractor power receive module is a capacitive coupling tractor power receive module.

7. The wellbore tractor as recited in claim 1, wherein the tractor electronics module includes memory and a processor, the memory and processor configured to allow the wellbore tractor to autonomously move within the wellbore.

8. The wellbore tractor as recited in claim 7, wherein the tractor electronics module includes a formation controller, the memory, the processor and the formation controller configured to employ a model of the wellbore to undertake autonomous tasks within the wellbore.

9. The wellbore tractor as recited in claim 8, further including a tractor manipulator module coupled to the tractor drive module, the tractor manipulator module configured to undertake the autonomous tasks within the wellbore.

10. The wellbore tractor as recited in claim 9, wherein the tractor manipulator module includes one or more deployable manipulator features.

11. The wellbore tractor as recited in claim 1, further including a tractor communications module coupled with the tractor electronics module, the tractor communications module configured to allow the wellbore tractor to transmit signals from the wellbore tractor or receive signals to the wellbore tractor.

12. The wellbore tractor as recited in claim 11, wherein the tractor communications module includes tractor communications electronics and a tractor communications antenna.

13. The wellbore tractor as recited in claim 1, wherein the one or more batteries are configured to power the tractor drive module.

14. A well system, comprising:
    a wellbore extending through one or more subterranean formations; and
    a wellbore tractor located in the wellbore, the wellbore tractor including:
        a tractor drive module, the tractor drive module configured to propel the wellbore tractor within a wellbore extending through one or more subterranean formations;
        a tractor electronics module coupled to the tractor drive module, the tractor electronics module including one or more batteries; and
        a tractor power receive module coupled to the tractor electronics module, the tractor power receive module configured to receive power from a wellbore tractor charging station located within the wellbore and transfer it to the one or more batteries, the tractor electronics module including an alternating current (AC) to direct current (DC) converter coupled between the tractor power transfer module and the one or more batteries, the alternating current (AC) to direct current (DC) converter configured to convert alternating current (AC) generated by a downhole power generation source to direct current (DC) for use in the one or more batteries.

15. The well system as recited in claim 14, wherein the tractor drive module includes one or more wheels configured to propel the wellbore tractor within the wellbore.

16. The well system as recited in claim 14, wherein the tractor electronics module includes a power conditioner electrically coupled between the tractor power receive module and the one or more batteries.

17. The well system as recited in claim 14, wherein the tractor power receive module is an electromagnetic tractor power receive module.

18. The well system as recited in claim 17, wherein the electromagnetic tractor power receive module is an inductive coupling tractor power receive module.

19. The well system as recited in claim 17, wherein the electromagnetic tractor power receive module is a capacitive coupling tractor power receive module.

20. The well system as recited in claim 14, wherein the tractor electronics module includes memory and a processor, the memory and processor configured to allow the wellbore tractor to autonomously move within the wellbore.

21. The well system as recited in claim 20, wherein the tractor electronics module includes a formation controller, the memory, the processor and the formation controller configured to employ a model of the wellbore to undertake autonomous tasks within the wellbore.

22. The well system as recited in claim 21, further including a tractor manipulator module coupled to the tractor drive module, the tractor manipulator module configured to undertake the autonomous tasks within the wellbore.

23. The well system as recited in claim 22, wherein the tractor manipulator module includes one or more deployable manipulator features.

24. The well system as recited in claim 14, further including a tractor communications module coupled with the tractor electronics module, the tractor communications module configured to allow the wellbore tractor to transmit signals from the wellbore tractor or receive signals to the wellbore tractor.

25. The well system as recited in claim 24, wherein the tractor communications module includes tractor communications electronics and a tractor communications antenna.

26. The well system as recited in claim 14, wherein the one or more batteries are configured to power the tractor drive module.

27. The well system as recited in claim 14, wherein the tractor drive module includes one or more wheels configured to propel the wellbore tractor within the wellbore and the tractor electronics module includes a power conditioner electrically coupled between the tractor power receive module and the one or more batteries.

28. A method, comprising:
positioning a wellbore tractor in a wellbore extending through one or more subterranean formations, the wellbore tractor including:
a tractor drive module, the tractor drive module configured to propel the wellbore tractor within a wellbore extending through one or more subterranean formations;
a tractor electronics module coupled to the tractor drive module, the tractor electronics module including one or more batteries; and
a tractor power receive module coupled to the tractor electronics module, the tractor power receive module configured to receive power from a wellbore tractor charging station located within the wellbore and transfer it to the one or more batteries, the tractor electronics module including an alternating current (AC) to direct current (DC) converter coupled between the tractor power transfer module and the one or more batteries, the alternating current (AC) to direct current (DC) converter configured to convert alternating current (AC) generated by a downhole power generation source to direct current (DC) for use in the one or more batteries; and
autonomously moving the wellbore tractor within the wellbore using the tractor electronics and the tractor drive module.

29. The method as recited in claim 28, further including autonomously coupling with a wellbore tractor charging station located within the wellbore.

30. The method as recited in claim 28, further including autonomously coupling with a wellbore sensor located within the wellbore.

31. The method as recited in claim 28, wherein the tractor electronics module includes memory and a processor, the memory and processor configured to allow the wellbore tractor to autonomously move within the wellbore.

32. The method as recited in claim 31, wherein the tractor electronics module includes a formation controller, the memory, the processor and the formation controller configured to employ a model of the wellbore to undertake autonomous tasks within the wellbore.

33. The method as recited in claim 32, further including a tractor manipulator module coupled to the tractor drive module, the tractor manipulator module configured to undertake the autonomous tasks within the wellbore.

34. The method as recited in claim 33, wherein the tractor manipulator module includes one or more deployable manipulator features.

35. The method as recited in claim 34, further including adjusting a wellbore valve using the one or more deployable manipulator features.

* * * * *